US011644350B2

(12) United States Patent
Lau et al.

(10) Patent No.: US 11,644,350 B2
(45) Date of Patent: May 9, 2023

(54) ILLUMINATED VEHICLE SENSOR CALIBRATION TARGET

(71) Applicant: GM Cruise Holdings LLC, San Francisco, CA (US)

(72) Inventors: Zhi Yuan Sherwin Lau, Berkeley, CA (US); Daniel Chou, San Francisco, CA (US); Kayla Holman, Cambridge, MA (US); Derek Wu, San Francisco, CA (US)

(73) Assignee: GM Cruise Holdings LLC., San Francisco, CA (US)

( * ) Notice: Subject to any disclaimer, the term of this patent is extended or adjusted under 35 U.S.C. 154(b) by 628 days.

(21) Appl. No.: 16/730,054

(22) Filed: Dec. 30, 2019

(65) Prior Publication Data

US 2021/0199479 A1    Jul. 1, 2021

(51) Int. Cl.
*G01D 18/00*        (2006.01)
*G01B 11/27*        (2006.01)
*G01S 13/931*       (2020.01)
*G06T 7/80*         (2017.01)

(52) U.S. Cl.
CPC ......... *G01D 18/008* (2013.01); *G01B 11/272* (2013.01); *G01S 13/931* (2013.01); *G06T 7/80* (2017.01)

(58) Field of Classification Search
CPC .............................. H01G 11/27; G01S 13/931
See application file for complete search history.

(56) References Cited

U.S. PATENT DOCUMENTS

| | | | | |
|---|---|---|---|---|
| 2016/0381323 | A1* | 12/2016 | Garcia, III | H04N 23/56 348/38 |
| 2019/0094347 | A1* | 3/2019 | Singh | G01S 7/4972 |
| 2019/0331482 | A1* | 10/2019 | Lawrence | G01S 7/4026 |
| 2020/0005372 | A1* | 1/2020 | Garcia, III | G06Q 40/03 |
| 2020/0141724 | A1* | 5/2020 | Lawrence | G01B 11/272 |
| 2020/0174107 | A1* | 6/2020 | Briggs | G06T 7/50 |
| 2020/0348129 | A1* | 11/2020 | DeBoer | G01B 11/275 |
| 2022/0057198 | A1* | 2/2022 | Massie | G01S 7/4026 |
| 2022/0191468 | A1* | 6/2022 | Kolberg | H04N 17/002 |

* cited by examiner

*Primary Examiner* — Talha M Nawaz
(74) *Attorney, Agent, or Firm* — Polsinelli PC

(57) ABSTRACT

An illuminated sensor target includes a light source. Actuating the light source illuminates the sensor target. The illuminated sensor target is recognized by one or more sensors of a vehicle during a calibration process, and is used to calibrate the one or more sensors of the vehicle during the calibration process. The illuminated sensor target is illuminated during at least part of the calibration process, which may involve rotation of the vehicle about a turntable, with the illuminated sensor target positioned within a range of the turntable along with other sensors targets, which may also be illuminated.

20 Claims, 23 Drawing Sheets

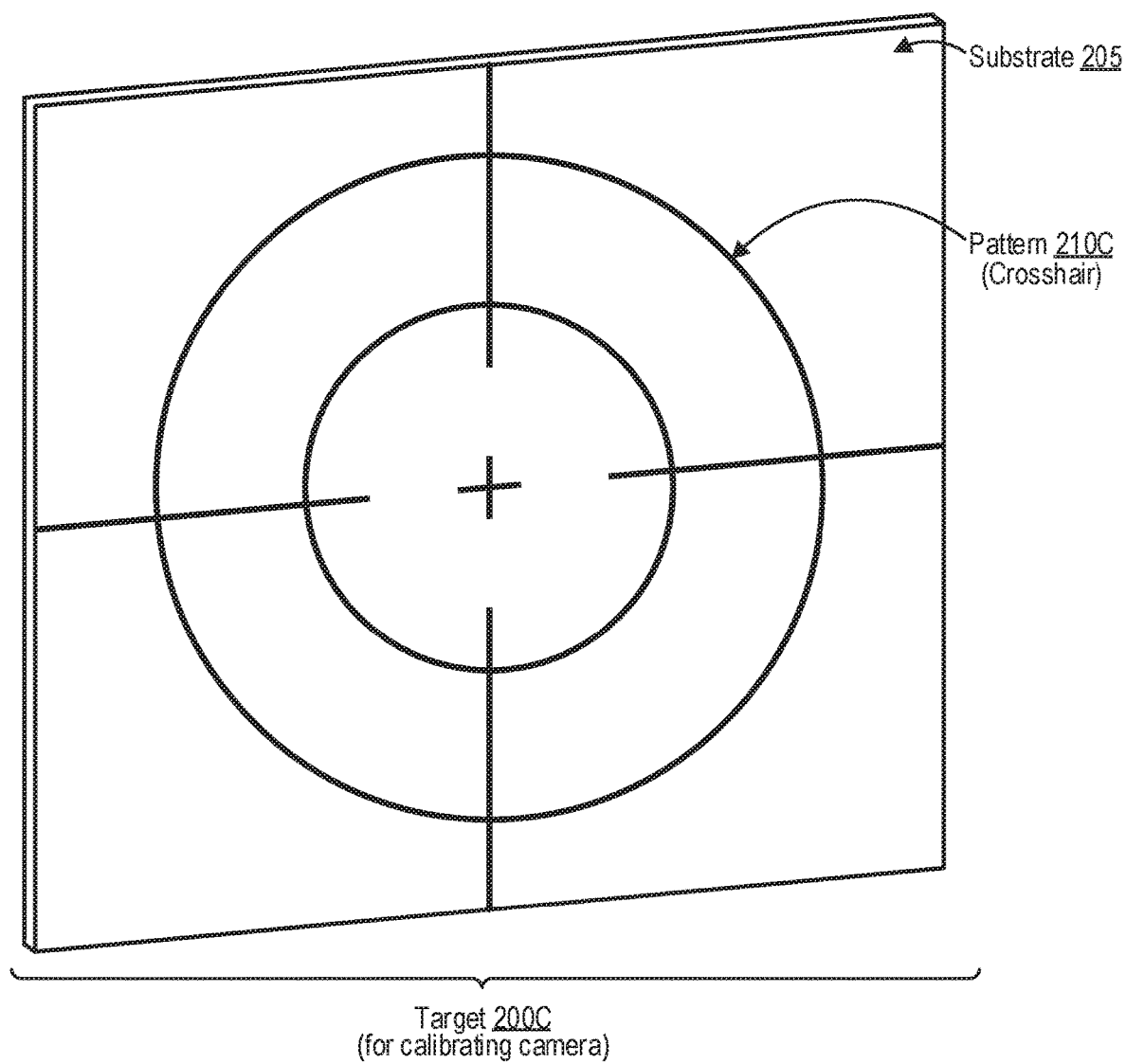

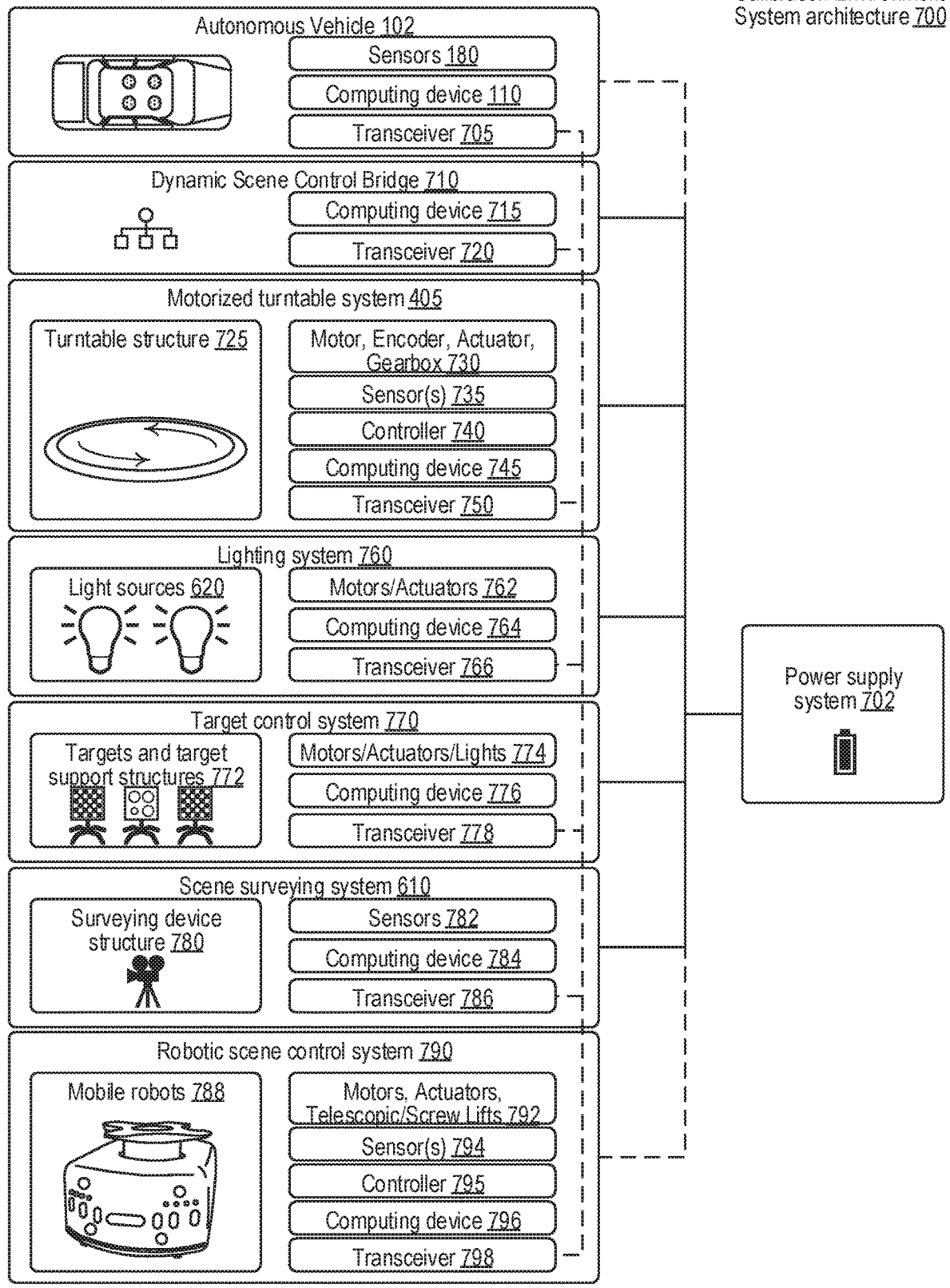

FIG. 9

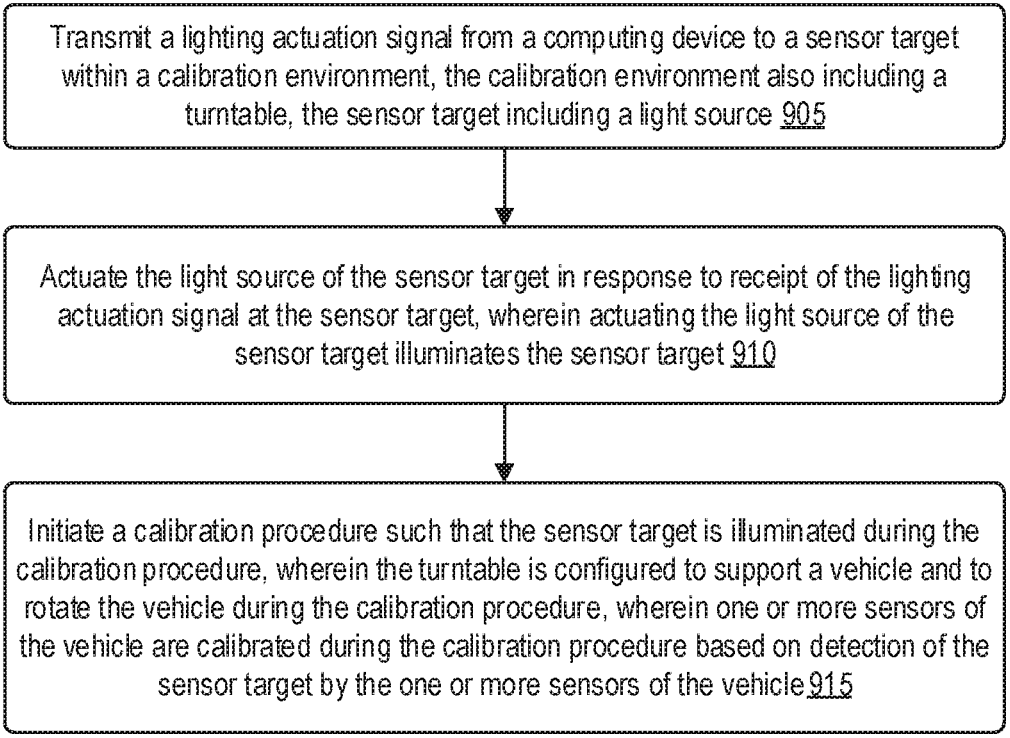

Transmit a lighting actuation signal from a computing device to a sensor target within a calibration environment, the calibration environment also including a turntable, the sensor target including a light source 905

↓

Actuate the light source of the sensor target in response to receipt of the lighting actuation signal at the sensor target, wherein actuating the light source of the sensor target illuminates the sensor target 910

↓

Initiate a calibration procedure such that the sensor target is illuminated during the calibration procedure, wherein the turntable is configured to support a vehicle and to rotate the vehicle during the calibration procedure, wherein one or more sensors of the vehicle are calibrated during the calibration procedure based on detection of the sensor target by the one or more sensors of the vehicle 915

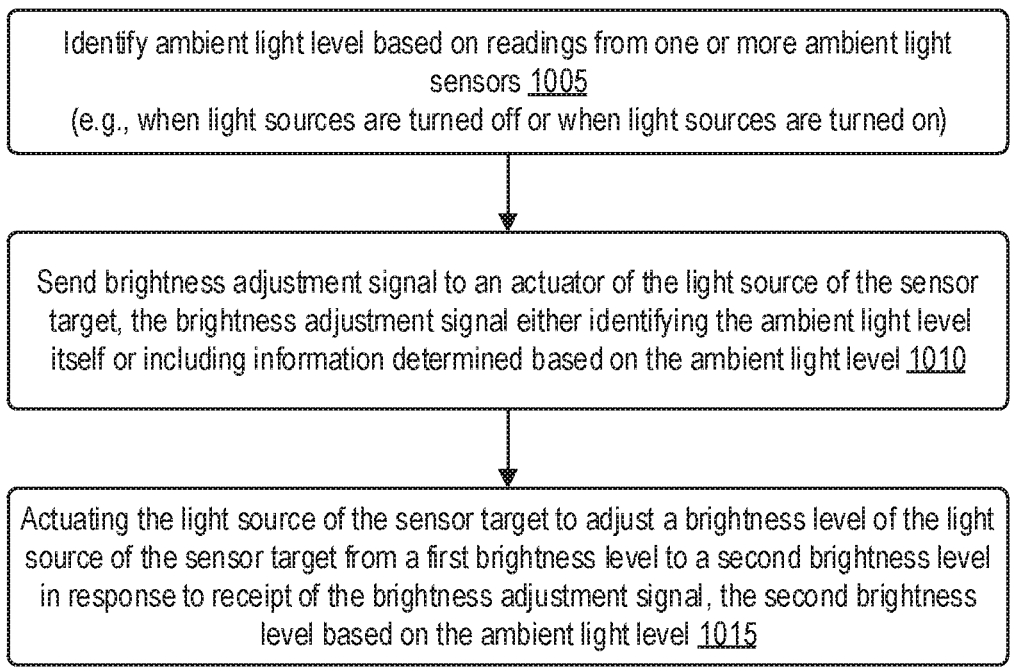

FIG. 10

```
Identify ambient light level based on readings from one or more ambient light
                                sensors 1005
   (e.g., when light sources are turned off or when light sources are turned on)
                                    │
                                    ▼
Send brightness adjustment signal to an actuator of the light source of the sensor
target, the brightness adjustment signal either identifying the ambient light level
itself or including information determined based on the ambient light level 1010
                                    │
                                    ▼
Actuating the light source of the sensor target to adjust a brightness level of the light
source of the sensor target from a first brightness level to a second brightness level
in response to receipt of the brightness adjustment signal, the second brightness
                  level based on the ambient light level 1015
```

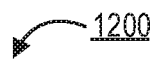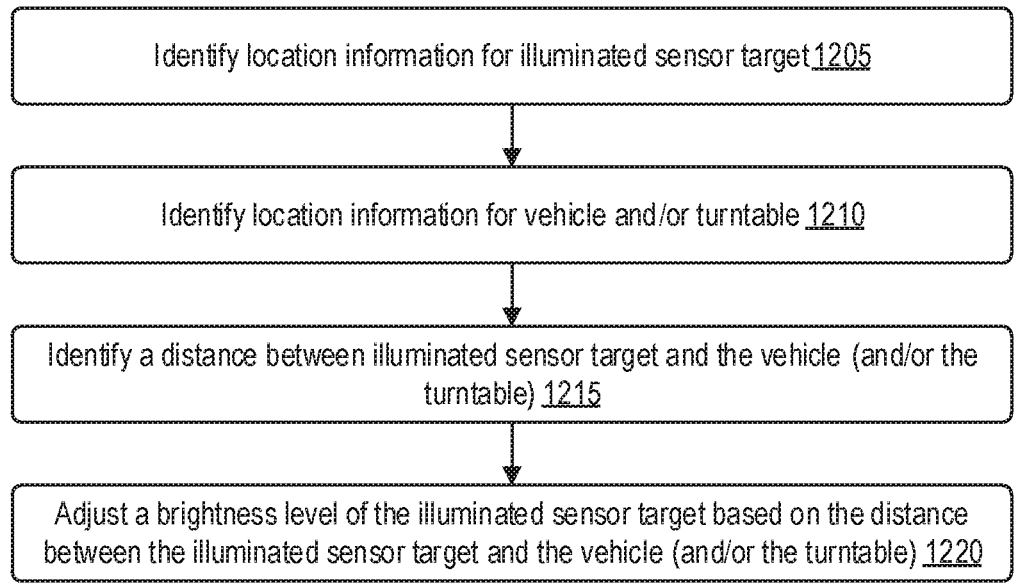
FIG. 12

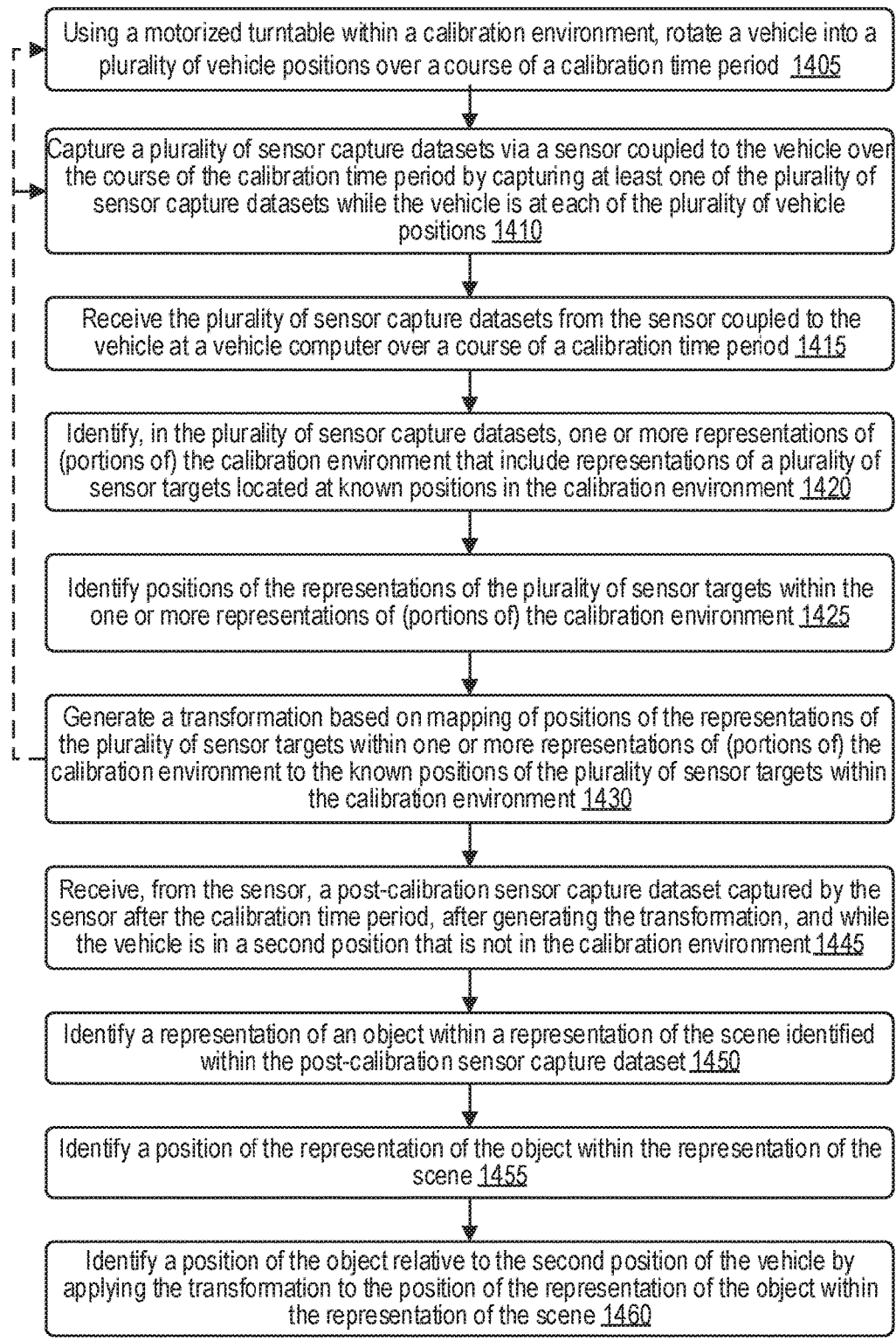

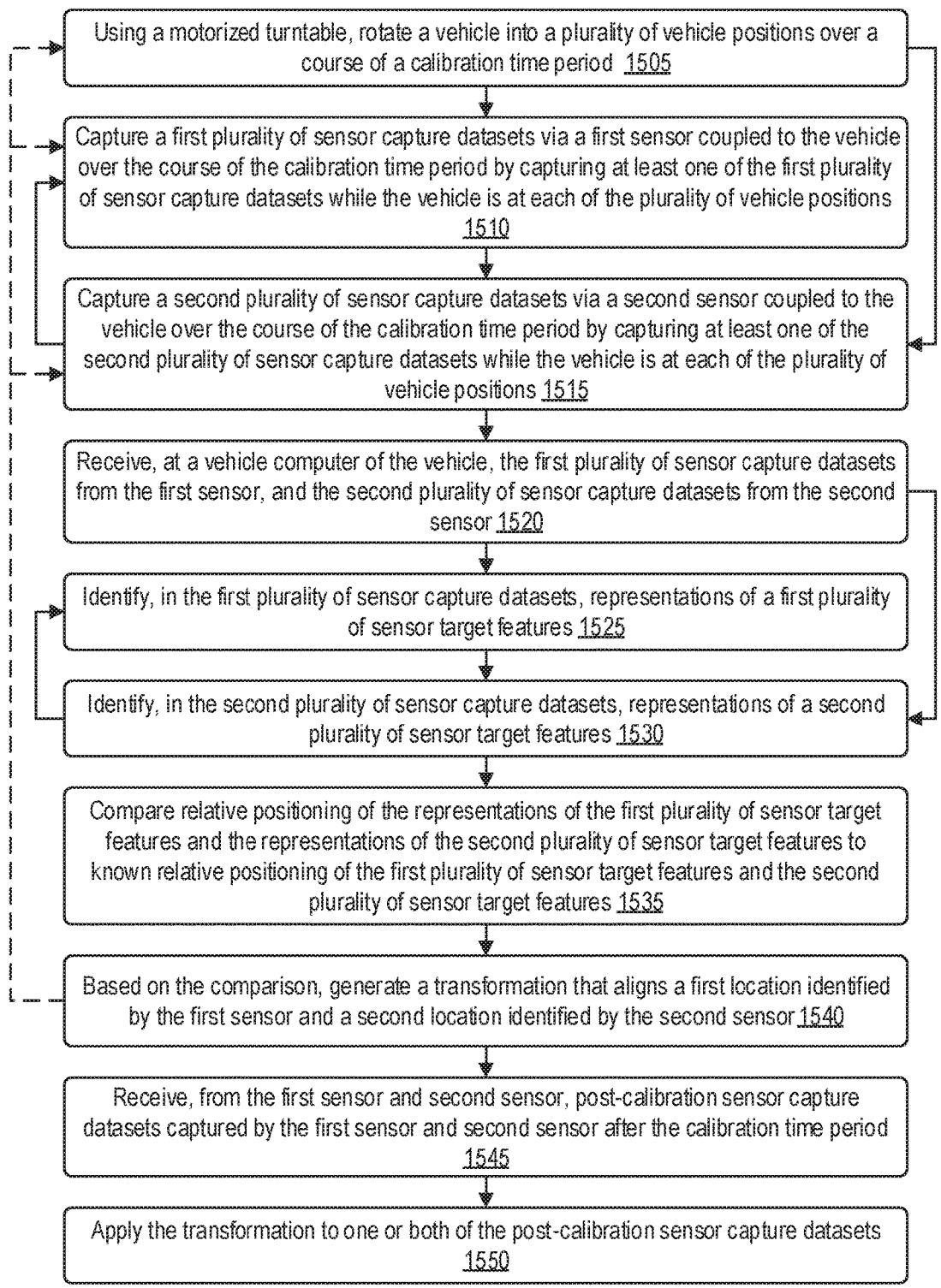

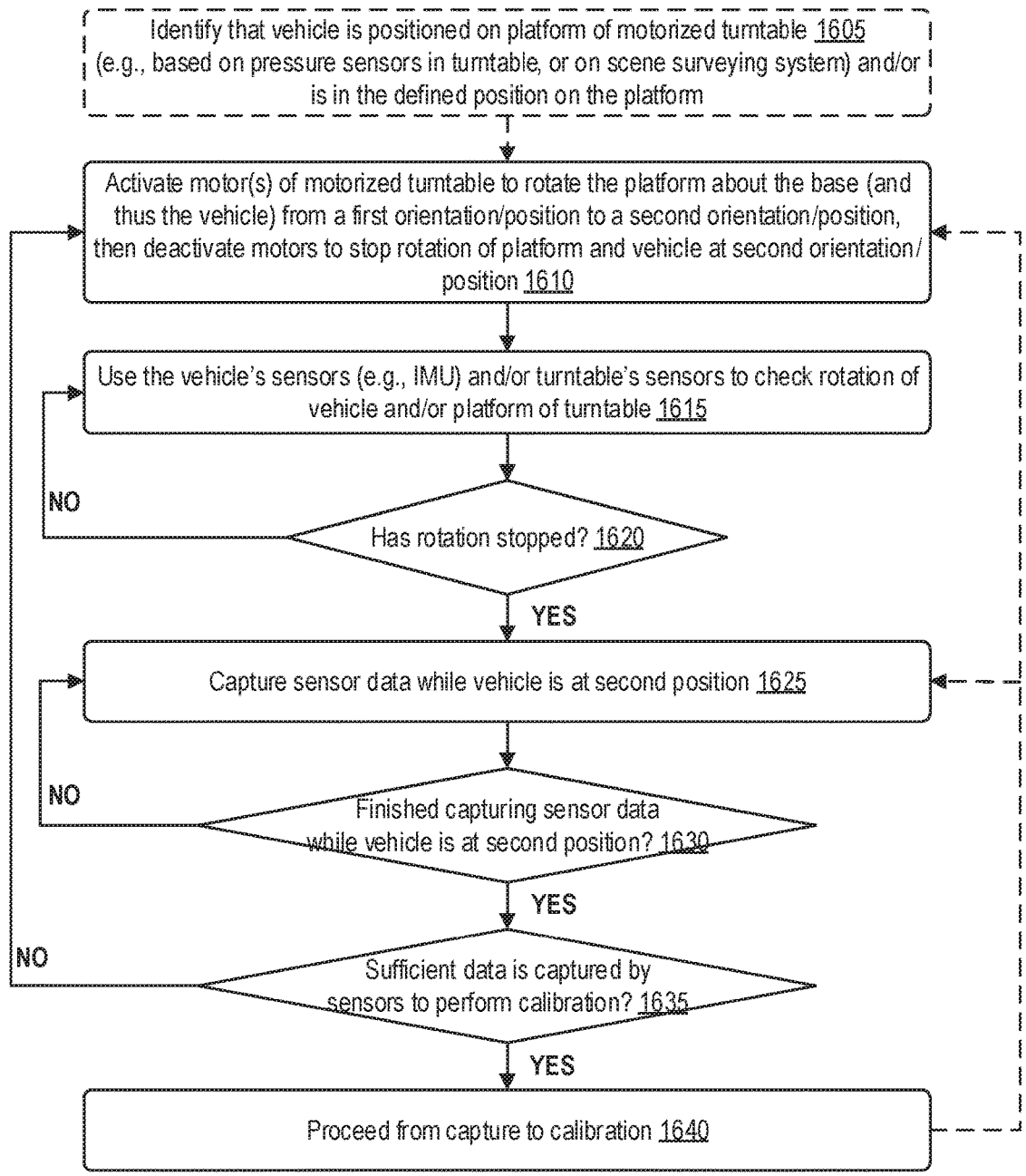

ILLUMINATED VEHICLE SENSOR CALIBRATION TARGET

TECHNICAL FIELD

The present invention generally pertains to calibration of sensors that are used by vehicles. More specifically, the present invention pertains to use calibration of vehicle sensors based on identification of illuminated sensor calibration targets by the vehicle sensors in a calibration environment.

BACKGROUND

An autonomous vehicle is a motorized vehicle that can navigate without a human driver. An exemplary autonomous vehicle includes a plurality of sensor systems, such as, but not limited to, a camera sensor system, a light detection and ranging (LIDAR) sensor system, or a radio detection and ranging (RADAR) sensor system, amongst others. The autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system. Similar sensors may also be mounted onto non-autonomous vehicles, for example onto vehicles whose sensor data is used to generate or update street maps.

A wide range of manufacturing defects or discrepancies can exist in vehicles, sensors, and mounting hardware that affixes the sensors to the vehicles. Because of these discrepancies, different sensors mounted to different vehicles may capture slightly different data, even when those vehicles are at the exact same position, and even when the vehicles are brand new. For example, a lens of one camera may be warped slightly (or include some other imperfection) compared to a lens of another camera, one vehicle may include a newer hardware revision or version of a particular sensor than another, one vehicle's roof may be a few millimeters higher or lower than another vehicle's roof, or a skewed screw used in a mounting structure for a sensor on one vehicle may tilt the mounting structure slightly. Such imperfections and variations in manufacturing can impact sensor readings and mean that there no two vehicles capture sensor readings in quite the same way, and thus no two vehicles interpret their surroundings via sensor readings in quite the same way. With use, vehicles can drift even further apart in their sensor readings due to exposure to the elements, for example through exposure to heat, rain, dust, frost, rocks, pollution, vehicular collisions, all of which can further damage or otherwise impact a vehicle or its sensor.

Sensors typically capture data and provide results in a standardized manner that does not, by itself, test or account for intrinsic properties of each sensor, such as the position and angle of the sensor or properties of a lens, or for extrinsic relationships between sensors that capture data from similar areas. Because of this, it can be unclear whether a discrepancy in measurements between two vehicles can be attributed to an actual difference in environment or simply different properties of vehicle sensors. Because autonomous vehicles are trusted with human lives, it is imperative that autonomous vehicles have as robust an understanding of their environments as possible, otherwise a vehicle might perform an action that it should not perform, or fail to perform an action that it should perform, either of which can result in a vehicular accident and put human lives at risk. Other sensor-laden vehicles, such as those that collect data for maps or street-level imagery, can produce unreliable maps or images if they cannot account for the properties of their sensors, which can then in turn confuse both human vehicles and autonomous vehicles that rely on those maps, again risking human life.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 2C illustrates a camera calibration target with a crosshair pattern on a planar substrate.

FIG. 7 illustrates a system architecture of a dynamic scene calibration environment.

FIG. 9 is a flow diagram illustrating operations for sensor target illumination.

FIG. 10 is a flow diagram illustrating operations for adjusting sensor target illumination based on ambient lighting.

FIG. 12 is a flow diagram illustrating operations for adjusting sensor target illumination based on sensor target position.

FIG. 14 is a flow diagram illustrating operations for intrinsic calibration of a vehicle sensor using a dynamic scene.

FIG. 15 is a flow diagram illustrating operations for extrinsic calibration of two sensors in relation to each other using a dynamic scene.

FIG. 16 is a flow diagram illustrating operations for interactions between the vehicle and the turntable.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technologies address a need in the art for improvements to vehicle sensor calibration technologies. Use of a dynamic calibration scene with an automated turntable or carousel system improves the functioning of sensor calibration by improving runtime-efficiency, space-efficiency, comprehensiveness of calibration, and consistency of vehicle sensor calibration. The described vehicle sensor calibration technologies ultimately transform vehicle sensors from an uncalibrated state to a calibrated state. The described vehicle sensor calibration technologies are implemented using a vehicle, the vehicle's sensors, a turntable and other potential components of a dynamic scene, one or more computing devices associated with the other components, each of which is integral at least one embodiment of the vehicle sensor calibration technologies.

An illuminated sensor target includes a light source. Actuating the light source illuminates the sensor target. The illuminated sensor target is recognized by one or more sensors of a vehicle during a calibration process, and is used to calibrate the one or more sensors of the vehicle during the calibration process. The illuminated sensor target is illuminated during at least part of the calibration process, which may involve rotation of the vehicle about a turntable, with the illuminated sensor target positioned within a range of the turntable along with other sensors targets, which may also be illuminated.

Sensors coupled to the vehicle may be calibrated using a dynamic scene with the sensor targets positioned around the turntable, the turntable motorized to rotate the vehicle to different orientations. The sensors capture data at each vehicle orientation along the rotation. The vehicle's computer identifies representations of the sensor targets within the data captured by the sensors, and calibrates the sensor based on these representations, for example by generating a transformation based on mapping positions of these representations in the data to known positions of the sensor targets, such as to correct lens distortion, the transformation applied to post-calibration sensor data.

Figure 1:
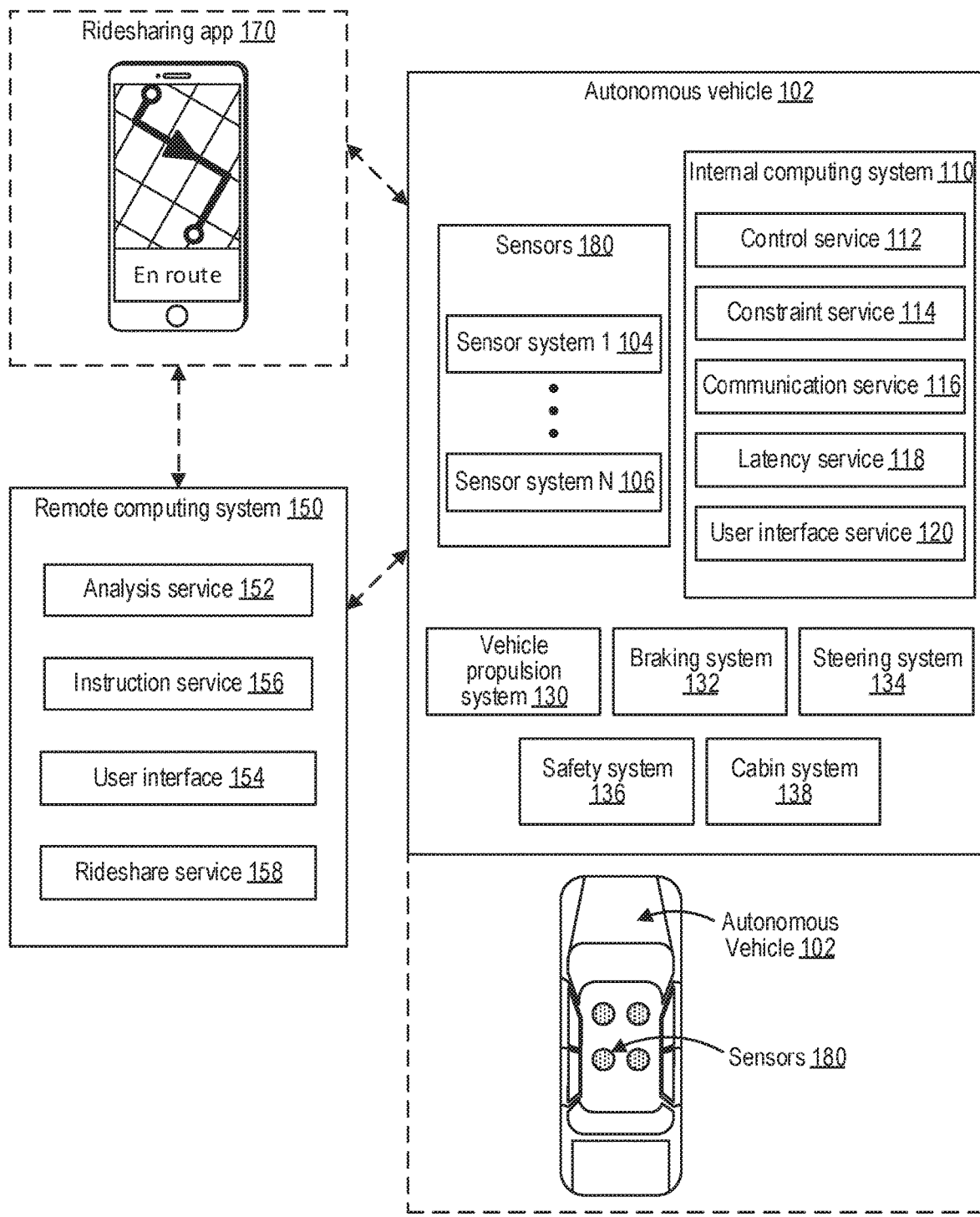
FIG. 1 illustrates an autonomous vehicle and remote computing system architecture.

FIG. 1 illustrates an autonomous vehicle and remote computing system architecture.

The autonomous vehicle 102 can navigate about roadways without a human driver based upon sensor signals output by sensor systems 180 of the autonomous vehicle 102. The autonomous vehicle 102 includes a plurality of sensor systems 180 (a first sensor system 104 through an Nth sensor system 106). The sensor systems 180 are of different types and are arranged about the autonomous vehicle 102. For example, the first sensor system 104 may be a camera sensor system and the Nth sensor system 106 may be a Light Detection and Ranging (LIDAR) sensor system. Other exemplary sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. While four sensors 180 are illustrated coupled to the autonomous vehicle 102, it should be understood that more or fewer sensors may be coupled to the autonomous vehicle 102.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. In some cases, the braking system 132 may charge a battery of the vehicle through regenerative braking. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 180 and the systems 130, 132, 134, 136, and 138. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 180 and human co-pilots, etc.

The internal computing system 110 can include a control service 112 that is configured to control operation of the vehicle propulsion system 130, the braking system 208, the steering system 134, the safety system 136, and the cabin system 138. The control service 112 receives sensor signals from the sensor systems 180 as well communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 4G, 5G, etc.) communication.

In some embodiments, one or more services of the internal computing system 110 are configured to send and receive communications to remote computing system 150 for such reasons as reporting data for training and evaluating machine learning algorithms, requesting assistance from remote computing system 150 or a human operator via remote computing system 150, software service updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

Figure 18:
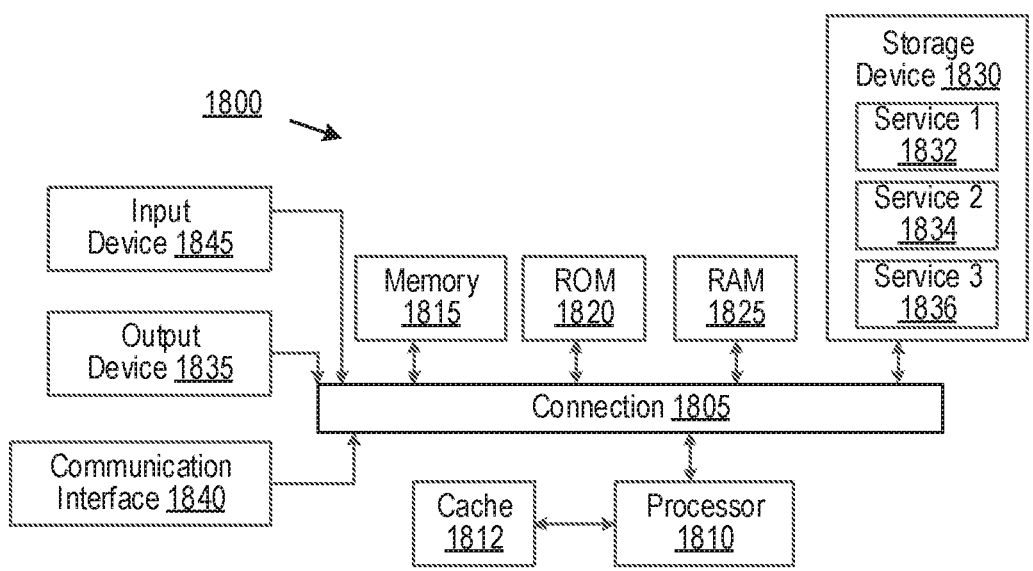
FIG. 18 shows an example of a system for implementing certain aspects of the present technology.

The internal computing system 110 can, in some cases, include at least one computing system 1800 as illustrated in or discussed with respect to FIG. 18, or may include at least a subset of the components illustrated in FIG. 18 or discussed with respect to computing system 1800.

As described above, the remote computing system 150 is configured to send/receive a signal from the autonomous vehicle 140 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc.

The rideshare service 158 as depicted in FIG. 1 illustrates a vehicle 102 as a triangle en route from a start point of a trip to an end point of a trip, both of which are illustrated as circular endpoints of a thick line representing a route traveled by the vehicle. The route may be the path of the vehicle from picking up the passenger to dropping off the passenger (or another passenger in the vehicle), or it may be the path of the vehicle from its current location to picking up another passenger.

The remote computing system 150 can, in some cases, include at least one computing system 1800 as illustrated in or discussed with respect to FIG. 18, or may include at least a subset of the components illustrated in FIG. 18 or discussed with respect to computing system 1800.

Figure 2A:
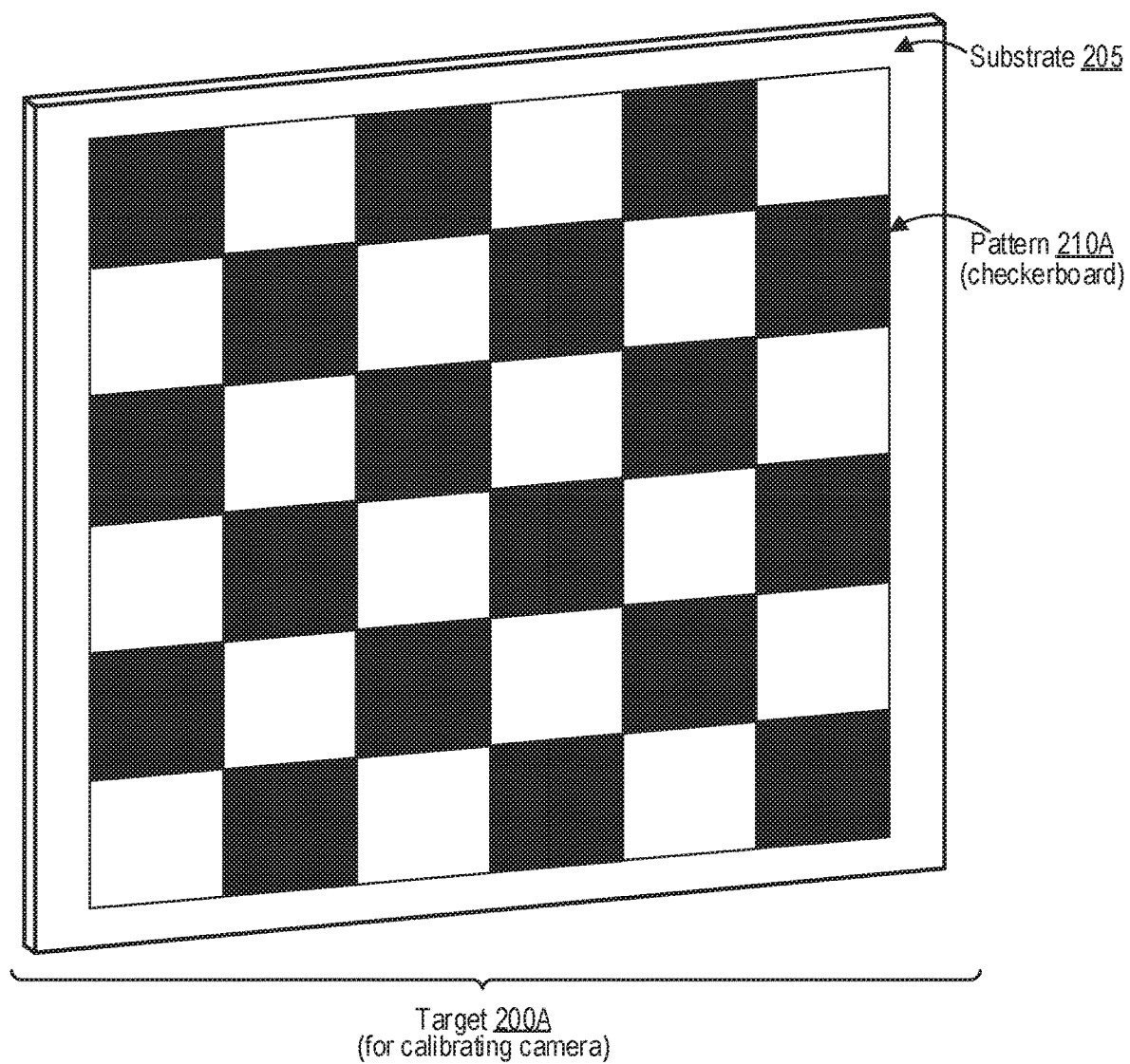
FIG. 2A illustrates a camera calibration target with a checkerboard pattern on a planar substrate.

FIG. 2A illustrates a camera calibration target with a checkerboard pattern on a planar substrate.

The sensor calibration target 220A illustrated in FIG. 2A is a planar board made from a substrate 205, with a pattern 210A printed, stamped, engraved, imprinted, or otherwise marked thereon. The pattern 210A of FIG. 2A is a checkerboard pattern. The substrate 205 may be paper, cardboard, plastic, metal, foam, or some combination thereof. The substrate 205 may in some cases include a translucent or transparent surface upon which the pattern 210A is printed, and which a light source may provide illumination through. The substrate 205 may in some cases include a retroreflective surface upon which the pattern 210A is printed. The retroreflective property of the surface may be inherent to the material of the substrate 205 or may be a separate layer applied to the surface of the substrate, for example by adhering a retroreflective material to the substrate 205 or by painting (e.g., via a brush, roller, or aerosol spray) the substrate 205 with a retroreflective paint. A reflective or retroreflective property may in some cases improve detection using radar, lidar, or other EmDAR sensors. The material and shape of the substrate 205 may also be selected such that the material and/or shape produces a high amount of acoustic resonance or acoustic response to improve detection using SONAR or SODAR sensors. In some cases, the substrate 205, and therefore the target 200A, may be concave, convex, otherwise curved, or some combination thereof. The substrate 205 may in some cases include devices, such as speakers, heat sources, or light sources, that allow improved detection by microphones, infrared sensors, or cameras, respectively.

The sensor calibration target 220A illustrated in FIG. 2A is useful for calibration of a camera of the vehicle, or other sensor that captures visual data. In particular, a camera with a pattern/image/feature recognition system running on computer system 110 can identify the checkerboard pattern 210A of FIG. 2A, and can identify points representing vertices between the dark (black) and light (white) checkers. By drawing lines connecting these points, the camera and computer system 110 can generate a grid. If the camera has a wide-angle lens, such as a fisheye lens or a barrel lens, the resulting grid will be warped so that some checkers will appear curved rather than straight, and so that checkers near the edges of the camera's point of view will appear more squashed, while checkers near the center of the camera's point of view will appear larger and more even. A rectilinear lens provides a similar, is opposite, effect. Based on prior knowledge of what the checkerboard pattern and resulting grid should look like, and its original dimensions, compared against what its representation looks like as captured by the camera, the camera and computing system 110 may identify the effect of the lens and counteract it. The camera and computing system 110 may also identify other parameters of the camera this way, such as position parameters (x, y, z, roll, pitch, yaw), any lens color to be filtered out, any crack or defect in the lens to be filtered out, or a combination thereof.

The sensor calibration target 220A illustrated in FIG. 2A is useful for detection by, and calibration of, a range sensor of the vehicle, such as a LIDAR, SONAR, SODAR, or radar sensor of the vehicle, at least in that the shape of the planar substrate 205 can be detected by the range sensor. For example, flat planar vision targets such as the target 220A can be detected by lidar by relying on planar geometry estimates and using the returned intensity. While FIG. 2A illustrates a square or rectangular substrate 205, the substrate 205 may be circular, semicircular, ellipsoidal, triangular, quadrilateral (trapezoid, parallelogram), pentagonal, hexagonal, heptagonal, octagonal, nonagonal, decagonal, otherwise polygonal, or some combination thereof.

Figure 2B:
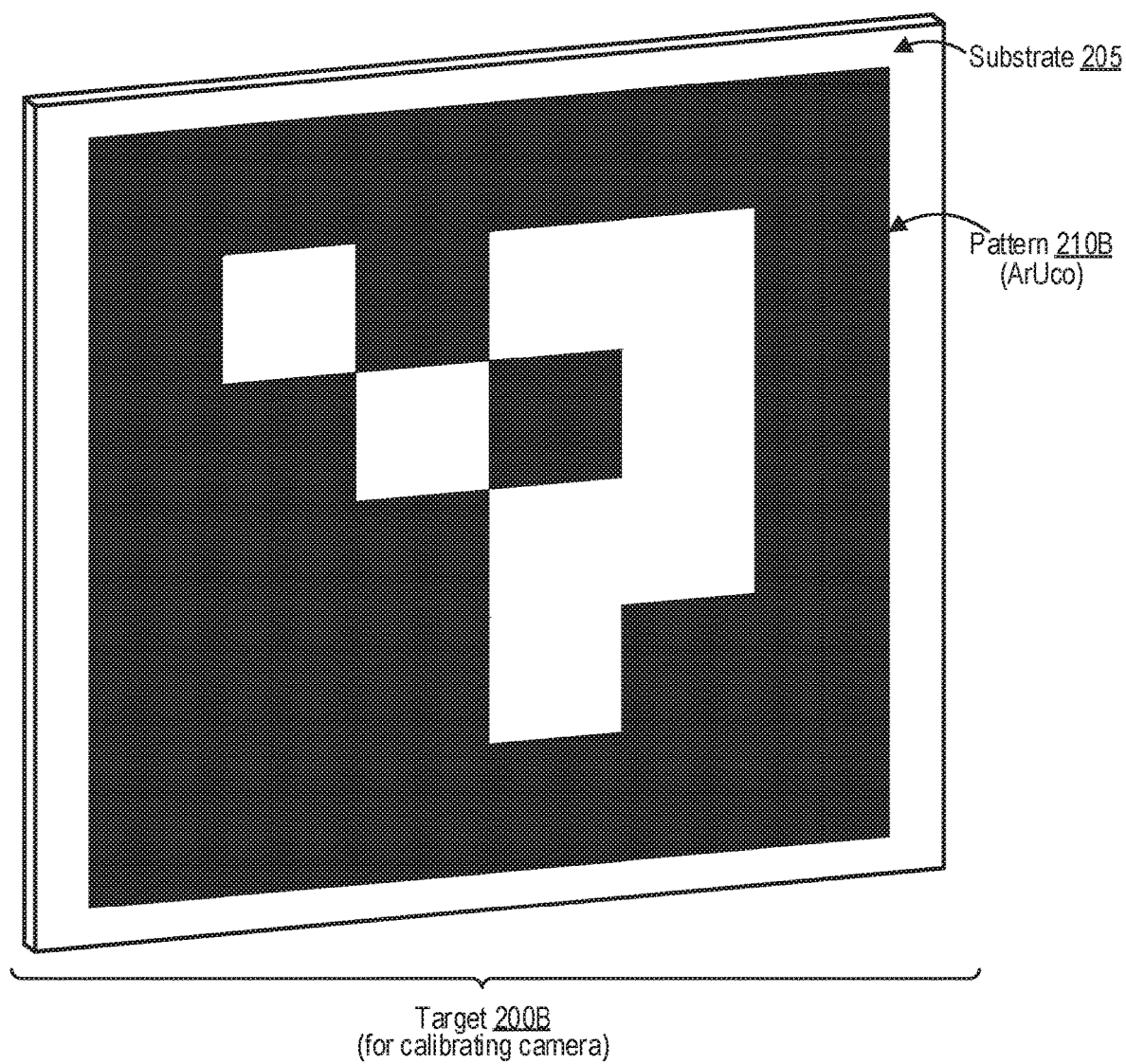
FIG. 2B illustrates a camera calibration target with a ArUco pattern on a planar substrate.

FIG. 2B illustrates a camera calibration target with a ArUco pattern on a planar substrate.

The sensor calibration target 220B illustrated in FIG. 2B, like the sensor calibration target 220A illustrated in FIG. 2A, includes a planar board made from a substrate 205, with a pattern 210B printed, stamped, engraved, imprinted, or otherwise marked thereon. The pattern 210B illustrated in FIG. 2B is an ArUco marker pattern, which includes black border and an inner binary matrix/grid (e.g., each square is dark/black or light/white) which determines its identifier.

By detecting the AuUco pattern, the camera and computing system 110 of the vehicle also identify a grid, similarly to the checkerboard, though potentially with fewer points, as some areas of the ArUco pattern may include contiguous dark/black squares or contiguous light/white squares. By identifying the grid from the representation of the ArUco target captured by the camera (e.g. with lens distortion such as parabolic distortion), and comparing it to a known reference image of the ArUco pattern (e.g., without any distortion), any distortions or other differences may be identified, and appropriate corrections may be generated to counteract these distortions or other differences.

The substrate 205 of FIG. 2B may include or be coated with any previously-discussed substrate material and may be warped or shaped in any manner or include any devices discussed with respect to the substrate 205 of FIG. 2A, and therefore may be detected by, and be useful to calibrate a range sensor of the vehicle, such as a LIDAR, SONAR, SODAR, or radar sensor of the vehicle, and may be detected by a microphone or infrared sensor of the vehicle as well.

FIG. 2C illustrates a camera calibration target with a crosshair pattern on a planar substrate.

The sensor calibration target 220C illustrated in FIG. 2B, like the sensor calibration target 220A illustrated in FIG. 2A, includes a planar board made from a substrate 205, with a pattern 210C printed, stamped, engraved, imprinted, or otherwise marked thereon. The pattern 210C illustrated in FIG. 2C is an crosshair marker pattern, which includes four dark/black lines and two dark/black circles centered on a light/white background, and with a gap in the dark/black lines near but not at the center, effectively leaving a "+" symbol in the very center.

The camera and computing system 110 can identify the target 200C by identifying the circles, the lines, and the intersections of the same. In doing so, the crosshair pattern is identified from the representation of the target 220C captured by the camera (e.g. with lens distortion), and can be compared it to a known reference image of the crosshair pattern target 200C (e.g., without any distortion). As with the checkerboard and ArUco targets, any distortions or other differences may be identified, and appropriate corrections may be generated to counteract these distortions or other differences.

The substrate 205 of FIG. 2C may include or be coated with any previously-discussed substrate material and may be warped or shaped in any manner or include any devices discussed with respect to the substrate 205 of FIG. 2A, and therefore may be detected by, and be useful to calibrate a range sensor of the vehicle, such as a LIDAR, SONAR, SODAR, or radar sensor of the vehicle, and may be detected by a microphone or infrared sensor of the vehicle as well.

While the only patterns 210A-C discussed with respect to camera sensor targets are checkerboard patterns 210A, ArUco patterns 210B, and crosshair patterns 210C, other patterns that are not depicted can additionally or alternatively be used. For example, bar codes, quick response (QR) codes, Aztec codes, Semacodes, Data Matrix codes, PDF417 codes, MaxiCodes, Shotcodes, High Capacity Color Barcodes (HCCB), or combinations thereof may be used as patterns 210 that can be recognized using the camera and computing device 110.

Figure 2D:
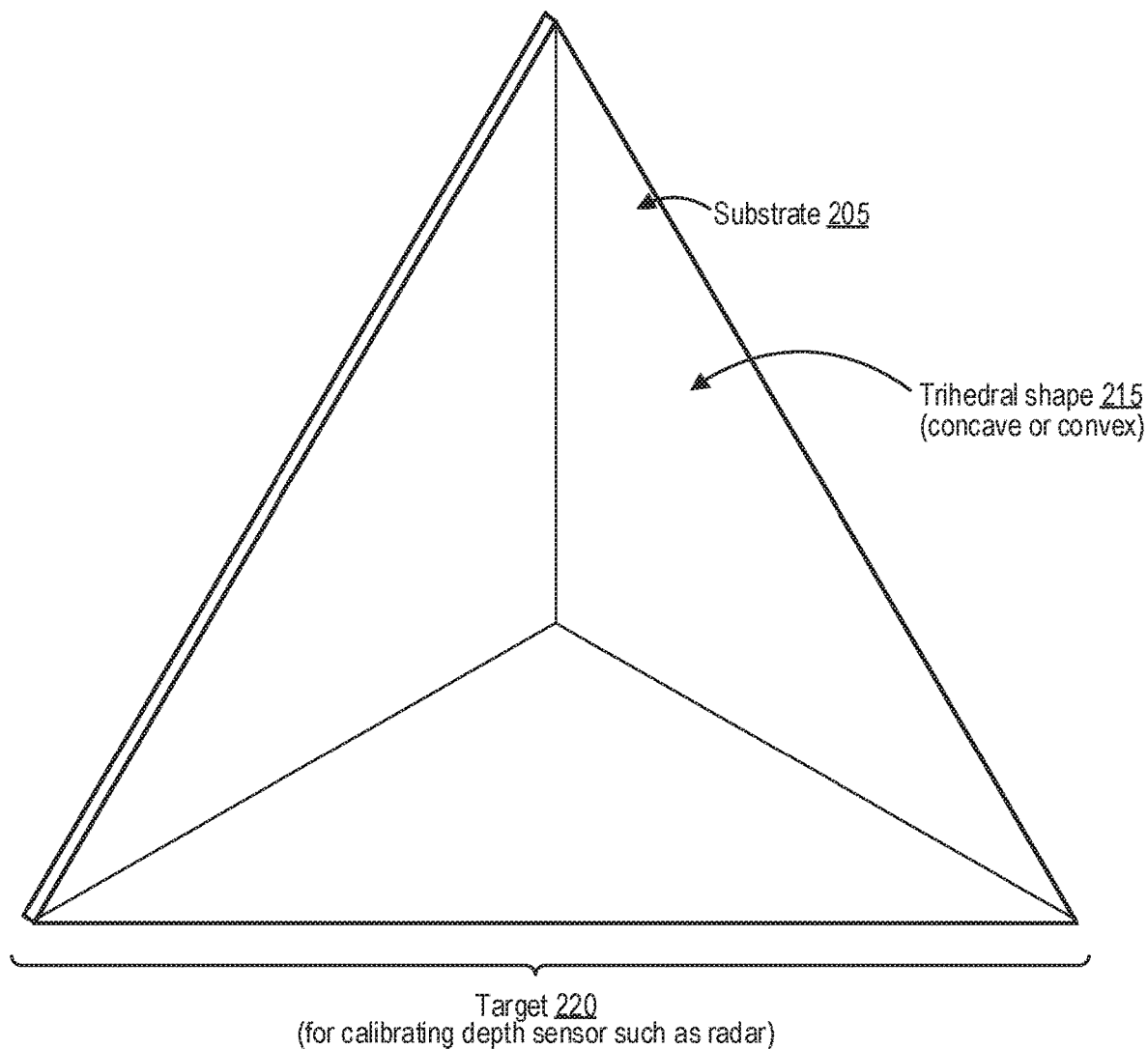
FIG. 2D illustrates a range sensor calibration target with a trihedral shape.

FIG. 2D illustrates a range sensor calibration target with a trihedral shape.

The sensor calibration target 220 of FIG. 2D is made to be detected by, and use for calibration of, a range sensor, such as a radar sensor (or LIDAR, SONAR, or SODAR) of the vehicle. In particular, the sensor calibration target 220 of FIG. 2D is trihedral in shape, and may be a concave or convex trihedral corner, essentially a triangular corner of a cube. Alternately, it may be a different shape, such as a corner of a different polyhedron (at least portions of all faces of the polyhedron that touch a particular vertex). Such a shape, especially when concave and where perpendicular faces are included, produces a particularly strong radar echo and thus a particularly strong radar cross section (RCS) because incoming radio waves are backscattered by multiple reflection. The RCS of the trihedral corner target is given by: $\sigma = (4 \cdot \pi \cdot a^4)/(3 \cdot \lambda^2)$, where a is the length of the side edges of the three triangles, and $\lambda$ is a wavelength of radar transmitter.

The substrate 205 of the sensor calibration target 220 of FIG. 2D may include or be coated with any previously-discussed substrate material and may be warped or shaped in any manner, or include any devices, discussed with respect to the substrate 205 of FIG. 2A. In one embodiment, the substrate 205 of the sensor calibration target 220 of FIG. 2D may be metal, may be electrically conductive, may be reflective or retroreflective, or some combination thereof.

Figure 2E:
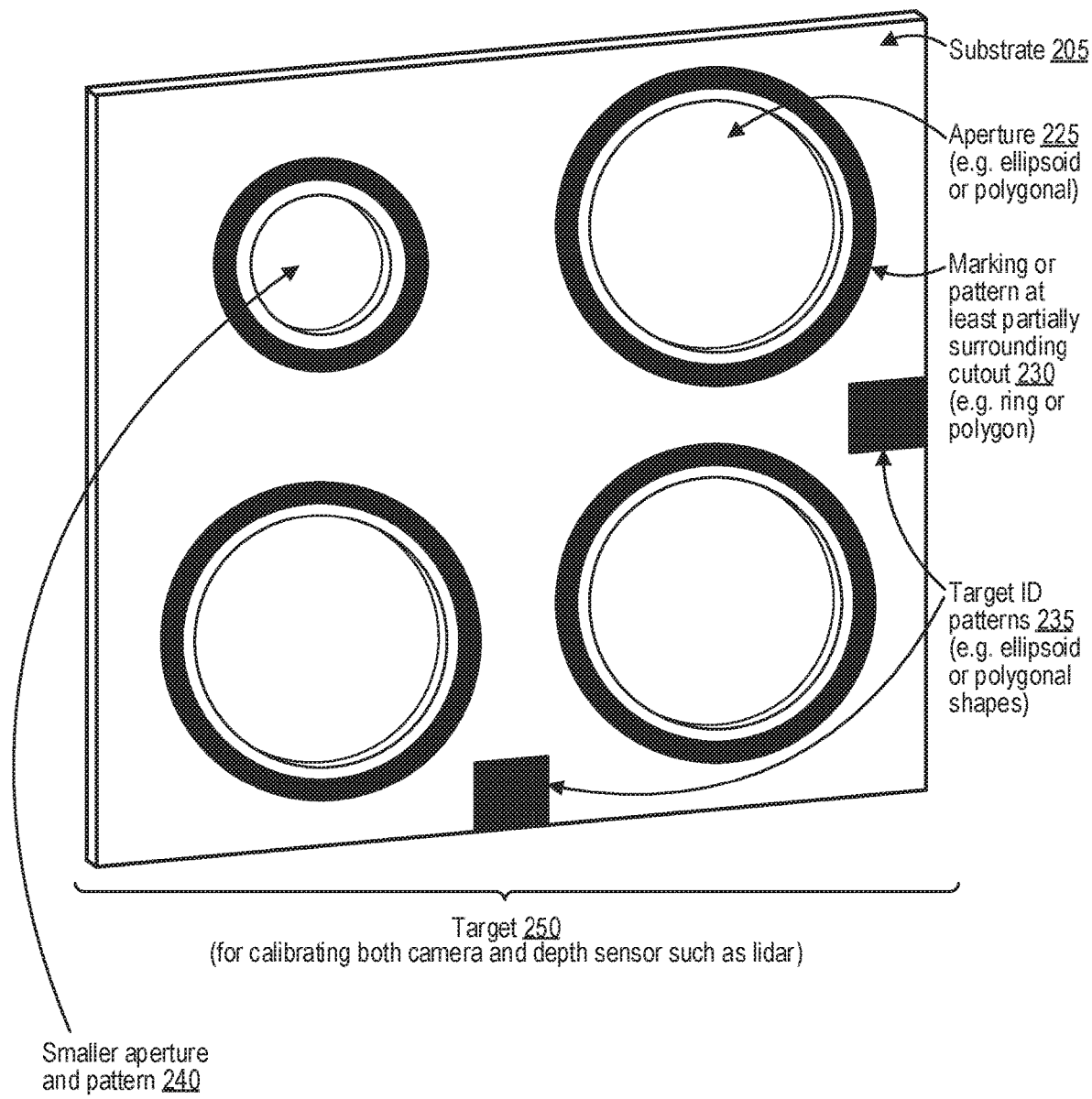
FIG. 2E illustrates a combined range sensor and camera calibration target with apertures from a planar substrate that are surrounded by visually recognizable markings.

FIG. 2E illustrates a combined range sensor and camera calibration target with apertures from a planar substrate that are surrounded by visually recognizable markings.

The combined range sensor and camera calibration target 250 of FIG. 2E includes multiple apertures 225 in a substrate 205, and includes visual markings or patterns 230 at least partially surrounding each aperture. In particular, the target 250 includes four symmetrical circular or ellipsoid apertures 225 from a light/white substrate 205 with symmetrical dark/black circular or ellipsoid rings 230 around the apertures, with three of the apertures/ring combinations being a first size (e.g., apertures being 30 cm in diameter and the corresponding rings slightly larger) and a fourth aperture/ring combination 240 being a second size (e.g., the aperture being 26 cm in diameter and the corresponding ring slightly larger). The rings around the three larger apertures 225 are likewise larger than the ring around the smaller aperture 240. In some cases, one may be larger than the other three, or two may be larger or smaller than the other two, or some combination thereof. The apertures 225/240 may alternately be referred to as cutouts, holes, voids, orifices, vents, openings, gaps, perforations, interstices, discontinuities or some combination thereof. In some cases, different types of surface discontinuities may be used instead of or in addition to the apertures 225/240, such as raised surfaces or bumps that can also be detected by depth/range sensors such as radar or lidar.

The combined range sensor and camera calibration target 250 of FIG. 2E also includes additional markings or patterns at certain edges of the substrate, identified as target identification (ID) markers 235. The particular combined range sensor and camera calibration target 250 of FIG. 2E includes target identification (ID) markers 235 on the two sides of the substrate opposite the smaller aperture/ring combination 240, but other combined range sensor and camera calibration targets 250 may have one, two, three, or four target identification (ID) markers 235 along any of the four sides of the square substrate, or may have target identification (ID) markers 235 in an amount up to the number of sides of the polygonal substrate 205 where the substrate 205 is shaped like a non-quadrilateral polygon. That is, if the substrate 205 is an octagon, each combined combined range sensor and camera calibration target 250 may have anywhere from zero to eight target identification (ID) markers 235. Different patterns of target identification (ID) markers 235 are further visible in FIG. 5.

The substrate 205 of FIG. 2E may include or be coated with any previously-discussed substrate material and may be warped or shaped in any manner or include any devices discussed with respect to the substrate 205 of FIG. 2A, and therefore may be detected by, and be useful to calibrate a range sensor of the vehicle, such as a LIDAR, SONAR, SODAR, or radar sensor of the vehicle, and may be detected by a microphone or infrared sensor of the vehicle as well.

In some cases, the combined range sensor and camera calibration target 250 may have more or fewer apertures and corresponding visual markings than the four apertures and corresponding visual markings illustrated in FIG. 2E.

Additional targets not depicted in FIG. 2A-2E may also be possible for calibration of different types of vehicle sensors. For example, targets for intrinsic or extrinsic calibration of infrared cameras or other types of infrared sensors of a vehicle 102 may include patterns formed using heating elements, optionally in front of, behind, or beside visual markings or substrate apertures or speakers for extrinsic calibration with cameras or range sensors or microphones, respectively. Targets for intrinsic or extrinsic calibration of microphones or other types of audio sensors of a vehicle 102 may include speakers or patterns formed using speakers, optionally in front of, behind, or beside visual markings or substrate apertures or heating elements for extrinsic calibration with cameras or range sensors or infrared sensors, respectively.

Figure 3:
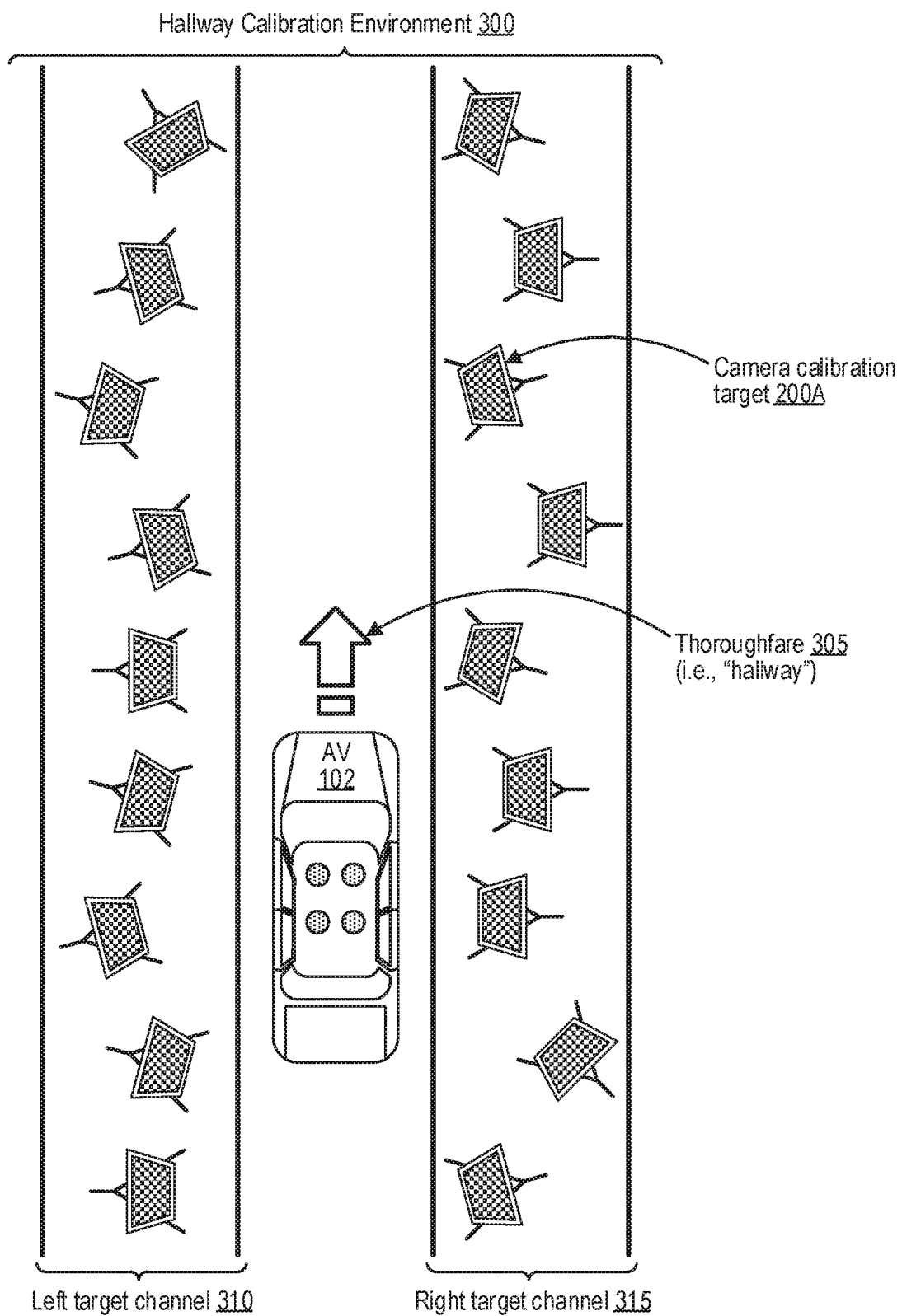
FIG. 3 illustrates a top-down view of a hallway calibration environment in which a vehicle traverses a drive path along which the vehicle is flanked by vehicle sensor calibration targets.

FIG. 3 illustrates a top-down view of a hallway calibration environment in which a vehicle traverses a drive path along which the vehicle is flanked by vehicle sensor calibration targets.

The hallway calibration environment 300, which may also be referred to as a tunnel calibration environment, includes a thoroughfare 305 through which a vehicle 102 drives, the thoroughfare 305 flanked on either side by targets detectable by the sensors 180 of the vehicle 102. The thoroughfare 305 may also be referred to as the drive path, the drive channel, the hallway, or the tunnel. Some of the targets are arranged in a left target channel 310 that is to the left of the vehicle 102 as the vehicle 102 traverses the thoroughfare 305. Others of the targets are arranged in a right target channel 315 that is to the right of the vehicle 102 as the vehicle 102 traverses the thoroughfare 305. In FIG. 3, the targets in the left target channel 310 and right target channel 315 are all checkerboard camera targets 200A as illustrated in FIG. 2A, but they may include any other type of target discussed herein that is used to calibrate any vehicle sensor or combination of vehicle sensors. The left target channel 310 and right target channel 315 may include a combination of different target types, similarly to the calibration environment of FIG. 6; the targets need not all be of a uniform type as illustrated in FIG. 3.

The vehicle 102 drives along the thoroughfare 305, stopping after incremental amounts, for example, every foot, every N feet, every meter, or every N meters, where N is a number greater than zero, such as 1, 2, 3, 4, 5, 6, 7, 8, 9, or 10. At each stop, the vehicle 102 captures data using each of its vehicle sensors, or at least each of the vehicle sensors that it intends to calibrate. The vehicle 102 stopping helps prevent issues caused by sensors running while the vehicle 102 is in motion, such as motion blur or rolling shutter issues in cameras. The vehicle 102 stopping also ensures that sensors can capture data while the vehicle 102 is in the same position, which may be important for extrinsic calibration of two or more sensors with respect to each other so that a location within data gathered by a first vehicle sensor (e.g., a range sensor such as a LIDAR or radar sensor) can be understood to correspond to a location within data gathered by a second vehicle sensor (e.g., a camera). The vehicle 102 may in some cases traverse the thoroughfare 305 multiple times, for example N times in each direction, where N is, for example, 1, 2, 3, 4, 5, 6, 7, 8, 9, 10, 11, 12, 13, 14, 15, 16, 17, 18, 19, or 20.

The sensor targets illustrated in FIG. 3 are illustrated as each mounted on separate easel-style stands. Other types of stands are also possible, such as the type illustrated in FIG. 4 and FIG. 5. Furthermore, multiple sensor targets, of the same type or of different types may be supported by each stand (as in FIG. 4 and FIG. 5) even though this is not illustrated in FIG. 3.

The sensor targets illustrated in FIG. 3 are illustrated such that some are positioned closer to the thoroughfare 305 while some are positioned farther from the thoroughfare 305. Additionally, while some targets in FIG. 3 are facing a direction perpendicular to the thoroughfare 305, others are angled up or down with respect to the direction perpendicular to the thoroughfare 305. While the sensor targets illustrated in FIG. 3 all appear to be at the same height and all appear to not be rotated about an axis extending out from the surface of the target, it should be understood that the sensor targets may be positioned at different heights and may be rotated about an axis extending out from the surface of the target as in the targets of FIG. 4 and FIG. 5. Together, the distance from the thoroughfare 305, the direction faced relative to the thoroughfare 305, the clustering of targets, the height, and the rotation about an axis extending out from the surface of the target may all be varied and modified to provide better intrinsic and extrinsic calibration. That is, these variations assist in intrinsic calibration in that collection of data with representations of targets in various positions, rotations, and so forth ensures that targets are recognized as they should be by any sensor, even in unusual positions and rotations, and that any necessary corrections be performed to data captured by sensors after calibration. These variations assist in extrinsic calibration in that the different positions and rotations and so forth provide more interesting targets for range sensors, such as lidar, radar, sonar, or sodar, and allow range sensors to aid in interpretation of optical data collected by a camera of the vehicle 102.

While the thoroughfare 305 of the hallway calibration environment 300 of FIG. 3 is a straight path, in some cases it may be a curved path, and by extension the left target channel 310 and right target channel 315 may be curved to follow the path of the thoroughfare 305.

While the hallway calibration environment 300 is effective in providing an environment with which to calibrate the sensors 180 of the vehicle 102, it is inefficient in some ways. The hallway calibration environment 300 is not space efficient, as it occupies a lot of space. Such a hallway calibration environment 300 is best set up indoors so that lighting can be better controlled, so the hallway calibration environment 300 requires a large indoor space, and by extension, a lot of light sources, which is not energy-efficient or cost-efficient. Because of how much space the hallway calibration environment 300 takes up, it is more likely to have to be taken down and set back up again, affecting consistency of calibration between different vehicles whose sensors are calibrated at different times. Further, because the setup of the hallway calibration environment 300 requires the vehicle 102 to drive through it, different vehicles 102 might be aligned slightly differently in the thoroughfare 102, and might drive a slightly different path through the thoroughfare 102, and might stop at slightly different spots and/or frequencies along the drive, due to manufacturing differences in the vehicle 102 and due to human error in setting the vehicle 102 up, all of which affects consistency of the calibration. Trying to correct for all of these potential inconsistencies, and turning the vehicle around to move it through the hallway calibration environment 300 multiple times, is time and labor intensive, making the hallway calibration environment 300 time-inefficient. Additionally, because the targets are primarily to the left and right sides of the vehicle 102 hallway calibration environment 300, vehicle sensors might not be as well calibrated in the regions to the front and rear of the vehicle. Using a thoroughfare 305 with some turns can help alleviate this, but again causes the hallway calibration environment 300 to take up more space, increasing space-inefficiency.

Figure 4:
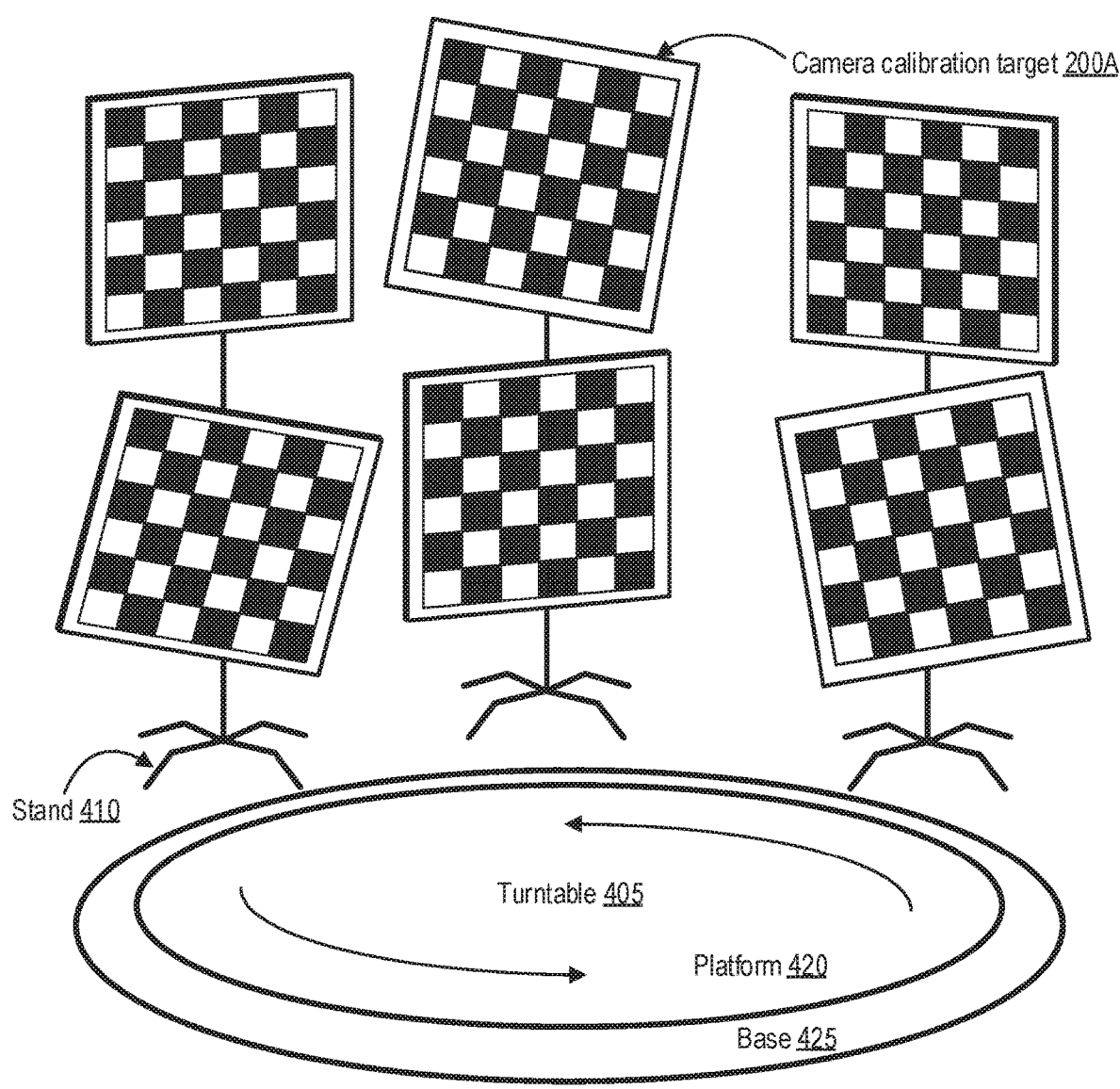
FIG. 4 illustrates a perspective view of a dynamic scene calibration environment in which a turntable that is at least partially surrounded by vehicle camera calibration targets rotates a vehicle so that the vehicle can perform intrinsic calibration of its camera sensors.

FIG. 4 illustrates a perspective view of a dynamic scene calibration environment in which a turntable that is at least partially surrounded by vehicle camera calibration targets rotates a vehicle so that the vehicle can perform intrinsic calibration of its camera sensors.

The dynamic scene calibration environment 400 of FIG. 4 includes a motorized turntable 405 with a platform 420 that rotates about a base 425. In some cases, the platform 420 may be raised above the floor/ground around the turntable 405, with the base 425 gradually inclined up to enable the vehicle 102 to drive up the base 425 and onto the platform 420, or to drive off of the platform 420 via the base 425. A vehicle 102 drives onto the platform 420 of the turntable 405, and the motors actuate to rotate platform 420 of the turntable 405 about the base 425, and to thereby rotate the vehicle 102 relative to the base 425 (and therefore relative to the floor upon which the base 425 rests). While the arrows on the turntable 405 show a counter-clockwise rotation of the platform 420, it should be understood that the platform 420 of the motorized turntable 405 can be actuated to rotate clockwise as well. The turntable 405 is at least partially surrounded by targets mounted on stands 410. In FIG. 4, the illustrated targets are all checkerboard-patterned camera calibration targets 200A as depicted in FIG. 2A, allowing for calibration of cameras of the vehicle 102. In other embodiments, such as in FIG. 5, the targets around the motorized turntable may include any other type of target discussed herein that is used to calibrate any vehicle sensor or combination of vehicle sensors.

In one embodiment, the platform 420 of the motorized turntable 405 may be rotated by predetermined intervals (measured in degrees/radians or an amount at a time), for example intervals of ten degrees, in between point the turntable stops so that the vehicle 102 can capture data with its sensors 180. The platform 420 of the motorized turntable 405 can start and stop in this manner, and can eventually perform a full 360 degree rotation in this manner. The motorized turntable 405 may in some cases perform multiple full 360 degree rotations in one or both rotation directions (clockwise and counterclockwise), for example N rotations in each rotation direction, where N is, for example, 1, 2, 3, 4, 5, 6, 7, 8, 9, 10, 11, 12, 13, 14, 15, 16, 17, 18, 19, or 20.

Figure 5:
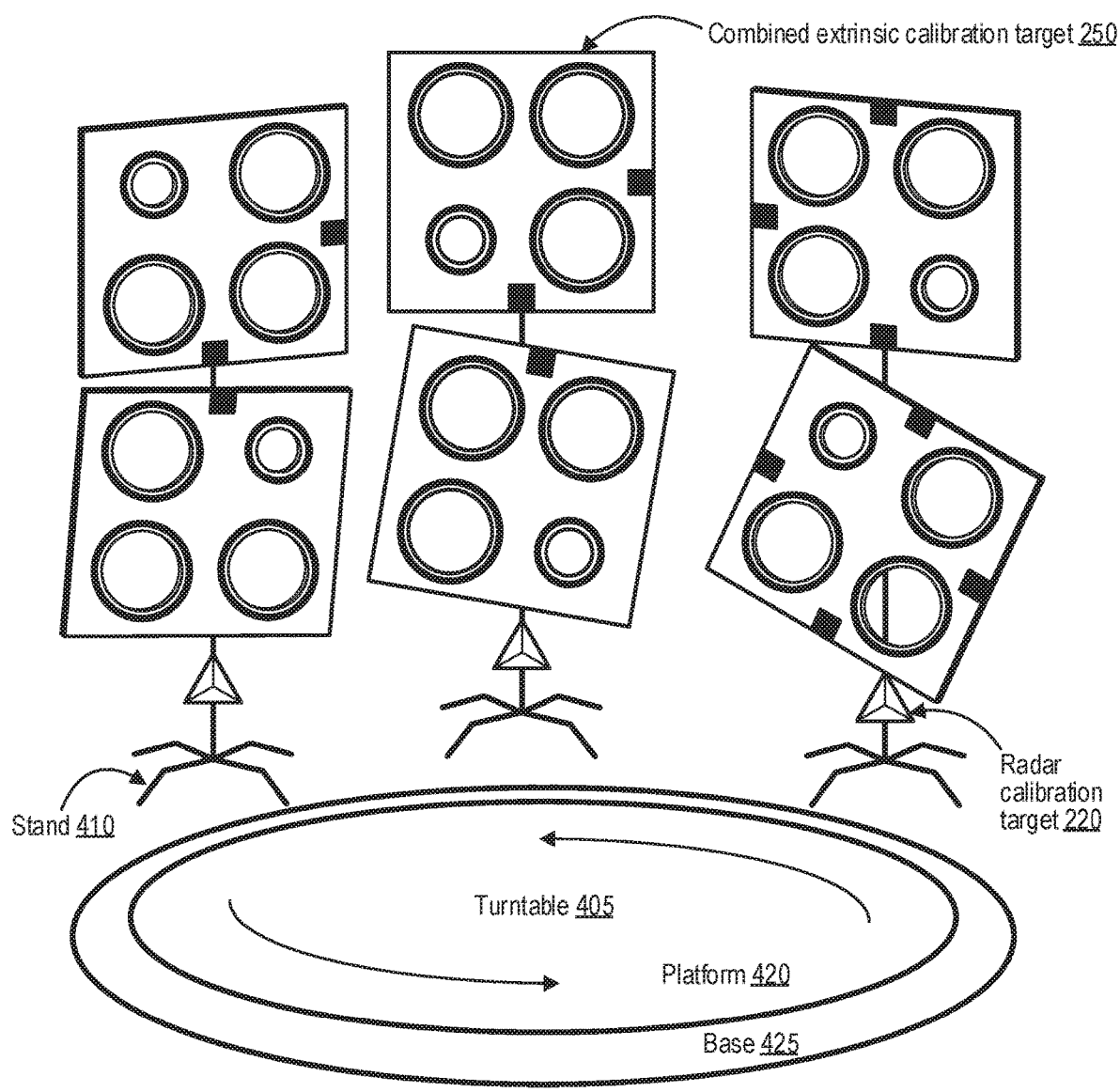
FIG. 5 illustrates a perspective view of a dynamic scene calibration environment in which a turntable that is at least partially surrounded by combined vehicle range sensor and vehicle camera calibration targets rotates a vehicle so that the vehicle can perform extrinsic calibration of its range sensors and camera sensors.

FIG. 5 illustrates a perspective view of a dynamic scene calibration environment in which a turntable that is at least partially surrounded by combined vehicle range sensor and vehicle camera calibration targets rotates a vehicle so that the vehicle can perform extrinsic calibration of its range sensors and camera sensors.

The dynamic scene calibration environment 500 of FIG. 5 includes the same motorized turntable 405 as in FIG. 4. A vehicle 102 drives onto the platform 420 of the turntable 405, and the motors actuate to rotate the platform 420 of the turntable 405, and thereby rotate the platform 420 (and the vehicle 102) about the base 425, clockwise, counter-clockwise, or one then the other. The turntable 405 is at least partially surrounded by targets mounted on stands 410. In FIG. 5, the illustrated targets include both a set of combined range/camera extrinsic calibration targets 250 as depicted in FIG. 2E and a set of trihedral radar calibration targets 220 as depicted in FIG. 2D. Each stand 410 mounts two combined range/camera extrinsic calibration targets 250 and one trihedral radar calibration targets 220, which in some cases may be a known distance from the combined range/camera extrinsic calibration targets 250 on the stand 410, permitting extrinsic calibration between the radar and the range sensor (lidar, radar, sonar, sodar) and/or camera calibrated using the combined range/camera extrinsic calibration targets 250.

As the vehicle 102 rotates about the base 425 on the platform 420 of the motorized turntable 405, and/or during stops between rotations, the vehicle 102 and its computer 110 can detect the combined range/camera extrinsic calibration targets 250 using both its range sensors (e.g., lidar, etc.) and cameras by detecting the apertures 225 with the range sensors and the markings 230 around the apertures and the target identifier markings 235 with the cameras. In doing so, the vehicle 102 and its computer 110 can detect a center of the circular aperture 225 easily, since range sensors such as lidar typically provide a point cloud of depth measurements that can help identify where the widest pats of each circle are. The rings 230 detected by the camera will also have the same centers as the apertures, so the range sensor and camera know they are looking at the exact same locations for each of these center points. Thus, the camera and range sensor may be extrinsically calibrated so that their positional awareness of the surroundings of the vehicle 102 can be positionally aligned. The extrinsic calibration may, in some cases, output one or more matrices (e.g., one or more transformation matrices) used for transforming a camera location to a range sensor location or vice versa, via translation, rotation, or other transformations in 3D space. Calibration affects interpretation of data captured by the sensors after calibration is complete. The transformation(s) that are generated during this extrinsic calibration can include one or more types of transformations, including translations, stretching, squeezing, rotations, shearing, reflections, perspective distortion, distortion, orthogonal projection, perspective projection, curvature mapping, surface mapping, inversions, linear transformations, affine transformations, The translational and rotational transformations may include modifications to position, angle, roll, pitch, yaw, or combinations thereof. In some cases, specific distortions may be performed or undone, for example by removing distortion (e.g., parabolic distortion) caused by use of a specific type of lens in a camera or other sensor, such as a wide-angle lens or a fisheye lens or a macro lens.

The transformation(s) generated by the computer 110 of the vehicle 102 may be used for extrinsic calibration of a first sensor (e.g., the camera) with respect to a second sensor (e.g., LIDAR or RADAR or SONAR or SODAR or another range sensor), so that the computer 102 can map positions identified in the data output from each sensor to the real world environment around the vehicle 102 (e.g., in the field of view of the sensors 180 of the vehicle 102) and relative to each other, based on known relative positions of features identified within the outputs of each sensor. Such features may include the visual markings of the combined target 250 as identified by the camera, the apertures as identified by the range sensor, and optionally a trihedral target 220 affixed near or on the target 250 as in the environment 500 of FIG. 5. For example, if translation of positions in data captured by the first sensor to positions in the real world around the vehicle are already clear through intrinsic calibration, but translation of positions in data captured by the second sensor to positions in the real world around the vehicle are already clear through intrinsic calibration (or vice versa), then the transformation generated through this extrinsic calibration can translate positions in data captured by the second sensor to positions in the real world around the vehicle based on (1) the position in the real world around the vehicle of the data from the first sensor, and (2) the relative positioning of the position in the data from the first sensor and the position in the data from the second sensor. Thus, a sensor that has not been intrinsically calibrated can still be calibrated extrinsically relative to another sensor, and can still benefit from the increase in accuracy granted by the intrinsic calibration of that other sensor.

The trihedral targets 220 can also have a known distance from the combined range/camera extrinsic calibration targets 250, and in some cases specifically from the centers of the apertures 225 and rings 230 of the targets 250, allowing extrinsic calibration between the range sensor (e.g., radar) that recognizes the trihedral targets 220 and the range sensor (e.g., lidar) that recognizes the apertures 225 and the camera that recognizes the rings/markings 230.

In other embodiments, the targets around the motorized turntable 405 may include any other type of target discussed herein that is used to calibrate any vehicle sensor or combination of vehicle sensors, such as the target 200A of FIG. 2A, the target 200B of FIG. 2B, the target 200C of FIG. 2C, the target 220 of FIG. 2D, the target 250 of FIG. 2E, targets with heating elements detectable by infrared sensors of the vehicle 102, targets with speakers detectable by microphones of the vehicle 102, targets with reflective acoustic properties detectable by SONAR/SODAR/ultrasonic/infrasonic sensors of the vehicle 102, or some combination thereof.

The stands 410 used in FIG. 3-6 may include any material discussed with respect to the substrate 205, such as paper, cardboard, plastic, metal, foam, or some combination thereof. In some cases, certain stands may be made of a plastic such polyvinyl chloride (PVC) to avoid detection by certain types of range sensors, such as radar, which detect metal better than plastic.

In one embodiment, the platform 420 of the motorized turntable 405 may be rotated about the base 425 by predetermined intervals (measured in degrees/radians or an amount at a time), for example intervals of ten degrees, in between point the turntable stops so that the vehicle 102 can capture data with its sensors 180. The intervals may be N degrees, where N is, for example, 1, 2, 3, 4, 5, 6, 7, 8, 9, 10, 11, 12, 13, 14, 15, 16, 17, 18, 19, or 20. The platform 420 of the motorized turntable 405 can start and stop its rotation via activation and deactivation of its motor(s) 730 in this manner, and can eventually perform a full 360 degree rotation in this manner. The platform 420 of the motorized turntable 405 may in some cases perform multiple full 360 degree rotations about the base 425 in one or both rotation directions (clockwise and counterclockwise), for example N rotations in each rotation direction, where N is, for example, 1, 2, 3, 4, 5, 6, 7, 8, 9, 10, 11, 12, 13, 14, 15, 16, 17, 18, 19, or 20.

Figure 6:
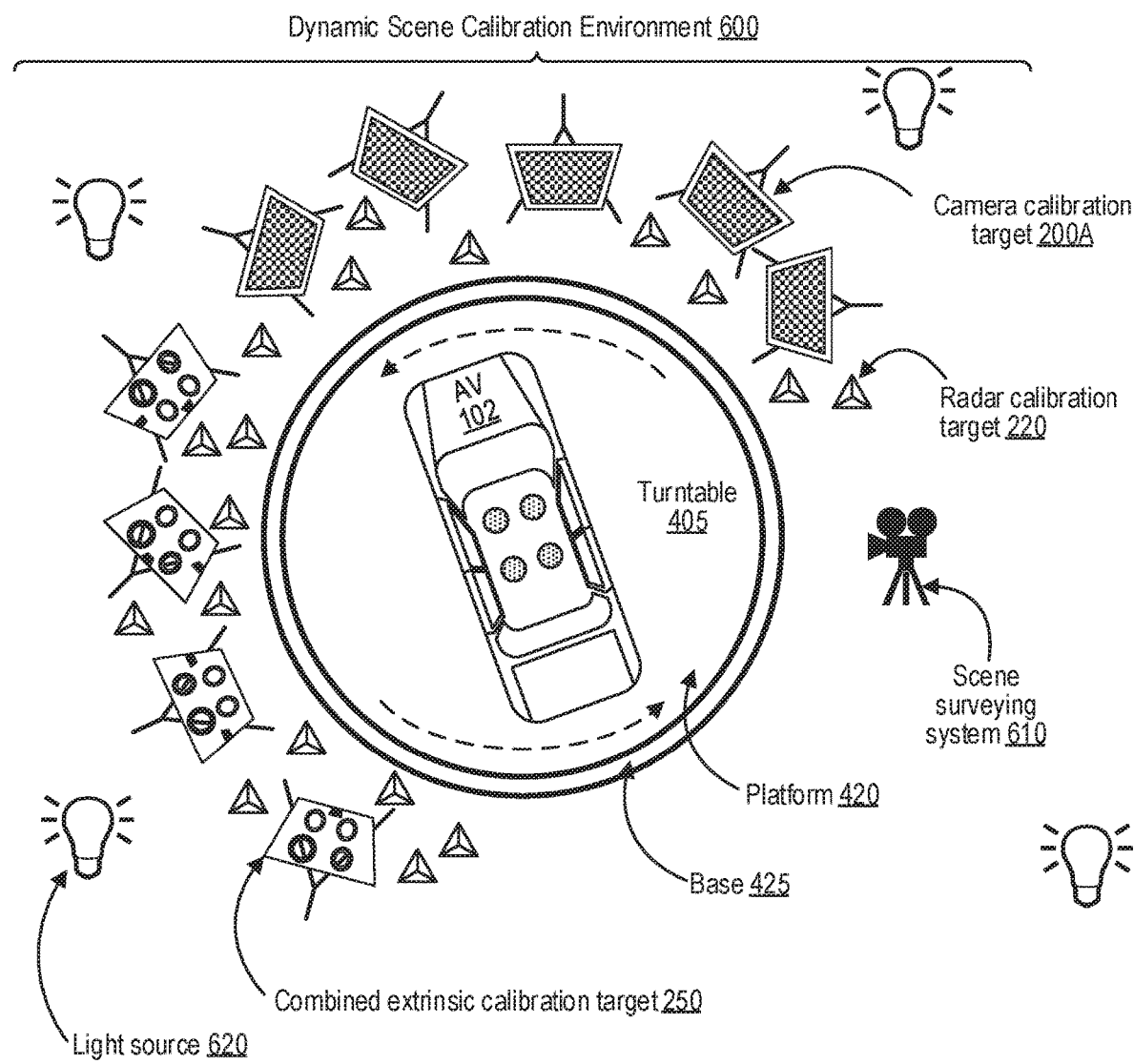
FIG. 6 illustrates a top-down view of a dynamic scene calibration environment in which a turntable that is at least partially surrounded by both vehicle camera calibration targets and combined vehicle range sensor and vehicle camera calibration targets rotates a vehicle so that the vehicle can perform both intrinsic calibration of its camera sensors and extrinsic calibration of its range sensors and camera sensors.

FIG. 6 illustrates a top-down view of a dynamic scene calibration environment in which a turntable that is at least partially surrounded by both vehicle camera calibration targets and combined vehicle range sensor and vehicle camera calibration targets rotates a vehicle so that the vehicle can perform both intrinsic calibration of its camera sensors and extrinsic calibration of its range sensors and camera sensors.

The dynamic scene calibration environment 600 of FIG. 6 is, in some ways, of a combination of the dynamic scene calibration environment 400 of FIG. 4 and the dynamic scene calibration environment 500 of FIG. 5 in that three types of targets are positioned around the motorized turntable 405. These three types of targets include the checkerboard-patterned camera calibration targets 200A used in the dynamic scene calibration environment 400 of FIG. 4 and the trihedral radar calibration targets 220 and combined extrinsic calibration targets 250 used in the dynamic scene calibration environment 500 of FIG. 5. In FIG. 6, all three types of targets stand separately from each other.

Any of the stands used in FIG. 3-6 may be any type of stands, such as easel-type stands, tripod-type stands, or the rod stands 410 with wide bases seen in FIG. 4 and FIG. 5. Any of the stands used in FIG. 3-6 may include paper, cardboard, plastic, metal, foam, or some combination thereof as previously discussed. The stands in some cases may include motors and actuators enabling positions and/or angles of rotation of targets to be manipulated, for example to be more clearly visible given lighting conditions supplied by light sources 620, or to access aa region of a point of view of a particular vehicle sensor from which that vehicle sensor has not captured enough data and therefore around which the vehicle sensor is under-calibrated. In some cases, these motors and their actuators may be controlled wirelessly by the vehicle 102 and/or scene surveying system 610 as discussed further with respect to FIG. 7 and FIG. 17A-B.

The dynamic scene calibration environment 600 of FIG. 6 also includes a scene surveying system 610, which may include one or more cameras, one or more range sensors (e.g., radar, lidar, sonar, sodar, laser rangefinder). This may take the form of a robotic total station (RTS). While the vehicle 102, its sensors 180, and the targets are enough to perform intrinsic calibration of sensors to correct for distortions, for example, and to perform extrinsic calibration of sensors to align locations within data captured by different sensors, for example, in some cases more information may be needed to understand how far these locations within data captured by different sensors are from the vehicle itself. The scene surveying system 610 captures visual and/or range data of at least a subset of the dynamic scene calibration environment 600, including the motorized turntable 410, at least some of the targets, and the vehicle 102 itself. Key points on the vehicle 102 may be tracked to identify the current pose (rotation orientation/position) of the vehicle 102 (and therefore of the platform 420 about the base 425). Data captured by the scene surveying system 610 can also be sent to the vehicle 102 and used to verify the data captured by the sensors and the intrinsic and extrinsic calibrations performed based on this data. The dynamic scene calibration environment 600 also includes several light sources 620 set up around the turntable 405. These light sources 620 may include any type of light source, such as incandescent bulbs, halogen bulbs, light emitting diodes (LEDs), and so forth. In some cases, the light sources 620 may include stage lights or spotlights. Mirrors and/or lenses may be used to manipulate light from the light sources 620 to relatively evenly illuminate the targets and/or the dynamic scene calibration environment 600 as a whole. Additional light sources may be positioned over the turntable 405 or behind some or all targets, especially if targets use a transparent or translucent substrate. The light sources 620 are used to improve readings from cameras of the vehicle and of the scene surveying system 610, and can in some cases be controlled wirelessly by the vehicle 102 and/or scene surveying system 610 as discussed further with respect to FIG. 7 and FIG. 17A-B.

By including targets for intrinsic sensor calibration as well as targets for extrinsic calibration around the turntable 405, the sensors 180 of the vehicle 102 can receive a comprehensive calibration in the dynamic scene calibration environment 600. The dynamic scene calibration environments 400, 500, and 600 of FIGS. 4-6 have several advantages over the static hallway calibration environment 300 of FIG. 3. First, the dynamic scene calibration environment is more space-efficient, as it only requires space for the vehicle turntable 405, space for some targets, light sources 620, and scene surveying system 610. There is no need to clear space for a thoroughfare 305 or other long path. Because fewer light sources 620 are needed to light a smaller space like the dynamic scene calibration environment 600 than a larger space like the hallway calibration environment 300, the dynamic scene calibration environment 600 is more energy-efficient in terms of lighting. Because the vehicle engine can be turned off after the vehicle is on the turntable 405, the dynamic scene calibration environment 600 is more energy-efficient in terms of vehicular power usage. Because changing rotation directions is considerably quicker than performing a U-turn in a vehicle to change driving directions, and because a smaller space is more likely to remain untouched and therefore won't need take-down and setup after and before each use, the dynamic scene calibration environment 600 is more time-efficient. Because the target and lighting setup, and the movement of the vehicle 102, can be better controlled, the calibration results are more consistent across vehicles 102, which further allows calibration configurations of different vehicles 102 to be more readily compared and outliers identified as potentially symptomatic of a sensor defect or a miscalibration issue. Presence of guide railings (not shown) along the platform of the turntable may further increase consistency of calibration by increasing consistency of positioning of the vehicle 102 along the platform of the turntable 405. The dynamic scene calibration environment 600 also allows the sensors 180 of the vehicle 102 to capture data all around the vehicle 102—including in the front and rear of the vehicle 102, which receive less data in the hallway calibration environment 300.

FIG. 7 illustrates a system architecture of an dynamic scene calibration environment.

The system architecture 700 of the dynamic scene calibration environment of FIG. 7 includes a number of main elements, each with sub-components. The main elements include the autonomous vehicle 102, a dynamic scene control bridge 710, the motorized turntable system 450, a lighting system 760, a target control system 770, a scene surveying system 610, a robotic scene control system 790, and a power supply system 702.

The autonomous vehicle 102 includes the one or more sensors 180, the one or more internal computing devices 110, one or more wireless transceivers 705 (integrated with communication service 116), and any other elements illustrated in and discussed with respect to FIG. 1. The sensors 180 may in some cases include one or more GPRS receivers, Bluetooth® beacon-based positioning receivers, an inertial measurement unit (IMU), one or more cameras, one or more lidar sensors, one or more radar sensors, one or more sonar sensors, one or more sodar sensors, and/or one or more other sensors discussed herein, which may in some cases be used to identify when the vehicle 102 is not on the platform 420, when the vehicle 102 is on the platform 420, when the vehicle 102 in a defined position on the platform (e.g., optionally as guided by guide railings on the platform), when the vehicle 102 have begun rotating from a stopped position, and/or when the platform 420 and/or the vehicle 102 have stopped rotating. The computing device 110 of the vehicle 102 (or its sensors 180) may then automatically communicate one or more signals or messages through wired and/or wireless communication interfaces, for instance through the wireless transceiver 705, to the bridge 710, the computing device 110 of the vehicle 102 (if the communication is straight from the sensors 180), and/or the computing device 745 of the motorized turntable system 405 to convey any of these observations/detections/identifications by the sensors 180, which may be used to trigger various actions, such as rotation or stop of rotation of the turntable 405, collection of sensor data or stop of collection of sensor data at the vehicle 102, or some combination thereof.

The dynamic scene control bridge 710 includes one or more computing devices 715 and one or more wired and/or wireless transceivers 720. The dynamic scene control bridge 710 is optional, but can serve as a "middleman" or "router" between the autonomous vehicle 102 and the remaining main elements of the system architecture 700, such as the dynamic scene control bridge 710, the motorized turntable system 450, the lighting system 760, the target control system 770, the scene surveying system 610, and the power supply system 702. The dynamic scene control bridge 710 can in some cases convert file formats, perform mathematical operations such as operation conversions, or otherwise interpret instructions or data as necessary so that the vehicle 102 can successfully communicate with other elements. In fact, the dynamic scene control bridge 710 can perform similar conversions, mathematical operations, or interpretations in its role as a middleman between any two or more devices of the architecture 700.

The motorized turntable system 405 includes a turntable structure 725 as well as one or more motors, encoders, actuators, and/or gearboxes 730 for actuating rotation of the turntable structure 725 while the vehicle 102 is on it. The motorized turntable 725 may include a platform 420, which is a surface upon which the vehicle 102 rests during calibration. The platform 420 is rotatable about a base 425 of the motorized turntable structure 725, with one or more motors 730 that, when actuated or activated, rotate the platform 420 about the base 425, and which stop the rotation of the platform 420 about the base 425 when the motors 730 are deactivated. For example, the one or more motors 730 may rotate the platform 420 about the base 425 from a first rotational orientation to a second rotational orientation, or alternately back to the first rotational orientation (e.g., if the rotation is a 360 degree rotation or a multiple thereof). A rotational orientation of the platform 420 relative to the base 425, or of the vehicle 102 relative to the base 425, may alternately be referred to as a rotational position. The motorized turntable system 405 may include one or more sensors 735, such as pressure sensors, for example to identify whether or not the vehicle 102 is on the turntable structure 725, whether or not the vehicle 102 is positioned correctly on the turntable structure 725, or how the vehicle's weight is distributed generally or across the platform 420's top surface (which is in contact with the wheels and/or tires vehicle 102) of the turntable structure 725. The sensors 735 may in some cases identify when the platform 420 has no vehicle 102 on it, when the vehicle 102 is on the platform 420, when the vehicle 102 in a defined position on the platform (e.g., optionally as guided by guide railings on the platform), when the platform 420 and/or the vehicle 102 have begun rotating from a stopped position, and/or when the platform 420 and/or the vehicle 102 have stopped rotating. The motorized turntable system 405 may then automatically communicate one or more signals or messages through wired and/or wireless communication interfaces to the bridge 710, vehicle 102, and/or the computing device 745 of the motorized turntable system 405 to convey any of these observations/detections/identifications by the sensors 735, which may be used to trigger various actions, such as rotation or stop of rotation of the turntable 405, collection of sensor data or stop of collection of sensor data at the vehicle 102, or some combination thereof. The controller 740 may be used to control the actuation of the motors, encoders, actuators, and/or gearbox(es) 730, for example to control a speed or rate or angular velocity of rotation, an angular acceleration (or deceleration) of rotation, a direction of rotation (e.g., clockwise or counterclockwise), or some combination thereof. The motorized turntable system 405 includes one or more computing devices 745 and one or more wired and/or wireless transceivers 750, through which it may interact with the vehicle 102, the dynamic scene control bridge 710, or any other element in the architecture 700.

The lighting system 760 includes one or more light sources 620 and one or more motors and/or actuators 762 for activating or turning on each of the light sources 620, disabling or turning off each of the light sources 620, fading or dimming each of the light sources 620, brightening each of the light sources, or moving each of the light sources 620 with an actuated motor (e.g., to shine on a particular target). The lighting system 760 includes one or more computing devices 764 and one or more wired and/or wireless transceivers 766, through which it may interact with the vehicle 102, the dynamic scene control bridge 710, or any other element in the architecture 700.

Figure 8A:
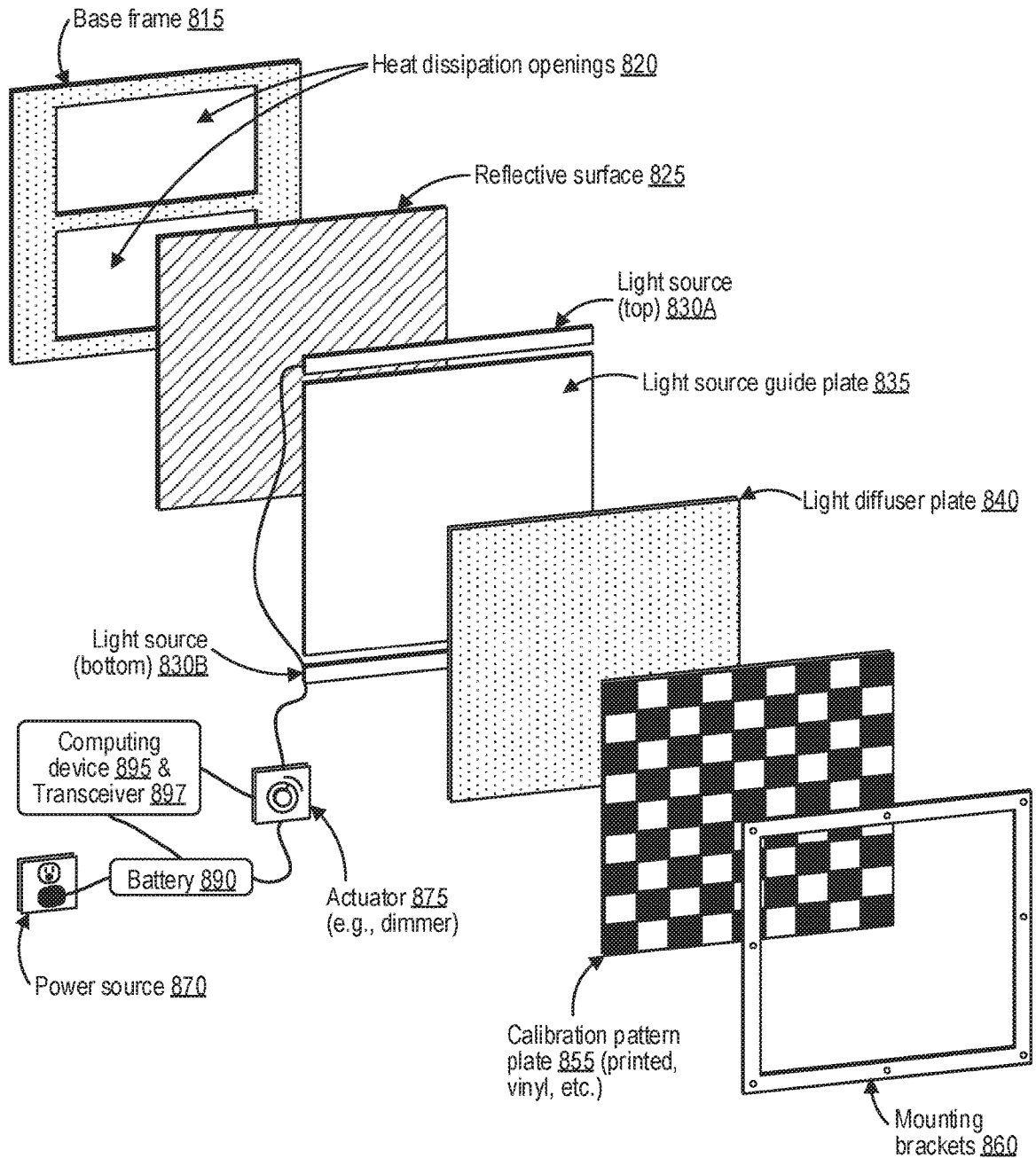
FIG. 8A illustrates an exploded perspective view of an illuminated camera sensor target.
Figure 8B:
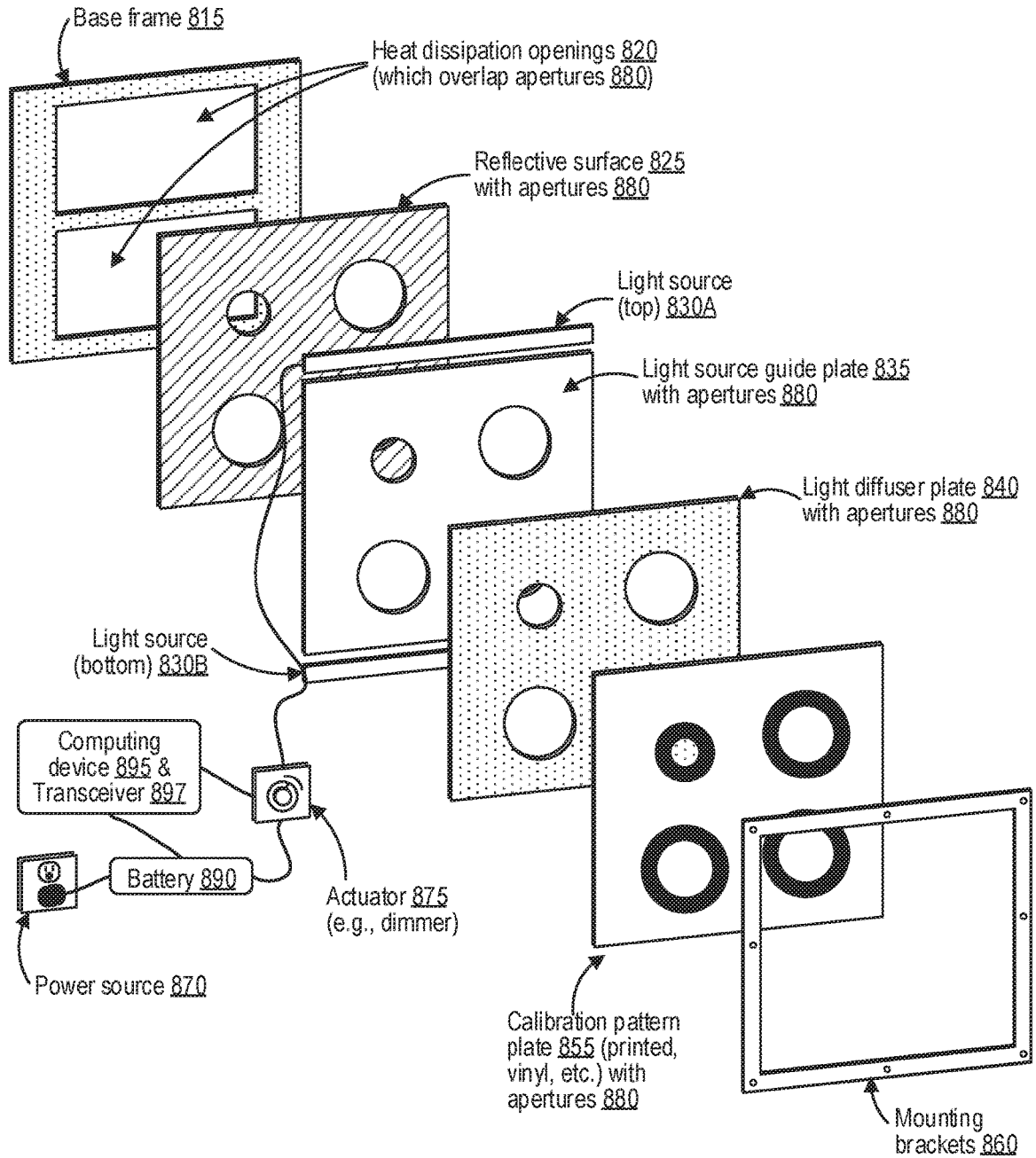
FIG. 8B illustrates an exploded perspective view of an illuminated combined sensor target.

The lighting system 760 may include lighting controls for one or more illuminated sensor targets 800, such as the illuminated sensor targets 800 illustrated in FIG. 8A and FIG. 8B. That is, the computing device(s) 764 may include the computing device(s) 895 of the illuminated sensor targets 800, the transceiver(s) 766 may include the transceiver(s) 897 of the illuminated sensor targets 800, and the actuator(s) 762 may include the actuator(s) 875 of the illuminated sensor targets 800.

The target control system 770 includes one or more targets and target support structure 772. The targets may include one or more of any of the targets 200A, 200B, 200C, 220, and/or 250 illustrated in FIG. 2A-2E, any other target described herein, any other sensor calibration target, or some combination thereof. The target support structures may include easel-type support structures, tripod-type support structures, or the rod-type support structures 410 with wide bases seen in FIG. 4 and FIG. 5. The target support structures may include any material discussed with respect to the substrate 205, such as paper, cardboard, plastic, metal, foam, or some combination thereof. In some cases, certain stands may be made of a plastic such polyvinyl chloride (PVC) to avoid detection by certain types of range sensors, such as radar, which detect metal better than plastic.

The targets and/or support structures 720 may in some cases be motorized, and as such, the target control system 770 may include motors and actuators 774 that it can use to move the targets, for example as requested by the vehicle 102 to optimize calibration. For example, the target support structures may include a robotic arm with ball joints and/or hinge joints that may be actuated using the motors and actuators 774 to translate a target in 3D space and/or to rotate a target about any axis. The motors and actuators 773 may alternately only control a single type of movement for a particular target, for example by enabling a target to rotate about the rod of a stand 410. The target support structure 772 may also include wheels or legs, which may be actuated by the motors 774 to enable the entire target support structure 772 to move, and with it, the target(s) it supports. The target control system 770 includes one or more computing devices 776 and one or more wired and/or wireless transceivers 778, through which it may interact with the vehicle 102, the dynamic scene control bridge 710, or any other element in the architecture 700.

The scene surveying system 610 includes a surveying device support structure 780, such as a tripod or any other structure discussed with respect to the target support structure 772, and one or more sensors 782 coupled to the support structure 780. The sensors 782 of the scene surveying system 610, like the sensors 180 of the vehicle 102, may include one or more cameras of any type (e.g., wide-angle lens, fisheye lens), one or more range sensors (e.g., radar, lidar, emdar, laser rangefinder, sonar, sodar), one or more infrared sensors, one or more microphones, or some combination thereof. Using these, the scene surveying system 610 can capture a representation of the entire dynamic scene, including the vehicle 102, allowing determination of distances between the vehicle 102 and various targets. In some cases, either the vehicle 102 or the scene surveying system 610 or both may request adjustment of lighting through the lighting system 760 and/or adjustment of target positioning via the target control system 770. The scene surveying system 610 includes one or more computing devices 784 and one or more wired and/or wireless transceivers 786, through which it may interact with the vehicle 102, the dynamic scene control bridge 710, or any other element in the architecture 700. In some cases, feature tracking and/or image recognition techniques applied using the computing device 784 may be used with the a camera and/or the radar, lidar, sonar, sodar, laser rangefinder, and/or other sensors 782 of the scene surveying system 610 to identify when the platform 420 has no vehicle 102 on it, when the vehicle 102 is on the platform 420, when the vehicle 102 in a defined position on the platform (e.g., optionally as guided by guide railings on the platform), when the platform 420 and/or the vehicle 102 have begun rotating from a stopped position, and/or when the platform 420 and/or the vehicle 102 have stopped rotating. The scene surveying system 610 may then automatically communicate one or more signals or messages through wired and/or wireless communication interfaces to the bridge 710, vehicle 102, and/or motorized turntable system 405 to convey any of these observations/detections/identifications by the scene surveying system 610, which may be used to trigger various actions, such as rotation or stop of rotation of the turntable 405, collection of sensor data or stop of collection of sensor data at the vehicle 102, or some combination thereof. In some cases, the scene surveying system 610 may simply be referred to as a camera or as another sensor that the scene surveying system 610 includes.

The robotic scene control system 790 includes one or more mobile robots 788. The mobile robots 788 may be coupled to one or more sensor targets, illuminated or otherwise, and/or to one or more light sources. The mobile robots 788 may include wheels and may drive the one or more sensor targets and/or one or more light sources into positions around the turntable 405, for example within a predetermined radius of the turntable 405.

The mobile robots 788 may include various components. These components may include motors, actuators, and telescopic and/or screw lifting mechanisms 792. These may be used to control the vertical height at which the one or more sensor targets and/or one or more light sources that are coupled to each of the mobile robots 788 are positioned at. The components may include sensors 794. The sensors 794 may include any combination of the sensors 830 discussed with respect to the sensors 180 of the vehicle, the sensors 782 of the scene surveying system 610, or some combination thereof. The components may include one or more controllers 795 and/or computing devices 796 inside the mobile robots 788 and/or exterior to the mobile robots 788, which may be used to guide the mobile robots 788 autonomously. The components may include may further include one or more wireless transceivers 798, through which the mobile robots 788 may interact with one another, with the vehicle 102, the dynamic scene control bridge 710, or any other element in the architecture 700.

The power supply system 702 may include batteries, generators, or may plug into an outlet and into the power grid. The power supply system 702 may supply power to the various elements and components of the system architecture 700, including at least the dynamic scene control bridge 710, the motorized turntable system 450, the lighting system 760, the target control system 770, and the scene surveying system 610. The power supply system 702 may also charge the vehicle 102 before, during, and/or after calibration, for example if the vehicle 102 is electric or hybrid. The power supply system 702 may also charge batteries of mobile robots 788 and/or power other systems of the robotic scene control system 790. The power supply system 702 may also intelligently scale voltage, amperage, and current as appropriate for each element and component of the system architecture 700, and to do so it may include a computing system 1800 (not pictured). It may also include a wired and/or wireless transceiver (not pictured) through which it may interact with the vehicle 102, the dynamic scene control bridge 710, or any other element in the architecture 700.

The computing devices 110, 715, 745, 764, 776, and 784 may each, at least in some cases, include at least one computing system 1800 as illustrated in or discussed with respect to FIG. 18, or may include at least a subset of the components illustrated in FIG. 18 or discussed with respect to computing system 1800.

FIG. 8A illustrates an exploded perspective view of an illuminated camera sensor target.

Sensor targets used in vehicle sensor calibration may, in some cases, included light sources themselves, and may thus be illuminated. The illuminated sensor target 800 of FIG. 8A is a camera target variant 805, and therefore is an illuminated version of the camera target 200A of FIG. 2A that includes light sources that provide backlit illumination the checkerboard camera sensor pattern 210A.

The illuminated sensor target 800 includes multiple components, which are illustrated in FIG. 8A as panels, with each consecutive panel positioned in front of another panel. Since FIG. 8A is an exploded view for clarity, each panel is illustrated as separated from the panels on either side, but in reality, these panels may be sandwiched together when the illuminated sensor target 800 is in use. When the illuminated sensor target 800 is in use, any of the panels of the illuminated sensor target 800 may be affixed to, adhered to, or otherwise coupled to any other panels of the illuminated sensor target 800, for example with adhesives, screws, nails, clamps, clips, other fasteners, or some combination thereof.

The rear panel of the illuminated sensor target 800 is a base frame 815. The base frame 815 is a rigid frame that may include screw holes, clamps, fasteners, or other mounting components that allow the other panels to be affixed to the base frame 815. In some cases, the base frame 815 may include one or more heat dissipation openings 820, allowing heat from light sources, batteries, or other circuitry within the illuminated sensor target 800 to safely dissipate from the rear of the illuminated sensor target 800. In some cases, the base frame 815 may be optional, as other panels (e.g., the reflective surface 825, the light source guide plate 835, the light diffuser plate 840, the calibration pattern plate 855, and/or the mounting brackets 860 may be rigid enough that the base frame 815 is unnecessary. In some cases, at least some of the base frame 815 may be opaque so as to prevent or reduce light leakage from the rear of the illuminated sensor target 800.

The reflective surface 825 is illustrated between the base frame 815 and the LED guide plate 835 and light sources 830A-B. The reflective surface 825 may be a rigid plate, such as a mirror, or may be a non-rigid (e.g., flexible) surface such as a reflective film that is sandwiched between the base frame 815 and the light source guide plate 835 (or between the base frame 815 and the light diffuser plate 840 if the light source guide plate 835 is missing). The reflective surface 825 may be adhered to the base frame 815 and/or to the light source guide plate 835 and/or to the light diffuser plate 840. The reflective surface 825 may prevent or reduce light leakage from the rear of the illuminated sensor target 800. The reflective surface 825 may redirect light from the light sources 830A-B that might otherwise leak from the rear of the illuminated sensor target 800 back toward the front of the illuminated sensor target 800. The reflective surface 825 may be at least partially reflective. The reflective surface 825 may be reflective from one direction, as in a one-way mirror, or may be reflective from both directions.

A first light source 830A is positioned along a top side of the light source guide plate 835 of FIG. 8A. A second light source 830B is positioned along a bottom side of the light source guide plate 835 of FIG. 8A. The light source guide plate 835 may include guide rails or slots along the top and bottom side, which the light sources 830A-B may slide into, slot into, fasten to, or otherwise couple to. The light source guide plate 835 may be otherwise hollow, transparent, or semi-transparent inside, allowing he light from the light sources 830A-B to permeate throughout the light source guide plate 835. In some cases, rather than guide rails or slots, the light source guide plate 835 has recesses, optionally with a threaded screw boss, that can receive a screw, nail, or other fastener that fastens each of the light sources 830A-B to the light source guide plate 835, the screw or nail also passing through holes (that each optionally feature a threaded screw boss) in the light sources 830A-B.

While two light sources 830A-B are illustrated in FIG. 8A coupling to the top and bottom sides of the light source guide plate 835, in some cases the light sources 830A-B may instead couple to the left and right sides of the light source guide plate 835. In some cases, there may be only one light source 830, for example coupled to any one of the four sides of the light source guide plate 835. In some cases, there may be three or four light sources 830, for example coupled to any three of the four sides of the light source guide plate 835, or all four sides of the light source guide plate 835.

In some cases, the light source guide plate 835 may be left out of the illuminated camera target 805, and the guide rails, slots, screw/nail holes, or other fastening components identified above as being part of the light source guide plate 835 may instead be included in the light diffuser plate 840 or the reflective surface 835.

Each of the light sources 830A-B may be light emitting diode (LED) strips, which are strips of LED lights wired together in series, in parallel, or some combination thereof. Thus, the light sources 830A-B may include LEDs. The light sources 830A-B may include a combination of various types of light sources, such as LEDs, halogen lights, incandescent lights, compact fluorescent lamp (CFL) lights, lasers, luminescent lights, combustion lights, high-intensity discharge (HID) lights, induction lights, neon lights, argon lights, xenon lights, plasma lights, electrochemical lights, electroluminescent lights, or some combination thereof. LEDs may include organic light-emitting diodes (OLEDs), polymer light-emitting diodes (PLED), active-matrix organic light-emitting diodes (AMOLEDs), or some combination thereof.

In some cases, rather than light sources 830A-B being coupled to the sides of the light source guide plate 835, the light sources 830 may simply be distributed along the planar area of the light source guide plate 835 itself, for example attached to a surface or hanging in the air along a wire grid. This type of light source guide plate 835 may use, for example, LEDs arranged in a two-dimensional grid pattern, with repeating "tiles" of LEDs such that each tile is itself a two-dimensional arrangement. For example, a tile can include four LEDs, with one LED at each of the four vertices of a square or rectangle. A tile can include another number of LEDs, with one LED at each vertex of another polyhedral shape.

The light sources 830A-B may be connected to one or more actuators 875, which may include one or more on/off switches and/or one or more dimmers. All of the light sources 830A-B may be connected to a single actuator, or each may be connected to its own respective actuator. An on/off switch is able to simply control whether one or more light sources are in an unlit state (turned off) or in an illuminated state (turned on). A dimmer, also known as a dimmer switch, may provide a larger degree of control, in that the actuator is able to select a particular brightness along a predetermined range. The range may start from zero lumens (the light source is turned off) and reach a maximum brightness of more than zero lumens (the light source is turned on and set at a maximum brightness that the light source is capable of or that the dimmer allows), and may include any brightness setting in between these two endpoints of the range. The actuator 875 of FIG. 8A is illustrated as a single dimmer for both light sources 830A-B, with a physical dial. That said, each actuator 875 may be connected to one or more computers 895 and/or one or more transceivers 897 and may receive signals controlling each light source's on/off state and/or brightness level. These one or more computers 895 and/or one or more transceivers 897 may be the computing device(s) 764 and the transceiver(s) 766 of FIG. 7, or the computing device(s) 776 and the transceiver(s) 778 of FIG. 7, or some combination thereof, for example. Such signals may be received from the vehicle 102, the scene control bridge 710, the turntable system 405, the scene surveying system 610, any other component illustrated in FIG. 7, or some combination thereof.

The actuator(s) 875, computer(s) 895, and/or transceiver(s) 897 may be connected to a battery 890 and/or to another power source 870, such as a power outlet connected to a power grid. In some cases, the illuminated sensor target 800 may include the actuator(s) 875, the computer(s) 895, the transceiver(s) 897, the battery(s) 890, or some combination thereof.

A light diffuser plate 840 is positioned in front of the light sources 830A-B and the light source guide plate 835. The light diffuser plate 840 serves to scatter the light from the light sources 830A-B before the light passes through the calibration pattern plate 850 and before the light is ultimately received by cameras and/or other sensors 180 of the vehicle 102. The light diffuser plate 840 may include a light-diffusing material, such as frosted glass, frosted plexiglass, frosted acrylic, frosted PVC, frosted epoxy resin, other frosted plastics, paper, fabric, another rough or semi-transparent substance or material, or some combination thereof. Diffusion of light via the light diffuser plate 840 can be used to produce a more even lighting of the illuminated sensor target 800, and can also reduce glare and shadows.

A calibration pattern plate 855 may be a clear transparent plate, such as a plate of transparent glass or acrylic, with a calibration pattern on it. That is, the white checkerboxes of the checkerbox pattern may be left unmarked, as the light passing through them will keep them appearing white, while the black checkerboxes may be marked on the calibration pattern plate 855 as discussed herein. The calibration pattern may be printed on the calibration pattern plate 855 with ink, electrostatic digital printing, laser deposition, or some combination thereof. The calibration pattern may alternately or additionally be applied to the clear transparent plate of the calibration pattern plate 855 by burning or otherwise altering the chemical structure of portions of the clear transparent plate of the calibration pattern plate 855 in the shape of the calibration pattern. The calibration pattern may alternately or additionally be applied to the clear transparent plate of the calibration pattern plate 855 by adhering a material to the clear transparent plate of the calibration pattern plate 855 via an adhesive and/or via static cling. The material may in some cases be vinyl, plastic, paper, or some combination thereof. In some cases, the adhesive may be a pressure-sensitive adhesive, such as the adhesives used in stickers.

In some cases, the clear transparent plate of the calibration pattern plate 855 may be omitted. Where the clear transparent plate is omitted, the calibration pattern may be applied directly to the light diffuser plate 840 by adhering the material directly to the light diffuser plate 840 via an adhesive and/or via static cling. Where the clear transparent plate is omitted, the calibration pattern may be printed directly on the light diffuser plate 840 with ink, electrostatic digital printing, laser deposition, or some combination thereof. Where the clear transparent plate is omitted, the calibration pattern may be applied directly to the light diffuser plate 840 by burning or otherwise altering the chemical structure of portions of the light diffuser plate 840 in the shape of the calibration pattern. Where the clear transparent plate is omitted, the term calibration pattern plate 855 may be used to refer to the material that is adhered or printed on the light diffuser plate, or to the burns or other chemical changes made to the calibration pattern plate 855. These may alternately be simply referred to as the calibration pattern, the applied calibration pattern, the calibration pattern material, the calibration pattern substance, or the calibration pattern application.

In some cases, the calibration pattern plate 855 may be made from a matte material rather than a glossy material, or may be specially treated or covered in a film or other material to make the surface of the calibration pattern plate 855 matte rather than glossy. The film or other material may be a second light diffuser plate. Making the calibration pattern plate 855 matte may help reduce glare and reflections that might occur if the calibration pattern plate 855 was glossy, which could otherwise prevent a camera of the vehicle 102 from recognizing a calibration pattern during calibration. In some cases, a polarized lens treatment may be applied to the calibration pattern plate 855 to reduce glare.

The calibration pattern illustrated in the calibration pattern plate 855 illustrated in FIG. 8A is a checkerboard pattern, much like the checkerboard pattern 210A of the camera target 200A illustrated in FIG. 2A. While the checkerboard pattern 210A is illustrated with a border around the pattern and the checkerboard pattern of the calibration pattern plate 855 illustrated in FIG. 8A does not, it should be understood that the checkerboard pattern of the calibration pattern plate 855 may include a border. It should also be understood that the calibration pattern plate 855 may include any other pattern illustrated or discussed herein, such as the ArUco pattern 210B, the crosshair pattern 210C, a bar code pattern, a QR code pattern, an Aztec code pattern, a semacode pattern, a data matrix code pattern, a PDF417 code pattern, a MaxiCode pattern, a shotcode pattern, a HCCB pattern, or a combination thereof.

One or more mounting brackets 860 may be included over the calibration pattern plate 855 and/or all of the other plates and/or surfaces of the illuminated sensor target 800. In some cases, the one or more mounting brackets 860 may include holes for screws or nails, which may optionally include threaded screw bosses. Screws, nails, zipties, or other fasteners that pass through these holes may also pass through similar holes in the other plates and/or surfaces of the illuminated sensor target 800. While the mounting bracket 860 illustrated in FIG. 8A goes all around all four sides of the sensor target 800, in other cases there may only be mounting brackets on the top side, bottom side, left side, right side, or some combination thereof.

FIG. 8B illustrates an exploded perspective view of an illuminated combined sensor target.

In particular, the illuminated sensor target 800 illustrated in FIG. 8B is a combined target variant 810, and therefore is an illuminated version of the combined target 250 of FIG. 2E. The combined target variant 810 of the illuminated sensor target 800 of FIG. 8B includes the same panels and surfaces discussed with respect to the camera target variant 805 of the illuminated sensor target 800 of FIG. 8A. However, the combined target variant 810 of the illuminated sensor target 800 of FIG. 8B includes apertures 880 in each panel, surface, or layer of the illuminated sensor target 800.

Like the apertures 225 of FIG. 2E, the apertures 880 are detectable by range sensors of the vehicle 102, such as LIDAR sensors. That is, the base frame 115, the reflective surface 825, the light source guide plate 835, the light diffuser plate 840, and the calibration pattern plate 855 all include the apertures 880, or other openings (such as the heat dissipation openings 820 in the base frame 815) that overlap the apertures 880. This way, even with the illumination, the light from the range sensor of the vehicle (e.g., the LIDAR sensor) still passes through the apertures 880, allowing these apertures 880 to be detectable by the range sensor. Like the apertures 225 of FIG. 2E, the apertures 880 each include markings around the apertures 880, the markings included on the calibration pattern plate 855. The markings are then detectable by the camera(s) of the vehicle 102. Because the center of each of the apertures 880 is also the center of the marking around that aperture 880, the combined sensor target 810 enables extrinsic calibration of the camera and the range sensor (e.g., LIDAR), allowing the vehicle 102 to understand how locations within the areas detected by these two sensors line up with one another. Illumination of the combined sensor target 810 makes the markings even clearer, and because the apertures 880 are unlit, also may allow the apertures themselves to be detectable by the camera(s) of the vehicle 102 during calibration.

In some cases, the edges of the apertures 880 may be covered in an opaque or reflective layer for some or all of the panels of the combined sensor target 810. This keeps light from bleeding out into the apertures 880. If the layer is reflective (e.g., white, silver), much of the light hitting the layer also reflects back into the sensor target 800, ultimately increasing illumination. The exterior edges of the sensor target 800 may similarly be covered in an opaque or reflective layer. In some cases, the mounting brackets 860 may include a portion that fold back over the sides of the illuminated sensor target 800, fulfilling this role.

In some calibration environments or setups, only some types of sensor targets are used to calibrate radar sensor(s) of the vehicle 102, such as sensor targets like the sensor target 220 of FIG. 2D. In such calibration environments or setups, other types of sensor targets are not meant for radar calibration and thus should not be detectable by radar sensors. To avoid being detectable by radar, the illuminated sensor targets 800 of either the camera target 805 or combined target 810 variants may be entirely or mostly non-metallic. For example, the base frame and/or mounting brackets 860 may be wooden or plastic rather than metal. The light source guide plate 835, the light diffuser plate 840, and the calibration pattern plate 855 may be made from glass, plexiglass, acrylic, epoxy resin, another plastic, or another transparent or semi-transparent or translucent material. The reflective surface 825 may be a dielectric mirror, a non-metallic foil, a non-metallic pearlized or pearlescent material, a non-metallic iridescent material, a white material, or some combination thereof. In some cases, a very thin layer or amount of metal, as in an application of a metallic ink, may be used in the reflective surface 825 without being strongly detectable by radar sensors.

The light sources 830A-B of the illuminated sensor targets 800 of FIGS. 8A-8B may use white light sources, such as white LEDs, or may use light sources that output one or more specific colors of light. For example, the illuminated sensor targets 800 may use light sources that output red light, orange light, yellow light, green light, blue light, indigo light, violet light, infrared light, ultraviolet light, or some combination thereof. In some cases, the illuminated sensor targets 800 may use light sources whose output color is programmable, such as LEDs whose output color is programmable to include any of the above-listed colors or a subset thereof, sometime referred to as RGB LEDs. Illuminated sensor targets 800 with color-programmable light sources may include a color controller that may receive color change request signals and may change the color of the light sources from a previously-set color to a color that the color controller identifies based on those color change request signals. The color change request signals may be received from the dynamic scene control bridge 710, the vehicle 102, the motorized turntable system 405, the lighting system 760, the target control system 770, the scene surveying system 610, the robotic scene control system 790, or some combination thereof.

The illuminated sensor targets 800 may include one or more color filters (not pictured). The color filters may filter light from the light sources 830A-B from the original output color of the light (e.g., white) to another color (e.g., red, orange, yellow, green, blue, indigo, violet, infrared, or ultraviolet). A color filter panel may be inserted in between the reflective surface 825 and the light source guide plate 835, between the light source guide plate 835 and the light diffuser plate 840, between the light diffuser plate 840 and the calibration pattern plate 855, between the calibration pattern plate 855 and the mounting brackets 860, over the mounting brackets 860, or some combination thereof. For the illuminated combined target 810 of FIG. 8B, the color filter plate may have cutouts 880 so that LIDAR can pass through the cutouts 880 in the color filter plate. Instead of or in addition to use of an added color filter plate, a color filter may be integrated into at least one of the reflective surface 825, the light source guide plate 835, the light diffuser plate 840, or the calibration pattern plate 855. For example, rather than a the reflective surface 825 being a silver reflective material as in a traditional mirror, the reflective surface 825 may be a red-tinted reflective material, or a reflective material tinted in any other color identified above. Transparent or translucent materials in the light source guide plate 835, the light diffuser plate 840, and/or the calibration pattern plate 855 may also be tinted red or any other color identified above rather than being uncolored.

While the illuminated sensor targets 800 are illustrated as backlit, with the light sources 830A-B and light source guide plate 835 and light diffuser plate 840 positioned behind the calibration pattern plate 855. Illuminated sensor targets may alternately or additionally be frontlit, in which case the light sources 830A-B and the light source guide plate 835 are alternately or additionally positioned in front of the calibration pattern plate 855. A light diffuser plate 840 may also be added in front of the calibration pattern plate 855 to help diffuse frontlit light in some cases, though this positioning of the light diffuser plate 840 may in some cases diffuse light from the calibration pattern itself, which may make the calibration pattern appear blurry, unclear, or low-contrast.

Illumination of sensor targets through backlit or frontlit illumination directly at the sensor targets allows more consistent lighting than exterior light sources 620, such as spotlights. Shadows, glare, and gradients caused by inconsistent lighting may prevent cameras of vehicles 102 from correctly recognizing calibration patterns of sensor targets. Illuminated sensor targets 800 overcome this technical issue and therefore more reliably produce well-calibrated vehicles.

In some cases, the calibration environment may be a room or chamber with no lighting or very little light other than the light from the light sources 830 of one or more illuminated sensor targets 800. In such a calibration environment, visual distractions that might otherwise interfere with intrinsic or extrinsic calibration of the camera(s) of the vehicle 102 are removed or reduced, and the camera(s) of the vehicle can detect the illuminated sensor targets 800 more clearly than anything else in the calibration environment. Such a calibration environment may further improve consistency of calibration.

FIG. 9 is a flow diagram illustrating operations for sensor target illumination.

At step 905, a computing device within a calibration environment transmits a lighting actuation signal to a sensor target within the calibration environment. The computing device may be, for example the dynamic scene control bridge 710, the computer 895, the computing device 110, the computing device 764, the computing device 776, another computing device 1800, or some combination thereof. The calibration environment also includes a turntable 405, as in the environments 400, 500, 600, and 700. The sensor target includes a light source 830, and is thus an illuminated sensor target 800.

At step 910, the light source of the sensor target is actuated in response to receipt of the lighting actuation signal at the sensor target. Actuating the light source of the sensor target illuminates the sensor target.

At step 915, the computing device initiates a calibration procedure such that the sensor target is illuminated during the calibration procedure. The turntable is configured to support a vehicle and to rotate the vehicle during the calibration procedure. One or more sensors of the vehicle are calibrated during the calibration procedure based on detection of the sensor target by the one or more sensors of the vehicle. One or more sensors 180 of the vehicle 102 are calibrated during the calibration procedure based on detection of the one or more sensor targets by the one or more sensors 180 of the vehicle 102. The calibration procedure may be any of the calibration procedures illustrated in any of FIG. 13, 14, 15, 16, 17A, or 17B.

In some cases, a vehicle 102 may be used for validation that the calibration environment is set up accurately and that the illuminated sensor targets 800 are illuminated properly and to an appropriate brightness level. For example, if a vehicle 102 drives onto the platform 420 of the turntable 405, the vehicle 102 can use its cameras to visually scan the illuminated sensor targets 800. The vehicle 102 may be a vehicle 102 that was previously calibrated at a calibration environment that was known to be set up properly (e.g., a manually set up calibration environment) and is therefore known to be working correctly. If any of the illuminated sensor targets 800 are so bright that the cameras of the vehicle 102 pick up too much glare, or cannot clearly see the calibration pattern(s) on the illuminated sensor targets 800 due to light bleed, then the vehicle 102 can send a signal to the computing device(s) that controls the light sources 830 of the illuminated sensor targets 800 to reduce the brightness of any illuminated sensor targets 800 with this issue. The computing device can then use the actuator to reduce the brightness of any illuminated sensor targets 800 with this issue.

If any of the illuminated sensor targets 800 are so dim that the calibration patterns of the illuminated sensor targets 800 are too faint or low-contrast for the cameras of the vehicle 102 to clearly identify, or are so dim that the camera cannot see the illuminated sensor targets 800 at all (even despite knowing they are there due to a predetermined calibration environment layout), then the vehicle 102 can send a signal to the computing device(s) that controls the light sources 830 of the illuminated sensor targets 800 to increase the brightness of any illuminated sensor targets 800 with this issue. The computing device can then use the actuator to increase the brightness of any illuminated sensor targets 800 with this issue.

The illuminated sensor targets 800 may be individually controlled, and may be set to different brightness settings than one another for different reasons. In some cases, different illuminated sensor targets 800 may use slightly different types of light sources 830. For example, while one illuminated sensor target 800 might use LED lighting for its light sources 830, another might use halogen lighting for its light sources 830. Even if two illuminated sensor targets 800 use the same type of lighting for their respective light sources 830—LED, for example—variance exists between LEDs or other light sources based on manufacturer, batch, manufacturing defects, changes in materials used by the manufacturer, damage incurred during shipping or distribution, damage incurred during installation of the light sources 830 in the illuminated sensor target 800, or some combination thereof. Additionally, because different illuminated sensor targets 800 are placed in slightly different positions around the turntable 405 during the calibration process, may face slightly different directions during the calibration process, may be at slightly different heights during the calibration process, may have slightly different tilts or skews during the calibration process, or some combination thereof, ambient lighting in the calibration environment, or lighting from other light sources 620, may affect different illuminated sensor targets 800 differently. Thus, one illuminated sensor target 800 may have a different optimal brightness than another illuminated sensor target 800, even during the same time of day. These optimal brightness levels may also change at different times of day, for example between daytime and nighttime.

Figure 17A:
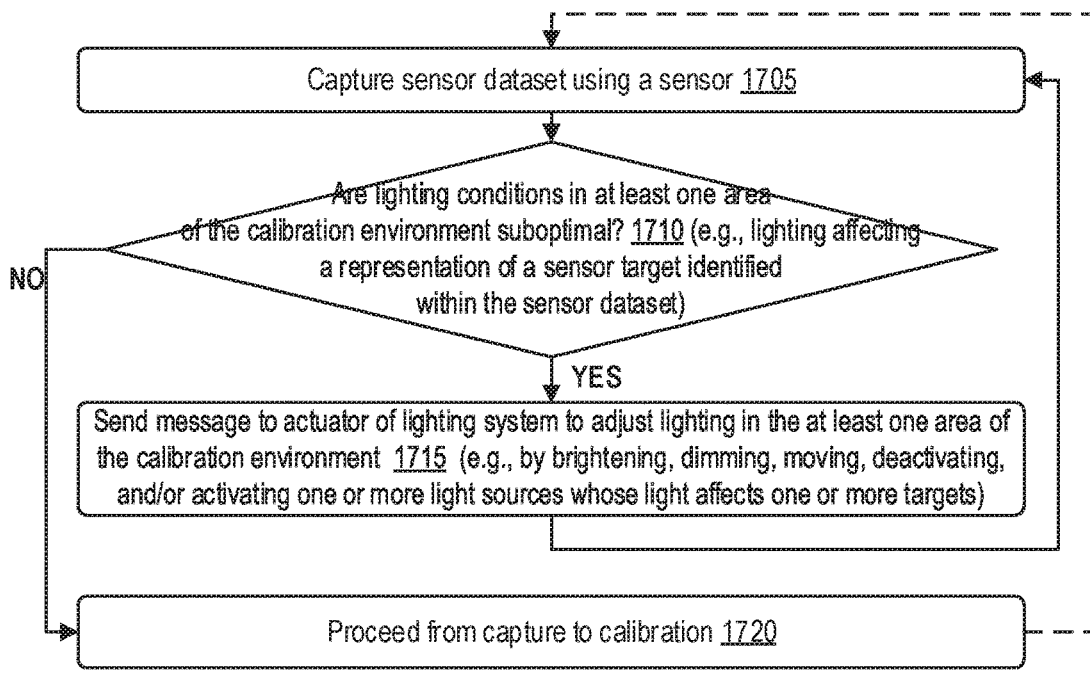
FIG. 17A is a flow diagram illustrating operations for interactions between the vehicle and a lighting system.
Figure 17B:
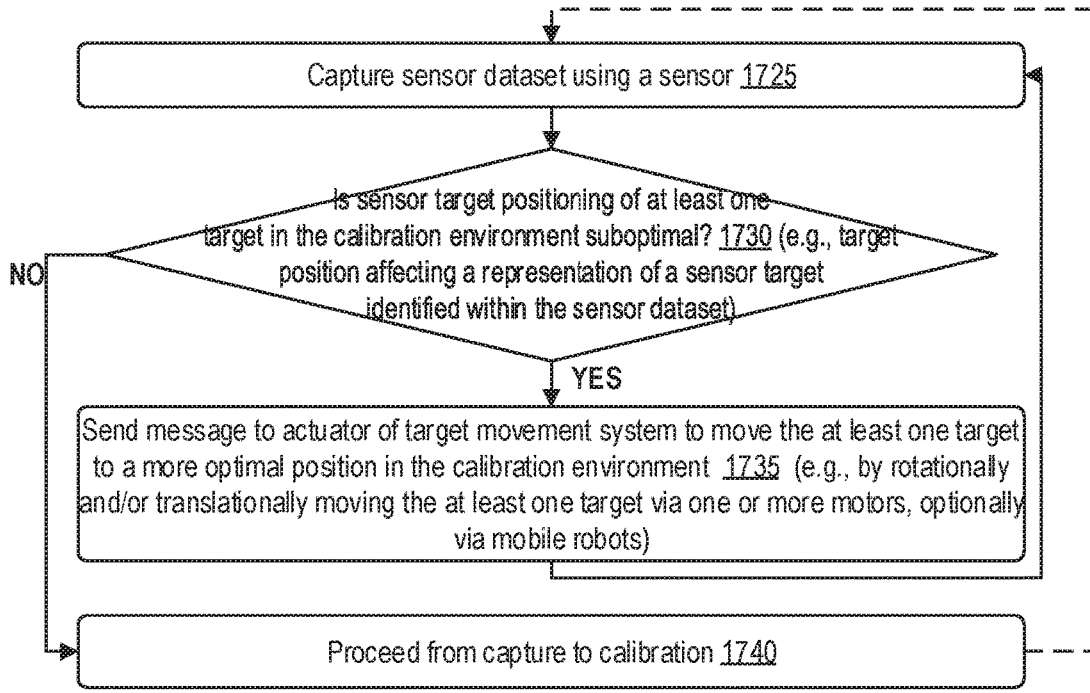
FIG. 17B is a flow diagram illustrating operations for interactions between the vehicle and a target control system.

The processes described in FIG. 17A and FIG. 17B may likewise apply to the light sources of the illuminated sensor targets 800.

FIG. 10 is a flow diagram illustrating operations for adjusting sensor target illumination based on ambient lighting.

In step 1005, the computing device identifies one or more ambient light levels based on readings from one or more ambient light sensors. As with the process 900 of FIG. 9, the computing device may be, for example the dynamic scene control bridge 710, the computer 895, the computing device 110, the computing device 764, the computing device 776, another computing device 1800, or some combination thereof. Each ambient light sensor may, in some cases, be coupled to or included in a illuminated sensor target 800 itself, for example coupled to the base frame 815 or part of the stand 410. The ambient light level may be measured when one or more light sources 620 are turned off, when one or more light sources 620 are turned on, or some combination thereof, to test the effects of the one or more light sources 620 on the ambient light level.

In step 1010, the computing device sends a brightness adjustment signal to an actuator of the light source of the sensor target. The brightness adjustment signal may identify the ambient light level itself, information determined based on the ambient light level, or some combination thereof. For example, the computing device may determine an optimal brightness level based on the ambient light level, and the information determined based on the ambient light level may include the optimal brightness level.

In step 1015, the illuminated sensor target 800 actuates the light source of the sensor target to adjust a brightness level of the light source of the sensor target from a first brightness level to a second brightness level in response to receipt of the brightness adjustment signal. The second brightness level is based on the ambient light level, and may be the optimal brightness level discussed with respect to step 1010. For example, if the ambient brightness level is high, such as due to sunlight streaming in through windows, then the second brightness level may either be increased so that the illumination from the illuminated sensor target 800 still stands out to the camera among the ambient brightness, or may be decreased or turned off if the calibration pattern of the illuminated sensor target 800 is already clearly visible due to the high ambient brightness. If the ambient brightness level is low, such as due to lack of other light sources 620, then the second brightness level may either be decreased so as not to produce glare, or may be increased if the first brightness level is too dim for the camera to identify the calibration pattern.

Ambient light may be different in different areas of a calibration environment. For example, if the calibration environment is in a building with only one window, the sensor targets that are closer to the window may be at a higher ambient light level than the sensor targets that are further from the window. Thus, in some cases, each illuminated sensor target 800 may have its own set of one or more ambient light sensors, which in some cases may be located on different portions of the illuminated sensor target 800. Each illuminated sensor target 800 may then have its brightness adjusted based on the ambient light readings from the one or more ambient light sensors coupled to that illuminated sensor target 800.

Alternately, multiple illuminated sensor targets 800 may share a single set of one or more ambient light sensors, and may each base their brightness levels on the ambient light readings from those one or more ambient light sensors.

Figure 11:
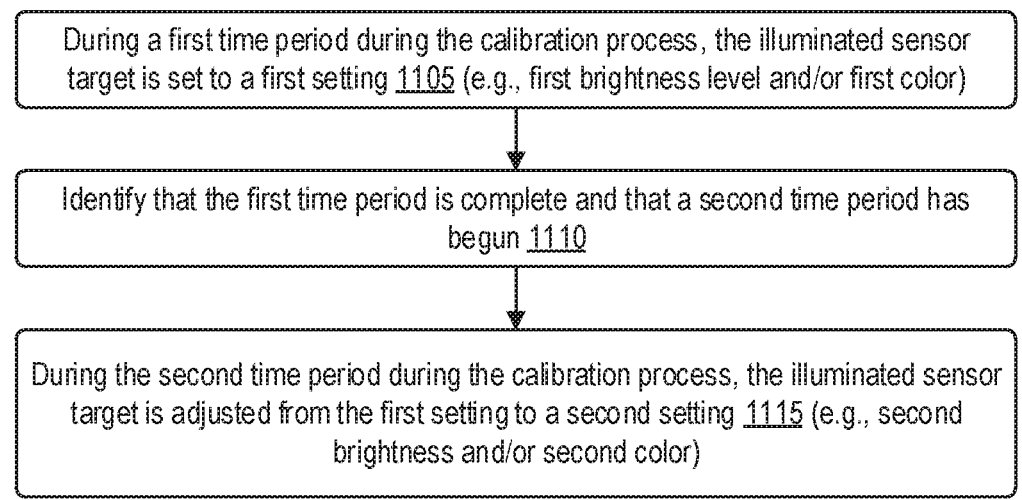
FIG. 11 is a flow diagram illustrating operations for adjusting sensor target illumination during a calibration procedure.

FIG. 11 is a flow diagram illustrating operations for adjusting sensor target illumination during a calibration procedure.

In step 1105, during a first time period during the calibration process, the light source(s) 830 of the illuminated sensor target 800 are set to a first setting. The first setting may include, for example, a first brightness level (from turned off to maximum brightness or anything in between) that the light source(s) 830 of the illuminated sensor target 800 are set to output, a first color (e.g., white, red, orange, yellow, green, blue, indigo, violet, infrared, or ultraviolet) that the light source(s) 830 of the illuminated sensor target 800 are set to output, or some combination thereof.

In step 1110, the computing device identifies that the first time period is complete and that a second time period has begun. As with the processes 900 and 1000 of FIG. 9 and FIG. 10, the computing device may be, for example the dynamic scene control bridge 710, the computer 895, the computing device 110, the computing device 764, the computing device 776, another computing device 1800, or some combination thereof.

The first time period and the second time period may in some cases correspond to different phases of a calibration procedure. For instance, colors of the light source(s) 830 of the illuminated sensor target 800 may be shifted to ensure that the camera of the vehicle accurately recognizes important colors, such as reds, greens, and yellows of traffic lights, and accurately recognizes calibration patterns even when lit with different colors. Brightness levels of the light source(s) 830 of the illuminated sensor target 800 may be reduced to ensure that the camera of the vehicle is still able to recognize calibration patterns even when the illuminated sensor target 800 is dimly lit.

The first time period and the second time period may in some cases correspond to different levels of ambient lighting. For example, if a calibration procedure takes a long time, or is done at sunset or sunrise in an environment with a window, ambient lighting may change in the middle of the calibration procedure. Likewise, sometimes another light source 620 may be switched on during the calibration procedure, sometimes for reasons unrelated to the calibration procedure such as an engineer needing more light to read. Step 1110 may thus represent a change in ambient lighting as identified by one or more ambient light sensors as discussed with respect to the process 1000 of FIG. 10.

The first time period may in some cases correspond to a time period before the vehicle 102 or scene surveying system 610 or other component in the architecture 700 recognizes that color or brightness is not optimal. For example, camera(s) of the vehicle 102 or scene surveying system 610 or other component in the architecture 700 may identify that the brightness of the light source(s) 830 of an illuminated sensor target 800 is too dim for the camera(s) to consistently recognize the calibration pattern, or too bright so as to cause glare, or not the color that is desired for the current phase of the calibration procedure. The vehicle 102 or scene surveying system 610 or other component in the architecture 700 may send a signal to the computing device to adjust the brightness and/or color accordingly, receipt of which causes the computing device to identify that the first time period is now over. The second time period may then correspond to a time period after the computing device sends signals to the actuator(s) 875 to adjust the brightness and/or color of the light source(s) 830 of an illuminated sensor target 800.

In step 1115, during the second time period during the calibration process, the light source(s) 830 of the illuminated sensor target 800 are adjusted from the first setting to a second setting. The second setting may include, for example, a second brightness level (from turned off to maximum brightness or anything in between) that the light source(s) 830 of the illuminated sensor target 800 are set to output, a second color (e.g., white, red, orange, yellow, green, blue, indigo, violet, infrared, or ultraviolet) that the light source(s) 830 of the illuminated sensor target 800 are set to output, or some combination thereof. That is, by switching from the first setting to the second setting, the light source(s) 830 of the illuminated sensor target 800 may adjust in brightness, color, or both.

The process 1100 of FIG. 11 may repeat. As noted above, brightness levels of the light source(s) 830 of the illuminated sensor target 800 may be reduced between the first setting and the second setting to ensure that the camera of the vehicle is still able to recognize calibration patterns even when the illuminated sensor target 800 is dimly lit. This process may repeat, and the brightness levels of the light source(s) 830 of the illuminated sensor target 800 may be gradually reduced each time until the camera(s) of the vehicle 102 can no longer recognize the calibration patterns. This may be used to test cameras of different vehicles 102 against one another, and to ensure that cameras of vehicles 102 that are ultimately used to drive human passengers have cameras that are up to standards and are able to still recognize calibration patterns at a particular threshold setting. Similarly, the process 1100 of FIG. 11 may repeat to cycle through many different colors of illumination to ensure that the camera(s) of the vehicle 102 accurately capture and reliably recognize calibration patterns lit with a wide variety of colors. This may help ensure that vehicles 102 still function accurately in unusual lighting conditions, such as sunsets or sunrises, or cities with high levels of unusually colored neon lighting, argon lighting, sodium lighting, or other unusually colored light sources.

FIG. 12 is a flow diagram illustrating operations for adjusting sensor target illumination based on sensor target position.

In step 1205, location information is identified for an illuminated sensor target 800. The location information may identify an absolute location of the illuminated sensor target 800, such as from a GPS or other GNNS receiver coupled to the illuminated sensor target 800 or a related device such as the mobile robot 788. The location information may identify a relative location of the illuminated sensor target 800 relative to something else, such as another illuminated sensor target 800 or the vehicle 102 or the turntable 405 or a Bluetooth beacon. Relative positioning may be based on comparison of a time of transmission to a time to arrival/receipt of a wireless signal such as a Bluetooth signal, the wireless signal either sent by the illuminated sensor target 800 and received by another device (e.g., another illuminated sensor target 800 or the vehicle or the turntable 405 or the dynamic scene control bridge 710 or another component in the architecture 700) or received by the illuminated sensor target 800 and sent by another device (e.g., another illuminated sensor target 800 or the vehicle or the turntable 405 or the dynamic scene control bridge 710 or another component in the architecture 700). The location information for the mobile robot 788 that is coupled to the illuminated sensor target 800 may be treated as the location information for the illuminated sensor target 800 itself.

In step 1210, location information is identified for the vehicle 102, the turntable 405, or both. As with step 1205, the location information for the vehicle 102 and/or for the turntable 405 may identify an absolute location of the vehicle 102 and/or of the turntable 405, such as from a GPS or other GNNS receiver coupled to either. As with step 1205, the location information for the vehicle 102 and/or for the turntable 405 may identify a relative location of the vehicle 102 and/or of the turntable 405 relative to something else, such as the illuminated sensor target 800 or a Bluetooth beacon. Relative positioning may be based on comparison of a time of transmission to a time to arrival/receipt of a wireless signal such as a Bluetooth signal, the wireless signal either sent by the vehicle 102 and/or the turntable 405 and received by another device (e.g., the illuminated sensor target 800 or a component in the architecture 700) or received by the vehicle 102 and/or the turntable 405 and sent by another device (e.g., the illuminated sensor target 800 or a component in the architecture 700).

At step 1215, the computing device discussed with respect to the processes 900, 1000, and 1100 determines a distance between the illuminated sensor target 800 and the vehicle 102, or between the illuminated sensor target 800 and the turntable 405. The distance is based on the location information for the illuminated sensor target 800 identified in step 1205, the location information for the vehicle 102 and/or for the turntable 405 identified in step 1210, or both. For example, if the location information identified in either step 1205 or 1210 is already a relative position between the illuminated sensor target 800 and the vehicle 102, or between the illuminated sensor target 800 and the turntable 405, this alone may be enough to determine the distance.

At step 1220, the computing device adjusts a brightness level of the light source(s) 830 of the illuminated sensor target 800 based on the distance between the illuminated sensor target 800 and the vehicle 102, or between the illuminated sensor target 800 and the turntable 405. In particular, if the illuminated sensor target 800 is far away from the vehicle 102 and/or turntable 405, it may need to be brighter than if the illuminated sensor target 800 is close to the vehicle 102 and/or turntable 405. Predetermined thresholds may be used. For example, an illuminated sensor target 800 within 1 meter of the vehicle 102 and/or turntable 405 may be set to a first brightness level. An illuminated sensor target 800 between 1 and 2 meters of the vehicle 102 and/or turntable 405 may be set to a second brightness level that is higher/brighter than the first brightness level. An illuminated sensor target 800 between 2 and 3 meters of the vehicle 102 and/or turntable 405 may be set to a third brightness level that is higher/brighter than the second brightness level. An illuminated sensor target 800 between 3 and 4 meters of the vehicle 102 and/or turntable 405 may be set to a fourth brightness level that is higher/brighter than the third brightness level. An illuminated sensor target 800 that is more than 4 meters away from the vehicle 102 and/or turntable 405 may be set to a fifth brightness level that is higher/brighter than the fourth brightness level. These thresholds, and the number of ranges, is exemplary—there may be more or fewer threshold and brightness levels, and the distances involved may be more granular or less granular.

Figure 13:
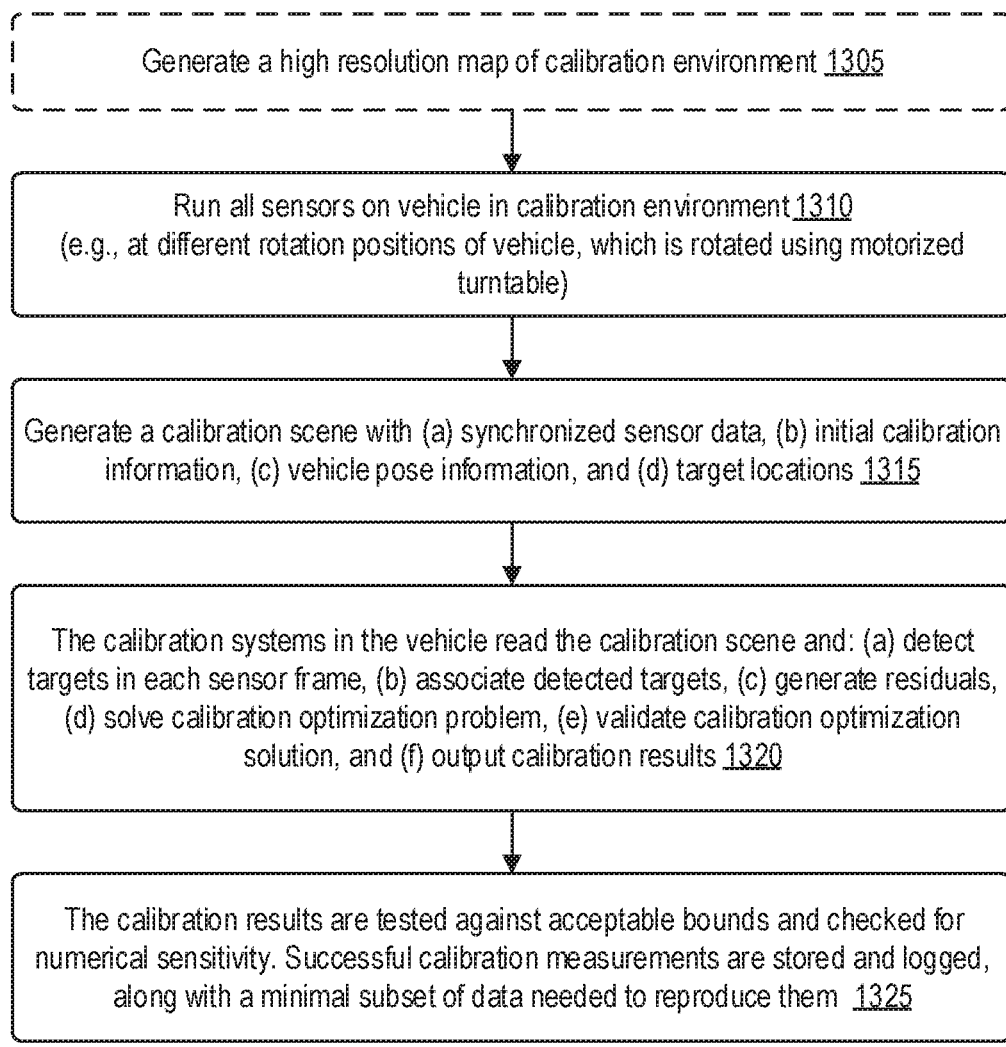
FIG. 13 is a flow diagram illustrating operation of a calibration environment.

FIG. 13 is a flow diagram illustrating operation of a calibration environment. In particular, FIG. 13 illustrates a process 1300.

At step 1305, a high resolution map of calibration environment is generated. This may be performed using the scene surveying system 610, for example.

At step 1310, all sensors 180 on the vehicle 102 are run in the calibration environment, for example at different rotation positions of the vehicle 102, which is rotated using motorized turntable 405. At step 1315, the vehicle 102 generates a calibration scene based on its sensors 180, based on (a) synchronized sensor data, (b) initial calibration information, (c) vehicle pose information, and (d) target locations.

At step 1315, the calibration systems in the vehicle read the calibration scene and: (a) detect targets in each sensor frame, (b) associate detected targets, (c) generate residuals, (d) solve calibration optimization problem, (e) validate calibration optimization solution, and (f) output calibration results. At step 1325, the calibration results are tested against acceptable bounds and checked for numerical sensitivity. Successful calibration measurements are stored and logged, along with a minimal subset of data needed to reproduce them.

FIG. 14 is a flow diagram illustrating operations for intrinsic calibration of a vehicle sensor using a dynamic scene. In particular, FIG. 14 illustrates a process 1400.

At step 1405, a vehicle 102 is rotated into a plurality of vehicle positions over a course of a calibration time period using a motorized turntable 405. The vehicle 102 and motorized turntable 405 are located in a calibration environment. At step 1410, the vehicle 102 captures a plurality of sensor capture datasets via a sensor coupled to the vehicle over the course of the calibration time period by capturing at least one of the plurality of sensor capture datasets while the vehicle is at each of the plurality of vehicle positions.

At step 1415, an internal computing system 110 of the vehicle 102 receives the plurality of sensor capture datasets from the sensor coupled to the vehicle over a course of a calibration time period. At step 1420, the internal computing system 110 of the vehicle 102 identifies, in the plurality of sensor capture datasets, one or more representations of (at least portions of) the calibration environment that include representations of a plurality of sensor targets. The plurality of sensor targets are located at known (i.e., previously stored) positions in the calibration environment. At steps 1425-1430, the sensor is calibrated based on the representations of a plurality of sensor targets identified in the plurality of sensor capture datasets.

More specifically, at step 1425, the internal computing system 110 of the vehicle 102 identifies positions of the representations of the plurality of sensor targets within the one or more representations of (at least portions of) the calibration environment. If the sensor being calibrated is a camera, and the one or more representations of (portions of) the calibration environment are images, then the representations of the sensor targets may be areas within the one or more images comprised of multiple pixels, which the computing system 110 of the vehicle 102 can identify within the one or more images by generating high-contrast versions of the one or more images (i.e., "edge" images) that are optionally filtered to emphasize edges within the image, and by identifying features within the image comprised of one or more of those edges, the features recognizable as portions of the target. For example, the vertices and/or boxes in the checkerboard pattern 210A or the ArUco pattern 210B, curves or vertices in the crosshair pattern 210C, the circular ring marking patterns 230, or combinations thereof, may each be visually recognized as features in this way. Similarly, if the sensor being calibrated is a radar sensor, the radar sensor may recognize the trihedral shape 215 of the target 220 as a feature due to its reflective pattern that results in a high radar cross section (RCS) return. Similarly, if the sensor being calibrated is a lidar sensor, the lidar sensor may recognize the surface of the substrate 205 of the target 250 and the apertures 225/240 within the substrate 205 of the target 250, which may be recognized as a feature due to the sharp changes in range/depth at the aperture.

At step 1430, the internal computing system 110 of the vehicle 102 generates a transformation that maps (1) the positions of the representations of the plurality of sensor targets within one or more representations of (portions of) the calibration environment to (2) the known positions of the plurality of sensor targets within the calibration environment. Other information about the plurality of sensor targets, such as information storing visual patterns or aperture patterns of the sensor targets, may also be used to generate the transformation. For example, if the sensor being calibrated is a camera, and the computing device 110 knows that an image should have a checkerboard pattern 210A of a sensor target 200A, and recognizes a warped or distorted variant of the checkerboard pattern 210A (e.g., because the camera includes a fisheye lens or wide-angle lens), then the computing device 110 may use its knowledge of the way that the checkerboard should look, such as how far the vertices are from each other, that they should form squares, and that the squares are arranged in a grid pattern—to generate a transformation that undoes the distortion caused by the camera, thereby mapping the vertices detected in the image to real-world positions, at least relative to one another. In other words, the transformation includes one or more projective transformations of various 2-D image coordinates of sensor target features into 3-D coordinates in the real world and optionally back into 2-D image coordinates that have been corrected to remove distortion and/or other sensor issues.

Because the computing device 110 knows ahead of time exactly where the sensor targets are in the calibration environment, the transformation may also map the positions of the vertices in the image (and therefore the positions of the representations of the sensor targets in the representation of the calibration environment) to real-world positions in the calibration environment. The transformation(s) that are generated during intrinsic sensor calibration at step 1430 can include one or more types of transformations, including translations, stretching, squeezing, rotations, shearing, reflections, perspective distortion, distortion, orthogonal projection, perspective projection, curvature mapping, surface mapping, inversions, linear transformations, affine transformations, The translational and rotational transformations may include modifications to position, angle, roll, pitch, yaw, or combinations thereof. In some cases, specific distortions may be performed or undone, for example by removing distortion caused by use of a specific type of lens in a camera or other sensor, such as a wide-angle lens or a fisheye lens or a macro lens.

Step 1430 may be followed by step 1405 and/or by step 1410 if calibration is not yet complete, leading to gathering of more sensor capture datasets and further refinement of the transformation generated at step 1430. Step 1430 may alternately be followed by step 1445.

The previously stored information about the plurality of sensor targets may be from a high-definition map generated as in step 1305 of FIG. 13, may be from a second sensor on the vehicle, or may simply be based on a prior understanding of the sensor targets. For example, the internal computing system 110 of the vehicle 102 understands what a checkerboard pattern 210A is and that the grid it forms ought to look include a grid of parallel and perpendicular lines under normal conditions. Because of this, the internal computing system 110 understands that if the representation it received from the sensor (camera) of a target with a checkerboard pattern 210A forms a grid warped or distorted by a wide-angle lens or fisheye lens, this difference (step 1430) can be corrected by the internal computing system 110 by correctively distorting or warping the image captured by the sensor (camera) by to reverse the warping or distortion in the representation until the corrected checkerboard looks like it should. This corrective warping or distortion is the correction generated in step 1435. The correction may also include a translation along X, Y, or Z dimensions, a rotation along any axis, a warp or distortion filter, a different type of filter, or some combination thereof Steps 1445-1460 concern operations that occur after calibration is complete (i.e., post-calibration operations). At step 1445, the sensor of the vehicle captures a post-calibration sensor capture dataset after the calibration time period, after generating the transformation, and while the vehicle is in a second position that is not in the calibration environment. At step 1450, the computing device 110 of the vehicle 102 identifies a representation of an object within a representation of a scene identified within the post-calibration sensor capture dataset. At step 1455, the computing device 110 of the vehicle 102 identifies a position of the representation of the object within the representation of the scene. At step 1460, the computing device 110 of the vehicle 102 identifies a position of the object relative to the second position of the vehicle by applying the transformation to the position of the representation of the object within the representation of the scene.

Note that capture of data by the sensors 180 of the vehicle 102 may occur in parallel with calibration of the sensors 180 of the vehicle 102. While an initial correction is generated at step 1435, the vehicle 102 may continue to rotate, and its sensors 180 may continue to capture more sensor data, hence the dashed lines extending back up to steps 1405 and 1410 from step 1435. When step 1435 is reached a second, third, or $N^{th}$ time (where N is any integer over 1), the correction generated the first time step 1435 was reached may be updated, revised, and/or re-generated based on the newly captured sensor data when step 1435 is reached again. Thus, the correction becomes more accurate as calibration continues.

For some additional context on intrinsic calibration: LIDAR intrinsic properties may include elevation, azimuth, and intensity. Camera intrinsic properties may be given as matrices based on camera region/bin, and may track projection, distortion, and rectification. All sensors' intrinsic properties (including LIDAR and camera) may include position in X, Y, and/or Z dimensions, as well as roll, pitch, and/or yaw.

FIG. 15 is a flow diagram illustrating operations for extrinsic calibration of two sensors in relation to each other using a dynamic scene. In particular, FIG. 15 illustrates a process 1500.

At step 1505, a vehicle 102 is rotated into a plurality of vehicle positions over a course of a calibration time period using a motorized turntable 405. At step 1510, the vehicle 102 captures a first plurality of sensor capture datasets via a first sensor coupled to the vehicle over the course of the calibration time period by capturing at least one of the first plurality of sensor capture datasets while the vehicle is at each of the plurality of vehicle positions. At step 1515, the vehicle 102 captures a second plurality of sensor capture datasets via a second sensor coupled to the vehicle over the course of the calibration time period by capturing at least one of the first plurality of sensor capture datasets while the vehicle is at each of the plurality of vehicle positions. Either of steps 1510 and 1515 can occur first, or they can occur at least partially in parallel.

At step 1520, the internal computing system 110 of the vehicle 102 receives the first plurality of sensor capture datasets from the first sensor and the second plurality of sensor capture datasets from the second sensor. At step 1525, the internal computing system 110 of the vehicle 102 identifies, in the first plurality of sensor capture datasets, representations of a first plurality of sensor target features, the first plurality of sensor target features detectable by the first sensor due to a type of the first plurality of sensor target features being detectable by sensors of a type of the first sensor. At step 1530, the internal computing system 110 of the vehicle 102 identifies, in the second plurality of sensor capture datasets, representations of a second plurality of sensor target features, the second plurality of sensor target features detectable by the second sensor due to a type of the second plurality of sensor target features being detectable by sensors of a type of the second sensor. Either of steps 1525 and 1530 can occur first, or they can occur at least partially in parallel.

The first plurality of sensor target features and the second plurality of sensor target features may be on the same targets; for example, if the first sensor is a camera, and the second sensor is a LIDAR sensor, and plurality of sensor targets are the combined extrinsic calibration targets 250 of FIGS. 2E and 5, then the first plurality of sensor target features may be the visual markings (rings) 230 detectable by the camera, while the second plurality of sensor target features are the apertures 225 detectable by the LIDAR. Alternately, the plurality of sensor target features may be on different targets; for example, the first sensor may be a radar sensor and the first plurality of sensor target features may be the trihedral radar calibration targets 220, while the second sensor may be any other sensor (e.g., camera, lidar) and the second plurality of sensor target features may be, for example, the visual markings (rings) 230 or apertures 225 of the combined extrinsic calibration targets 250, or a pattern 210 of a camera intrinsic target such as the targets 200A-C, or any other target described herein.

At step 1535, the internal computing system 110 of the vehicle 102 compares the relative positioning of the representations of the first plurality of sensor target features and the representations of the second plurality of sensor target features to known relative positioning of the first plurality of sensor target features and the second plurality of sensor target features. In some cases, the relative positioning may be determined based on comparison of a position of a particular point in one representation, such as the center, to a particular point in the another representation to which it is being compared, such as the center. Points that can be used instead of the center may include or the highest point, lowest point, leftmost point, rightmost point, a point that is centered along one axis but not another, a point at the widest portion of the representation, a point at the narrowest portion of the representation, a point at a particular edge or vertex, or some combination thereof. At step 1540, the internal computing system 110 of the vehicle 102 generates a transformation based on the comparison, such that the transformation aligns a first location identified by the first sensor and a second location identified by the second sensor.

As a first example, the first sensor may be a camera and the second sensor may be a LIDAR sensor, and the first plurality of sensor target features and the second plurality of sensor target features may both be features of the combined extrinsic calibration targets 250 of FIGS. 2E and 5 such that the first plurality of sensor target features are the visual markings (rings) 230 detectable by the camera and the second plurality of sensor target features are the apertures 225 detectable by the LIDAR. In such a case, the internal computing system 110 of the vehicle 102 identifies a center of a particular aperture 225 based on the LIDAR data, and identifies a center of a ring 230 based on the camera data, compares these at step 1535 and identifies a relative distance between the two locations based on the internal computing system 110's current geographic understanding of the calibration environment. Because the internal computing system 110 understands that these two points should represent the same location in the real world (i.e., their relative positioning indicates no distance between them), the internal computing system 110 generates a transformation—which may include, for example, a translation along X, Y, and/or Z dimensions, a rotation along any axis, a warp or distortion filter, or some combination thereof—that aligns these location points. That is, the transformation translates (1) a mapping of a point from the one sensor's capture data set to a real world position into (2) a mapping of a point from the other sensor's capture data set to the same real world position. While, with just a pair or two of such points, there may be multiple possible transformations that can perform this alignment, the internal computing system 110 can generate a transformation that works consistently for an increasing number of pairs such sets of points—for example, for each aperture 225 and ring 230 combinations of a target 250, and for each target 250 in the calibration environment. As the number of pairs increases, the number of possible transformations that can successfully align these. Different sensors may map the world around them differently; for example, if the camera includes a wide-angle lens while the other sensor (e.g., LIDAR) does not include an analogous distortion effect, the transformation may include some radial movement or other compensation for distortion.

As a second example, the first sensor may be a radar sensor and the second sensor may be a LIDAR sensor, and the first plurality of sensor target features may be trihedral radar calibration targets 220 while the second plurality of sensor target features may be apertures 225 of a combined target 250 or the planar boundaries of a substrate 205 of a camera target 200, each of which is a known distance away from the nearest trihedral radar calibration targets 220. In such a case, the internal computing system 110 of the vehicle 102 identifies a location of the trihedral radar calibration targets 220 based on radar sensor data and a location of the LIDAR target feature based on LIDAR sensor data, compares these at step 1535 and identifies a relative distance between the two locations based on the internal computing system 110's current geographic understanding of the calibration environment. Because the internal computing system 110 understands that these two points should be a known distance away in a particular direction at a particular angle in the real world, the internal computing system 110 generates a transformation—which may include, for example, a translation along X, Y, and/or Z dimensions, a rotation along any axis, a warp or distortion filter, or some combination thereof—that aligns these location points to match the same known distance away in the particular direction at the particular angle as in the real world. While initially there may be multiple possible transformation that can perform this, the internal computing system 110 can generate a transformation that works consistently for multiple such sets of points—for example, for each trihedral radar calibration target 220 and each nearby LIDAR target feature pair in the calibration environment.

At step 1545, the internal computing system 110 of the vehicle 102 receives, from the first sensor and second sensor, post-calibration sensor capture datasets captured by the first sensor and second sensor after the calibration time period. At step 1550, the internal computing system 110 of the vehicle 102 applies the transformation generated in step 1540 to one or both of the post-calibration sensor capture datasets. For example, a representation of a particular object can be identified in a post-calibration sensor capture dataset captured by one sensor after calibration, and the transformation can be applied to find the same object within another post-calibration sensor capture dataset captured by another sensor after calibration. A real-world position of the same object may be found relative to the vehicle 102 based on intrinsic calibration of at least one of the two sensors and/or based on the transformation. In some cases, a representation of an entire space—that is, a three-dimensional volume—in one post-calibration sensor capture dataset captured by one sensor after calibration may then be identified in another post-calibration sensor capture dataset captured by another sensor by applying the transformation to multiple points within the space. Important points, such as vertices (e.g., corners of a room), edges (e.g., edges of a room), or other features may be selected as at least some of these points. With two aligned representations of a 3-D space, objects can be identified around the vehicle that might not otherwise be. For example, a pedestrian wearing all black might not visually stand out against (e.g., contrast against) a background of an asphalt road at night, but a RADAR or LIDAR might easily identify the pedestrian, and the transformation will still allow the computer 110 of the vehicle 102 to understand where that pedestrian is in its camera footage, allowing the vehicle to pay close attention to visual cues from the pedestrian that the RADAR or LIDAR might not catch or understand, such as presence or lack of a pet or small child accompanying the pedestrian. Developing the vehicle's understanding of its surroundings by aligning real-world (and relative) mappings of the inputs it receives from its sensors can save lives in the field of autonomous vehicles by allowing the best aspects of multiple sensors to complement one another to develop a comprehensive view of the vehicle's surroundings. No sensor is perfect at detecting everything—range sensors can see range/depth but not color or brightness, and can have trouble seeing small or fast-moving objects—while cameras can see color and brightness and visual features but can have trouble with depth perception. Thus, each sensor has its strengths, and the alignment made possible by the extrinsic calibration processes discussed in FIG. 15 can allow the best aspects of each sensor (the "pros" of each sensor) to complement each other and compensate for the downsides of each sensor (the "cons" of each sensor). Note that capture of data by the sensors 180 of the vehicle 102 may occur in parallel with calibration of the sensors 180 of the vehicle 102. While an initial transformation is generated at step 1540, the vehicle 112 may continue to rotate, and its sensors 180 may continue to capture more sensor data, hence the dashed lines extending back up to steps 1505 and 1510 and 1515 from step 1540. When step 1540 is reached a second, third, or $N^{th}$ time (where N is any integer over 1), the transformation generated the first time step 1540 was reached may be updated, revised, and/or re-generated based on the newly captured sensor data when step 1540 is reached again. Thus, the transformation becomes more accurate as calibration continues.

For some additional context on extrinsic calibration, all sensors' extrinsic properties may include relative positions in X, Y, and/or Z dimensions, as well as roll, pitch, and/or yaw. Target and vehicle locations are ground truthed via the mapping system discussed in step 1310 and further as discussed with respect to the transformation of step 1430 of FIG. 14. Sensors of the vehicle 102 and scene surveying system 610 record the scene and each target is detected using a target detection method specific to that sensor and target pair. The measured target location is compared against the mapped target location to derive the total extrinsic sensor error:

$$\text{EXtr}_{sensor}(R,t) = \Sigma_{target} \|RC_{target} + t - D_{target}\|^2$$

Where $C_{target}$ is the measured location of the target and $D_{target}$ is the mapped location of the target. We can collect the intrinsic sensor calibration data (as in FIG. 14) in a similar way, at each frame of recorded data the targets are detected and intrinsics are collected. These intrinsic sensor calibration data (as in FIG. 14) might be the measured distance between pixel coordinates and the lines on a target, or lidar point coordinates and detected planar sides of a target. The total error for a single sensor can be summarized as:

$$\text{ExtrIntr}(R,t,\alpha)_{sensor} = \text{Intr}_{sensor}(\alpha) + \gamma_{sensor}\text{Extr}_{sensor}(R,t)$$

The weight $\gamma_{sensor}$ determines the contribution of that sensor's extrinsic parameter. By collecting the ExtrIntr for every sensor we define a global cost function that describes all intrinsics and extrinsics in the system. We can minimize the total expected error by toggling the calibration parameters for each sensor [R,t,$\alpha$] via a convex optimization algorithm. The output of the sensor extrinsic calibrations may be a pair of rotation and translation matrices on a per sensor basis with respect to the origin of the 3D space (e.g., as identified via LIDAR).

After the calibration parameters are solved for, tests for the numerical sensitivity of the solution can be performed. This may include, for example, verifying the Jacobian of the solution is near zero in all directions and that the covariance of each parameter is reasonably small (e.g., below a threshold). More sophisticated routines that test for sensitivity to targets and constraints may also be performed.

FIG. 16 is a flow diagram illustrating operations for interactions between the vehicle and the turntable. In particular, FIG. 16 illustrates a process 1600.

At optional step 1605, the turntable 405, vehicle 102, or surveying system 610 identifies that the vehicle 102 is positioned on the platform of the motorized turntable. This may be identified using pressure sensors 735 of the turntable 405, a GNSS or triangulation-based positioning receiver of the vehicle 102 compared to a known location of the turntable 405, image/lidar data captured by the surveying system 610 indicating that the vehicle 102 is positioned on motorized turntable 405, or some combination thereof. In some cases, the pressure sensors 735 may be positioned under or beside the guide railing, for example close behind the "stop" wall or incline, to ensure that the vehicle will apply pressure to them. In other cases, the entire turntable is receptive as a pressure sensor. In any case, this information is communicated to the dynamic scene control bridge 710 and/or the computing device 745 of the turntable system 405, either within the turntable itself (if via sensors 735) or via the relevant transceiver(s) of FIG. 7. In some cases, either sensor data capture by the sensors of the vehicle 102 or rotation of the platform 420 of the motorized turntable 405 may automatically begin once the pressure sensors identify that the vehicle 102 is on the platform 420 and/or once sensors identify that the vehicle 102 has stopped moving (e.g., IMU of the vehicle 102, regional pressure sensors of regions of the turntable platform 420 surface, scene surveying system 610 camera, or some combination thereof). Rotation of the platform 420 about the base 425 may occur first before sensor data capture if, for example, calibration is previously designated to start with the vehicle 102 rotated to a particular rotation orientation or rotation position that is not the same as the rotation orientation or rotation position that the vehicle 102 is in when it drives (or is otherwise placed) onto the platform 420.

In some cases, the rotation of the platform 420 of the turntable 405 about the base 425 via the motors 730 can manually be triggered instead of being based on, and automatically triggered by, detection of the vehicle at step 1605, for example via an input received at the dynamic scene control bridge 710 and/or the computing device 745 of the turntable system 405 from a wired or wireless interface that itself receives an input from a human being, the wired or wireless interface being for example a keyboard or touchscreen or mouse or remote control communicating in a wired or wireless fashion with the dynamic scene control bridge 710 and/or the computing device 745 of the turntable system 405.

At step 1610, one or more motors 730 of the motorized turntable 405 are activated to rotate the platform 420 of the motorized turntable 405 about the base 425 of the motorized turntable 405 (and therefore vehicle 102 on top of the platform 420 as well) from a first rotation orientation to a second rotation orientation in response to detection that the vehicle is on the turntable. The one or more motors 730 may be deactivated, causing the platform of the motorized turntable 405 (and therefore vehicle 102 on top of the platform 420 as well) to stop rotating about the base 425 with the platform 420 in the second orientation at the stop of rotation. The term "rotation orientation" may be used to refer to an angle, or angular orientation, or angular position. Other terms may be used in place of the term "rotation position," such as "angle," "angular position," "angular orientation," "position," or "orientation." The first rotation orientation and the second rotation orientation may be a predetermined angle away from each other, for example N degrees, where N is 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, or some amount in between any two of these numbers. The first rotation orientation and the second rotation orientation may be an angle away from each other that is determined by the internal computing system 110 of the vehicle 102, or by the dynamic scene control bridge 710, or by the computing device 745 of the turntable system 405, or by some combination thereof, based on which angle would likely be most efficient, comprehensive, or an optimal balance thereof, in completing calibration of the entire fields of view (FOV) of the sensors 180 of the vehicle 102.

At step 1615, the vehicle 102 uses its IMU (or other rotation detection device) to check whether the vehicle 102 (and therefore the platform 420) is still rotating. As the IMU is a collection of accelerometers and/or gyroscopes and/or other motion or rotation detection devices, the vehicle 102 can alternately separately use accelerometers and/or gyroscopes and/or other motion or rotation detection devices that are among the vehicle 102's sensors 180 to determine this. Alternately, the turntable 405 may use one or more motion sensors of its own (e.g., accelerometer, gyroscope, IMU, or any other motion sensor discussed herein) to identify whether the platform 420 of the turntable 405 is still rotating about the base 425. Alternately still, the scene surveying system 610 may use one or more cameras to visually identify whether the platform of the turntable 405 and/or the vehicle 102 is still rotating. In some cases, the device that detects that the vehicle 102 and/or the platform 420 of the turntable 405 has stopped rotating relative to the base 425 (the vehicle computing system 110, the computing device 745 of the turntable 405, the scene surveying system 610, and/or the dynamic scene control bridge 710) can send a signal identifying the detected stop in rotation to any of the vehicle computing system 110, the computing device 745 of the turntable, the scene surveying system 610, or the dynamic scene control bridge 710.

If, at step 1620, the vehicle 102 or turntable 405 or scene surveying system 610 determines that the rotation has stopped, step 1625 follows step 1620. Otherwise, step 1615 follows step 1620.

In addition, we may use the vehicle 102's other sensors 180, such as one or more cameras, radar sensors, lidar sensors, sonar sensors, and/or sodar sensors instead of or in addition to the IMU, accelerometers, gyroscopes, and/or motion/rotation detection devices to identify when the vehicle 102 (and thus the platform 420) is still rotating relative to the base 425 or not. With all of these sensors, rotation may be identified based on whether regions of the calibration environment that should be motionless—walls, the floor, the ceiling, targets that have not been configured and/or commanded to move, light sources 620, the scene surveying system 610—are changing location between sensor captures (indicating that the vehicle is rotating and/or in motion) or are stationary between sensor captures (indicating that the vehicle is stationary).

At step 1625, the vehicle captures sensor data using one or more of its sensors while the vehicle 102 is at the second position. If, at step 1630, the internal computing device 110 of the vehicle 102 determines that it has finished capturing sensor data while vehicle is at the second rotational orientation/position, then step 1635 follows step 1630, and optionally, the vehicle computing system 110 may send a sensor capture confirmation signal to a computing device associated with the turntable 405, such as dynamic scene control bridge 710 and/or the computing device 745 of the turntable system 405. The sensor capture confirmation signal may then be used as a signal that the turntable 405 is allowed to begin (and/or should begin) rotation of the platform 420 about the base 425 from the second rotation orientation to a next rotation orientation. Otherwise, if sensor data capture is not complete step 1625 follows step 1630.

If, at step 1635, the internal computing device 110 of the vehicle 102 determines that sufficient data has been captured by the vehicle 102's sensors 180 to perform calibration—then no more rotations of the platform 420 and the vehicle 102 about the base 425 are needed and step 1640 follows step 1635, thus proceeding from sensor data capture to sensor calibration. Optionally, the vehicle computing system 110 may send a sensor capture completion signal to a computing device associated with the turntable 405, such as dynamic scene control bridge 710 and/or the computing device 745 of the turntable system 405. The sensor capture completion signal may then be used as a signal that the platform 420 of the turntable 405 is allowed to stop (and/or should stop) rotating about the base 425 altogether to allow the vehicle 102 to exit the turntable 405 and the calibration environment, or that the platform 425 of the turntable 405 is allowed to begin (and/or should begin) rotating about the base 425 to an exit orientation that allow the vehicle 102 to exit the turntable and the calibration environment (for example when the calibration environment includes many targets around the turntable 405 except for in an entrance/exit direction, as in FIG. 6 where an optimal entrance/exit direction is on the bottom-right due to lack of targets and obstacles generally in that direction). Otherwise, if the internal computing device 110 of the vehicle 102 does not determine that sufficient data has been captured by the vehicle 102's sensors 180 to perform calibration at step 1635, then step 1610 follows after step 1635, to continue rotations of the platform 420 (and vehicle 102) about the base 425 of the motorized turntable system 405. Depending on the sensors 180 on the vehicle 102 and the data captured by the sensors 180, the sensors 180 may require one or more full 360 degree rotations of the vehicle 102 on the platform 420, or may require less than one full 360 degree rotation of the vehicle 102 on the platform 420. In one embodiment, sufficient data for calibration of a sensor may mean data corresponding to targets covering at least a subset of the complete field of view of a particular sensor (collectively over a number of captures), with the subset reaching and/or exceeding a threshold percentage (e.g., 30%, 35%, 40%, 45%, 50%, 55%, 60%, 65%, 70%, 75%, 80%, 85%, 90%, 95%, 99%, 100%).

Some sensors may require more data for calibration than others, and thus, one sensor may have captured sufficient data for calibration while another sensor might not. In such cases, step 1635 may refer to all sensors and thus go through the "NO" arrow if any of the sensors 180 hasn't captured sufficient data. Alternately, a particular sensor capturing sufficient data, or a majority of sensors capturing sufficient data, may be the deciding factor toward "YES" or "NO." In some cases, step 1635 may refer to each sensor separately, and once a particular sensor has captured sufficient data at step 1635, that sensor may continue on to step 1640 for calibration even if the vehicle 102 on the platform 420 continues to rotate about the base 425 and the remaining sensors continue to capture data. Thus, step 1635 may enable staggered completion of capture of sufficient data for different sensors at different times.

In some cases, sensor data capture and sensor calibration occurs at least partially in parallel; that is, a time period in which sensor data capture occurs may at least partially overlap with a time period in which sensor calibration occurs. In such cases, the sensor may calibrate region by region, for example by calibrating the sensor in one or more regions in which the sensor detects (e.g., "sees") targets for each data capture until the entire point of view of the sensor, or some sufficient subset is calibrated, with the subset reaching and/or exceeding a threshold percentage (e.g., 30%, 35%, 40%, 45%, 50%, 55%, 60%, 65%, 70%, 75%, 80%, 85%, 90%, 95%, 99%, 100%). Calibration of each sensor may use a different threshold, or certain sensors may share a threshold. When calibration occurs in parallel with capture rather than calibration on the whole sequentially following capture on the whole, step 1635 can simply identify when calibration of one or more sensors has successfully completed, and treat that as a proxy for identifying whether sufficient data is captured by those sensors to perform calibration.

In this case, however, step 1610 now rotates the vehicle 102 from the second position to a third position, and steps 1625 and 1630 refer to the third position. The next time step 1610 is reached in this fashion, it now rotates the vehicle 102 from the third position to a fourth position, and so on. In this way, step 1610 rotates the vehicle 102 on the platform 420 about the base 425 from its current rotational orientation/position to its next rotational orientation/position.

At step 1640, the internal computing device 110 of the vehicle 102 proceeds on from sensor data capture to actual calibration of the sensors, for example as in steps 1425-1445 of FIG. 14 or steps 1525-1550 of FIG. 15. To clarify, as discussed further above, capturing data via the sensors 180 as in steps 1625-1635 and calibrating the sensors 180 as in step 1640 can be performed in parallel, between rotations of the platform 420 and vehicle 102 about the base 425, or in any order that causes the process to be efficient. That is, calibration of data captured by a given one of the sensors 180 can begin immediately after the given sensor captures any new data, and can continue while the vehicle 102 is rotating about the base 425 on the platform 420 of the turntable 405 and while the sensors 180 capture further data. Because calibration and capture may be staggered and/or parallelized so that some further capture occurs after some calibration has started, dashed arrows extend from step 1640 to steps 1610 and 1625.

It should be understood that many of the steps of FIG. 16 (such as 1605, 1615, 1620, 1630, and 1635) are optional.

FIG. 17A is a flow diagram illustrating operations for interactions between the vehicle and a lighting system. In particular, FIG. 17A illustrates a process 1700.

At step 1705, the vehicle 102 captures sensor datasets using its sensors 180, for example as in steps 1310, 1410, 1510, 1515, and/or 1625. At step 1710, the internal computing system 110 of the vehicle 102 identifies whether a characteristic of one or more sensor targets—in this case lighting conditions in at least one area of the calibration environment that includes one or more sensor targets—are suboptimal, at least for the purposes of calibration. This may include lighting from illuminated sensor targets 800 that are backlit or frontlit as well as sensor targets that are illuminated via exterior light sources 620, such as spotlights. In some cases, the computer 110 of the vehicle 102 may identify that a representation of a sensor target that is identified within a sensor dataset (such as a photo or video) captured using the sensor (such as a camera) is suboptimal or not suitable for calibration, for example because the sensor target is too dimly lit, too brightly lit, lit using an incorrect color, or lit from the wrong angle (e.g., causing glare, shadows, dimness, brightness, uneven lighting, or otherwise affecting the representation of the sensor target). Such lighting conditions may be suboptimal because they may cause a sensor to not properly or clearly detect out one or more features of the sensor target, such as a checkerboard pattern 210A or ArUco pattern 210B or crosshair pattern 210C of a camera target 200, or a shape 215 of a radar target 220, or a aperture 225/240 and/or marking 230 and/or target ID 235 of a combined camera/depth sensor target 250.

If, at step 1710, the computer 110 of the vehicle 102 determines that the lighting conditions are suboptimal, then step 1710 is followed by step 1715; otherwise, step 1710 is followed by step 1720, at which point the vehicle proceeds from capture to sensor calibration of its sensors, for example as in steps 1315-1325, 1425-1440, 1525-1550, and/or 1640.

Note that, as discussed with respect to FIG. 16, capture of data by the sensors 180 of the vehicle 102 may occur in parallel with calibration of the sensors 180 of the vehicle 102. This may cause calibration and capture to be staggered and/or parallelized so that some further capture occurs after some calibration has started, represented by the dashed arrow from step 1720 to step 1705.

At step 1715, the internal computing system 110 of the vehicle 102 sends an environment adjustment signal or message to an environment adjustment system (in this case the lighting system 760) to activate one or more actuators 762/875 and thereby adjust lighting conditions in the at least one area (and affecting one or more self-illuminated sensor targets 800 and/or externally illuminated sensor targets in the at least one area) of the calibration environment. The one or more actuators 762/895 may control one or more motors associated with the lighting system 760, one or more switches associated with the lighting system 760, and/or one or more dimmers associated with the lighting system 760. Upon receiving the environment adjustment signal or message from the vehicle 102, the lighting system 760 can activate the one or more actuators 762/895, and can thereby effect a modification to the characteristic (i.e., the lighting condition) of the one or more sensor targets, for example by brightening one or more light sources 620/830, by dimming one or more light sources 620/830, by moving one or more light sources 620/830 translationally, by rotating one or more light sources 620/830 (i.e., moving the one or more light sources 620/830 rotationally), by activating (i.e., turning on) one or more light sources 620/830, by deactivating (i.e., turning off) one or more light sources 620/830, by changing a color emitted by (or filtered via color filters applied to) the one or more light sources 620/830, by otherwise modifying the one or more light sources 620/830, or some combination thereof. Note that an increase in brightness as discussed herein may refer to brightening one or more light sources 620/830, activating one or more one or more light sources 620/830, and/or moving one or more light sources 620/830. Note that a decrease in brightness as discussed herein may refer to dimming one or more light sources 620/830, deactivating one or more one or more light sources 620/830, and/or moving one or more light sources 620/830. In some cases, the message of step 1715 may be sent to a mobile robot 800 or otherwise to a computer 796 of the robotic scene control system 790, which may cause one or more mobile robot 800 to drive to move one or more light sources 620/830, or to raise or lower the light sources 620/830 using the screw or telescopic lifting mechanism, or to interact with a switch or other interface associated with the light source 620/830 to turn the light source 620/830 on or off, dim the light source 620/830, increase the brightness of the light source 620/830, filter the light source 620/830, change the output color of the light source 620/830, or perform any other action discussed with respect to step 1715.

After step 1715, the process returns to 1705 to capture the sensor data with newly-adjusted (i.e., optimized) lighting. The newly-adjusted lighting is then checked at step 1710 to see whether the adjustment from step 1715 corrected the lighting condition issue identified previously at step 1710 (leading to step 1720), or if further adjustments are required (leading to step 1715 once again).

FIG. 17B is a flow diagram illustrating operations for interactions between the vehicle and a target control system. In particular, FIG. 17B illustrates a process 1750.

At step 1725, the vehicle 102 captures sensor datasets using its sensors 180, for example as in steps 1310, 1410, 1510, 1515, 1625, and/or 1705. At step 1730, the internal computing system 110 of the vehicle 102 identifies whether a characteristic of one or more sensor targets—in this case sensor target positioning of at least one target in the calibration environment is suboptimal, at least for the purposes of calibration. In some cases, the computer 110 of the vehicle 102 may identify that a representation of a sensor target that is identified within a sensor dataset (such as a photo or video or radar image/video or lidar image/video) captured using the sensor (such as a camera or radar or lidar sensor) is suboptimal or not suitable for calibration, for example because the sensor target is located in a position and/or facing an orientation in which the sensor cannot properly or clearly detect out one or more features of the sensor target, such as a checkerboard pattern 210A or ArUco pattern 210B or crosshair pattern 210C of a camera target 200, or a shape 215 of a radar target 220, or a aperture 225/240 and/or marking 230 and/or target ID 235 of a combined camera/depth sensor target 250.

If, at step 1730, the computer 110 of the vehicle 102 determines that the sensor target positioning is sub-optimal, then step 1730 is followed by step 1735; otherwise, step 1730 is followed by step 1740, at which point the vehicle proceeds from capture to sensor calibration of its sensors, for example as in steps 1315-1325, 1425-1440, 1525-1550, 1640, and/or 1720.

Note that, as discussed with respect to FIG. 16, capture of data by the sensors 180 of the vehicle 102 may occur in parallel with calibration of the sensors 180 of the vehicle 102. This may cause calibration and capture to be staggered and/or parallelized so that some further capture occurs after some calibration has started, represented by the dashed arrow from step 1740 to step 1725.

At step 1735, the internal computing system 110 of the vehicle 102 sends an environment adjustment signal or message to an environment adjustment system (in this case the target control system 770 and/or the robotic scene control system 790) to move the at least one sensor target to a more optimal position in the calibration environment, for example using one or more mobile robots 800 of the robotic scene control system 790 and/or by activating one or more actuators 774/792 of the target control system 770 and/or of the robotic scene control system 790. The one or more actuators 774/792 may control one or more motors and/or switches associated with the target control system 770 and/or the robotic scene control system 790. Upon receiving the environment adjustment signal or message from the vehicle 102, the target control system 770 and/or of the robotic scene control system 790 can activate the one or more actuators 774/792, and can thereby effect a modification to the characteristic (i.e., the location around the turntable, rotation about one or more axes, height above the surface that the turntable rests on) of the one or more sensor targets, for example by activating one or more mobile robots 800 to drive and therefore that translationally move one or more targets and/or by activating one or more mobile robots 800 to raise or lower a target higher or lower and/or by activating one or more motors of a mobile robot 800 or target control system 770 that rotate one or more targets about one or more axes.

After step 1735, the process returns to 1725 to capture the sensor data with newly-moved (i.e., optimized) sensor target positioning. The newly-moved target positioning is then checked at step 1730 to see whether the adjustment from step 1735 corrected the target positioning issue identified previously at step 1730 (leading to step 1740), or if further adjustments are required (leading to step 1735 once again).

In some cases, the adjustment(s) to lighting of FIG. 17A and the adjustment(s) to target positioning of FIG. 17B may both occur following capture of the same sensor dataset with the same sensor, In such cases, the checks of steps 1710 and 1730 may be performed repeatedly, once after each adjustment in either target positioning or lighting, since movement of a sensor target may correct or ameliorate issues with lighting, and on the other hand, adjustment of lighting may also correct or ameliorate issues with target positioning. In such cases, the sending of messages, and the resulting adjustments, of steps 1715 and step 1735, can either be performed sequentially (and then tested at steps 1710 and/or 1730), or can be performed in parallel (and then tested at steps 1710 and/or 1730).

While various flow diagrams provided and described above, such as those in FIGS. 13, 14, 15, 16, 17A, and 17B, may show a particular order of operations performed by some embodiments of the subject technology, it should be understood that such order is exemplary. Alternative embodiments may perform the operations in a different order, combine certain operations, overlap certain operations, or some combination thereof. It should be understood that unless disclosed otherwise, any process illustrated in any flow diagram herein or otherwise illustrated or described herein may be performed by a machine, mechanism, and/or computing system #00 discussed herein, and may be performed automatically (e.g., in response to one or more triggers/conditions described herein), autonomously, semi-autonomously (e.g., based on received instructions), or a combination thereof. Furthermore, any action described herein as occurring in response to one or more particular triggers/conditions should be understood to optionally occur automatically response to the one or more particular triggers/conditions.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices, for example by encrypting such information.

FIG. 18 shows an example of computing system 1800, which can be for example any computing device making up internal computing system 110, remote computing system 150, (potential) passenger device executing rideshare app 170, or any component thereof in which the components of the system are in communication with each other using connection 1805. Connection 1805 can be a physical connection via a bus, or a direct connection into processor 1810, such as in a chipset architecture. Connection 1805 can also be a virtual connection, networked connection, or logical connection.

In some embodiments, computing system 1800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1800 includes at least one processing unit (CPU or processor) 1810 and connection 1805 that couples various system components including system memory 1815, such as read-only memory (ROM) 1820 and random access memory (RAM) 1825 to processor 1810. Computing system 1800 can include a cache of high-speed memory 1812 connected directly with, in close proximity to, or integrated as part of processor 1810.

Processor 1810 can include any general purpose processor and a hardware service or software service, such as services 1832, 1834, and 1836 stored in storage device 1830, configured to control processor 1810 as well as a special-purpose processor where software instructions are incorporated into the actual processor design. Processor 1810 may essentially be a completely self-contained computing system, containing multiple cores or processors, a bus, memory controller, cache, etc. A multi-core processor may be symmetric or asymmetric.

To enable user interaction, computing system 1800 includes an input device 1845, which can represent any number of input mechanisms, such as a microphone for speech, a touch-sensitive screen for gesture or graphical input, keyboard, mouse, motion input, speech, etc. Computing system 1800 can also include output device 1835, which can be one or more of a number of output mechanisms known to those of skill in the art. In some instances, multimodal systems can enable a user to provide multiple types of input/output to communicate with computing system 1800. Computing system 1800 can include communications interface 1840, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1840 may also include one or more Global Navigation Satellite System (GNSS) receivers or transceivers that are used to determine a location of the computing system 1800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1830 can include software services, servers, services, etc., that when the code that defines such software is executed by the processor 1810, it causes the system to perform a function. In some embodiments, a hardware service that performs a particular function can include the software component stored in a computer-readable medium in connection with the necessary hardware components, such as processor 1810, connection 1805, output device 1835, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A system for vehicle sensor calibration, the system comprising:
   a sensor target that includes a light source and a pattern, wherein actuating the light source adjusts illumination of the pattern of the sensor target;
   a connector for a turntable having a platform that is rotatable about a base of the turntable, wherein the platform is configured to support a vehicle and to rotate the vehicle during a calibration procedure during which one or more sensors of the vehicle are calibrated based on detection of the sensor target by the one or more sensors of the vehicle; and
   a computing device that initiates the calibration procedure, wherein the computing device sends a light source actuation signal to the light source of the sensor target to actuate the light source of the sensor target to adjust illumination of the sensor target so that the pattern of the sensor target is illuminated during the calibration procedure, wherein the computing device sends a turntable actuation signal to the connector for the turntable to actuate one or more motors of the turntable that rotate the platform of the turntable about the base of the turntable during the calibration procedure.

2. The system of claim 1, wherein the sensor target is positioned within a predetermined range of the turntable during the calibration procedure.

3. The system of claim 1, wherein the sensor target includes a dimmer, and wherein actuating the light source includes increasing a brightness of the light source to a predetermined brightness level via the dimmer.

4. The system of claim 1, wherein the sensor target includes a switch, and wherein actuating the light source includes switching the light source from an unlit state to an illuminated state via the switch.

5. The system of claim 1, wherein the light source includes one or more light emitting diodes (LEDs) and a light diffusing material.

6. The system of claim 1, wherein the light source includes a reflective layer that reflects light emitted by the light source.

7. The system of claim 1, further comprising an ambient light sensor that detects a level of ambient light in a calibration environment in which the sensor target and the turntable are located, wherein the computing device sends the light source actuation signal to the light source of the sensor target to actuate the light source of the sensor target to adjust illumination of the sensor target to a brightness level that is based on the level of ambient light in the calibration environment so that the sensor target is illuminated at the brightness level during the calibration procedure.

8. The system of claim 1, wherein the sensor target is non-metallic.

9. The system of claim 1, further comprising a communication transceiver that receives a vehicle presence signal from the turntable, the vehicle presence signal indicating that one or more sensors of the turntable have detected presence of the vehicle on the platform of the turntable, wherein the computing device sends the light source actuation signal to the light source of the sensor target to actuate the light source of the sensor target following receipt of the vehicle presence signal from the turntable.

10. The system of claim 1, further comprising a communication transceiver that receives a vehicle feedback signal from the vehicle, wherein the computing device sends a light source adjustment signal to the light source of the sensor target to adjust a lighting output of the light source in response to receipt of the vehicle feedback signal.

11. The system of claim 1, wherein the computing device sends the light source actuation signal to the light source of the sensor target during the calibration procedure.

12. The system of claim 1, wherein the computing device sends the light source actuation signal to the light source of the sensor target before the calibration procedure.

13. The system of claim 1, further comprising the turntable, wherein the computing device connects to the turntable through the connector for the turntable.

14. A method for vehicle sensor calibration, the method comprising:
transmitting a lighting actuation signal from a computing device to a sensor target within a calibration environment, the calibration environment also including a turntable, the sensor target including a light source and a pattern;
actuating the light source of the sensor target in response to receipt of the lighting actuation signal at the sensor target, wherein actuating the light source of the sensor target illuminates the pattern of the sensor target; and
initiating a calibration procedure such that the pattern of the sensor target is illuminated during the calibration procedure, wherein the turntable is configured to support a vehicle and to rotate the vehicle during the calibration procedure, wherein one or more sensors of the vehicle are calibrated during the calibration procedure based on detection of the sensor target by the one or more sensors of the vehicle.

15. The method of claim 14, further comprising receiving a vehicle presence signal from the turntable, the vehicle presence signal indicating that one or more sensors of the turntable have detected presence of the vehicle on a platform of the turntable, wherein actuating the light source of the sensor target occurs following receipt of the vehicle presence signal from the turntable.

16. The method of claim 14, further comprising:
receiving a vehicle feedback signal from the vehicle, the vehicle feedback signal requesting a modification to the light source of the sensor target; and
actuating the light source of the sensor target to perform the modification to the light source of the sensor target in response to receipt of the vehicle feedback signal.

17. The method of claim 14, wherein actuating the light source of the sensor target occurs during the calibration procedure.

18. The method of claim 14, wherein actuating the light source of the sensor target occurs before the calibration procedure.

19. A system for vehicle sensor calibration, the system comprising:
a sensor target that includes a light source and a pattern, wherein actuating the light source illuminates the pattern of the sensor target;
a memory storing instructions; and
a processor that executes the instructions, wherein execution of the instructions by the processor causes the processor to:
actuate the light source of the sensor target to illuminate the pattern of the sensor target, and
actuate one or more motors of a turntable having a platform that is rotatable about a base of the turntable, wherein the platform is configured to support a vehicle and to rotate the vehicle during a calibration procedure during which one or more sensors of the vehicle are calibrated based on detection of the sensor target by the one or more sensors of the vehicle.

20. The system of claim 19, further comprising a communication transceiver that receives an incoming signal associated with the calibration procedure, wherein execution of the instructions by the processor causes the processor to actuate the light source of the sensor target to adjust a lighting output of the light source in response to receipt of the incoming signal.

* * * * *